US011006138B2

(12) United States Patent
Surti et al.

(10) Patent No.: US 11,006,138 B2
(45) Date of Patent: May 11, 2021

(54) LOSSLESS COMPRESSION FOR MULTISAMPLE RENDER TARGETS ALONGSIDE FRAGMENT COMPRESSION

(71) Applicant: Intel Corporation, Santa Clara, CA (US)

(72) Inventors: Prasoonkumar Surti, Folsom, CA (US); Abhishek R. Appu, El Dorado Hills, CA (US); Michael J. Norris, Folsom, CA (US); Eric G. Liskay, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/661,522

(22) Filed: Oct. 23, 2019

(65) Prior Publication Data

US 2020/0068211 A1 Feb. 27, 2020

Related U.S. Application Data

(63) Continuation of application No. 16/228,252, filed on Dec. 20, 2018, now Pat. No. 10,499,073, which is a
(Continued)

(51) Int. Cl.
*H04N 19/436* (2014.01)
*G06T 1/20* (2006.01)
(Continued)

(52) U.S. Cl.
CPC ............ *H04N 19/436* (2014.11); *G06T 1/20* (2013.01); *G06T 5/20* (2013.01); *G06T 7/13* (2017.01);
(Continued)

(58) Field of Classification Search
CPC ............................ H04N 19/436; H04N 19/85
(Continued)

(56) References Cited

U.S. PATENT DOCUMENTS

| 5,572,702 A | 11/1996 | Sarangdhar et al. |
| 5,623,628 A | 4/1997 | Brayton et al. |

(Continued)

OTHER PUBLICATIONS

Goodfellow, et al. "Adaptive Computation and Machine Learning Series", Book, Nov. 18, 2016, pp. 98-165, Chapter 5, The MIT Press, Cambridge, MA.
(Continued)

*Primary Examiner* — Lam T Mai
(74) *Attorney, Agent, or Firm* — Jaffery Watson Mendonsa & Hamilton LLP

(57) ABSTRACT

Described herein is a data processing system comprising a memory device to store a multisample render target and a general-purpose graphics processor comprising a multisample antialiasing compressor and a multisample render cache. The multisample render target can store color data for a set of sample locations of each pixel in a set of pixels. The multisample antialiasing compressor can apply multisample antialiasing compression to color data generated for the set of sample locations of a first pixel in the set of pixels. The multisample render cache can store color data generated for the set of sample locations of the first pixel in the set of pixels. Color data evicted from the multisample render cache is stored to the multisample render target.

18 Claims, 37 Drawing Sheets

Related U.S. Application Data continuation of application No. 15/873,379, filed on Jan. 17, 2018, now Pat. No. 10,212,443, which is a continuation of application No. 15/477,034, filed on Apr. 1, 2017, now Pat. No. 9,912,957.

(51) Int. Cl.
| | | |
|---|---|---|
| *G06T 7/13* | (2017.01) | |
| *G06T 9/00* | (2006.01) | |
| *H04N 19/85* | (2014.01) | |
| *G06T 15/50* | (2011.01) | |
| *G06T 5/20* | (2006.01) | |

(52) U.S. Cl.
CPC ............. *G06T 9/00* (2013.01); *G06T 15/503* (2013.01); *H04N 19/85* (2014.11); *G06T 2200/12* (2013.01)

(58) Field of Classification Search
USPC ...................................................... 341/51–75
See application file for complete search history.

(56) References Cited

U.S. PATENT DOCUMENTS

| | | | |
|---|---|---|---|
| 5,923,857 A | 7/1999 | Pawlowski et al. | |
| 6,134,632 A | 10/2000 | Looi et al. | |
| 6,324,305 B1 | 11/2001 | Holladay et al. | |
| 6,842,828 B2 | 1/2005 | Blankenship | |
| 7,764,831 B1 | 7/2010 | Pick et al. | |
| 7,873,812 B1 | 1/2011 | Mimar | |
| 7,932,914 B1 | 4/2011 | Geiss et al. | |
| 8,171,169 B2 | 5/2012 | Bullard et al. | |
| 8,730,247 B2 | 5/2014 | Hiroi et al. | |
| 9,466,090 B2 | 10/2016 | Surti | |
| 9,471,583 B2 | 10/2016 | Metzger | |
| 9,547,931 B2 | 1/2017 | Crassin | |
| 9,569,886 B2 | 2/2017 | Akenine-Moller | |
| 9,754,345 B2 | 9/2017 | Akenine-Moeller | |
| 9,912,957 B1 * | 3/2018 | Surti .................... H04N 19/436 |
| 10,212,443 B2 * | 2/2019 | Surti ......................... G06T 5/20 |
| 10,499,073 B2 * | 12/2019 | Surti ......................... G06T 5/20 |
| 2006/0188163 A1 | 8/2006 | Elder | |
| 2006/0203007 A1 | 9/2006 | Bullard et al. | |
| 2007/0257935 A1 | 11/2007 | Koduri et al. | |
| 2014/0333662 A1 | 11/2014 | Akenine-Moller et al. | |
| 2014/0347385 A1 | 11/2014 | Akenine-Moller et al. | |
| 2016/0062947 A1 | 3/2016 | Chetlur et al. | |

OTHER PUBLICATIONS

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junking, "The Compute Architecture of Intel Processor Graphics Gen9", paper, Aug. 14, 2015, 22 pages, Version 1.0, Intel Corporation, Santa Clara, CA.

Non-Final Office Action from U.S. Appl. No. 15/488,619, dated Jan. 8, 2018, 12 pages.

Liktor et ai., "Decoupled Deferred Shading for Hardware Rasterization", Mar. 9, 2012, pp. 143-150.

Ragan-Kelley, J.,et aL, Decoupled Sampiing for Graphics Pipelines. ACM Transactions on Graphics (TOG), 30(3), p. 17.

Notice of Allowance from U.S. Appl. No. 15/488,619, dated Jul. 13, 2018, 11 pages.

Notice of Allowance from U.S. Appl. No. 16/661,522, dated Jul. 22, 2019, 8 pages.

Office Action from U.S. Appl. No. 16/661,522, dated Apr. 4, 2019, 9 pages.

* cited by examiner

FIG. 23A   GRAPHICS PROCESSOR COMMAND FORMAT
2300
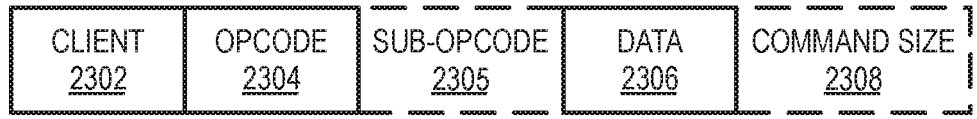
FIG. 23B   GRAPHICS PROCESSOR COMMAND SEQUENCE
2310
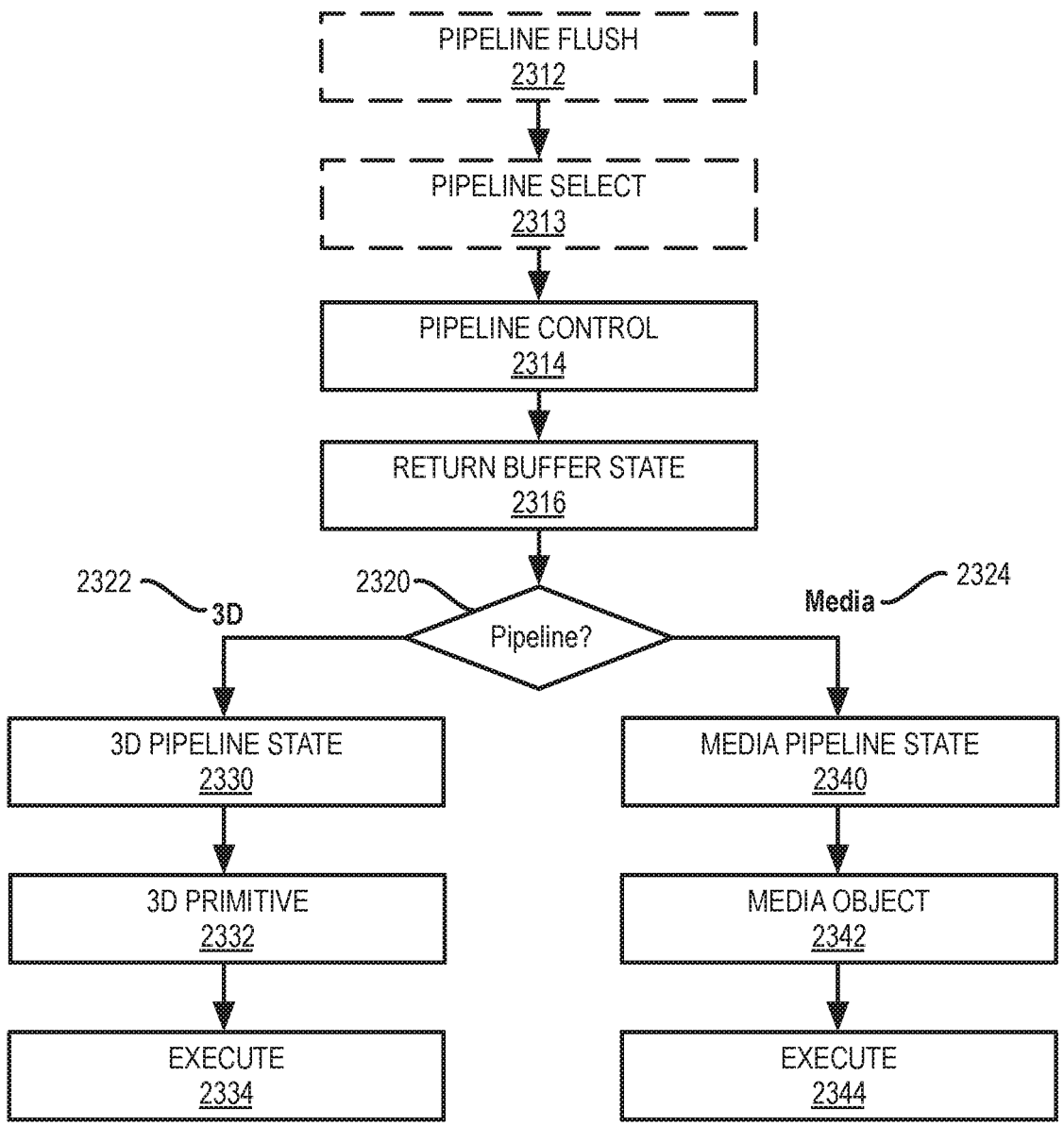

LOSSLESS COMPRESSION FOR MULTISAMPLE RENDER TARGETS ALONGSIDE FRAGMENT COMPRESSION

CROSS-REFERENCE

This application claims priority to U.S. patent application Ser. No. 16/228,252, filed Dec. 20, 2018 which is a continuation of U.S. patent application Ser. No. 15/873,379, filed Jan. 17, 2018, which is a continuation of U.S. patent application Ser. No. 15/477,034 filed Apr. 1, 2017, issued as U.S. Pat. No. 9,912,957 on Mar. 6, 2018, both of which are hereby incorporated herein by reference.

FIELD OF INVENTION

This invention relates generally to data processing and more particularly to data processing via a general-purpose graphics processing unit.

BACKGROUND OF THE DESCRIPTION

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, *CUDA Programming*, Chapter 3, pages 37-51 (2013) and/or Nicholas Wilt, *CUDA Handbook, A Comprehensive Guide to GPU Programming*, Sections 2.6.2 to 3.1.2 (June 2013).

BRIEF DESCRIPTION OF THE DRAWINGS

The features of the present invention are described reference to various embodiments, some of which are illustrated in the appended drawings. It is to be noted, however, that the appended drawings illustrate only typical embodiments and are therefore not to be considered limiting of its scope, for the invention may admit to other equally effective embodiments.

FIG. 23A-23B illustrate a graphics processor command format and command sequence, according to some embodiments;

DETAILED DESCRIPTION

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In general, graphics rendering may generate an image or images from model data using a wide range of computer implemented techniques. In some graphics rendering implementations an image may be rendered using rasterization by sampling different functions such as, for example, a visibility function and/or a shading function. In general, the samples for a visibility function may be termed visibility samples and the samples for a shading function may be termed shading samples. When implementing techniques such as multi-sampling anti-aliasing (MSAA), multiple visibility samples may be used per. Rendering to a multisample render target that stores multiple samples per pixels is more bandwidth intensive than using a simple sample. To restrain bandwidth consumption, various forms of compression can be used. When lossless color compression techniques are implemented for a multisample render target, storing the samples in an interleaved manner can increase the efficiency of such techniques in comparison to planar techniques of storing sample data.

System Overview

Figure 1:
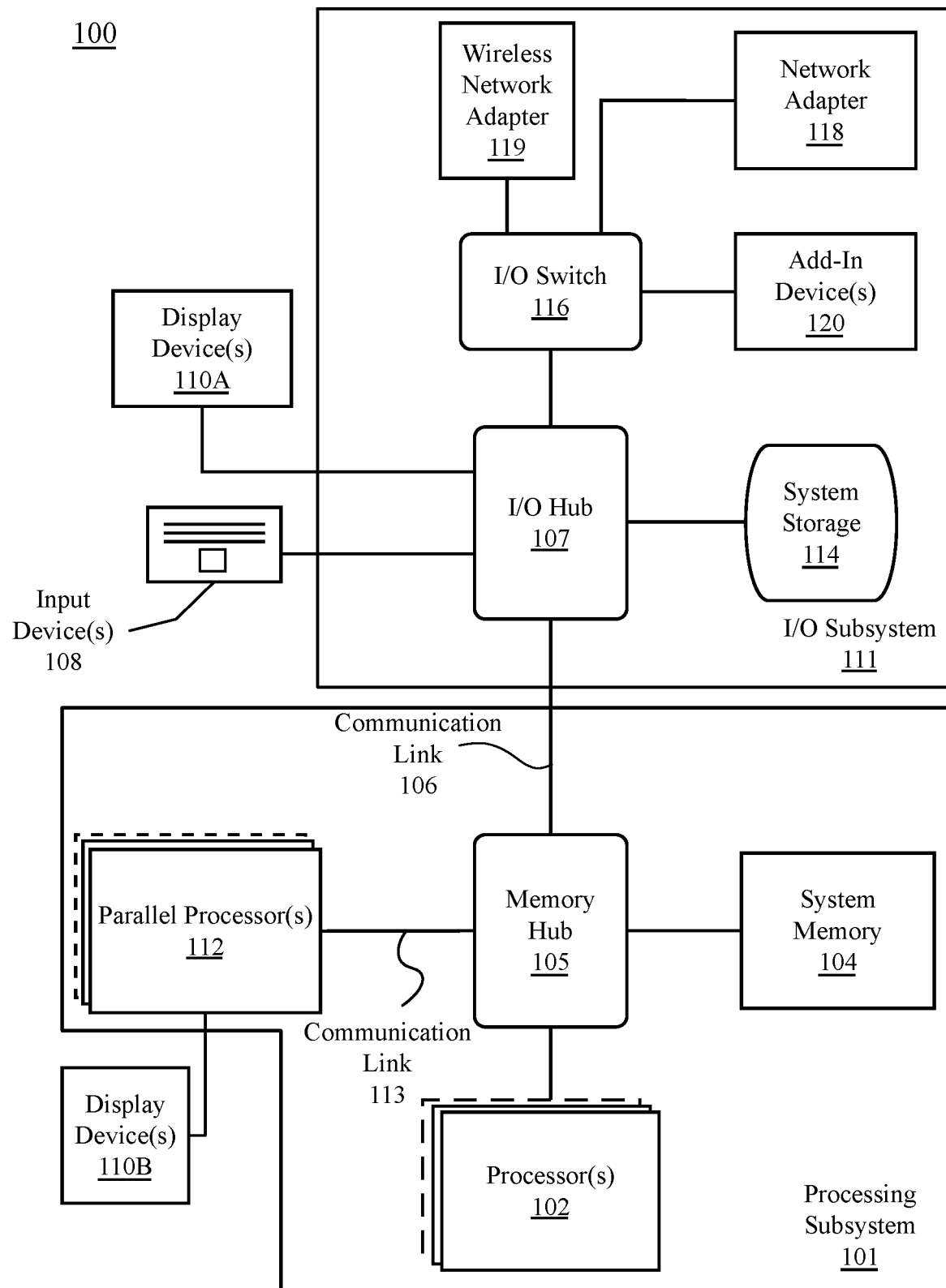
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that can include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general-purpose processing, while preserving the underlying computational architecture, described in greater detail herein. In yet another embodiment, components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
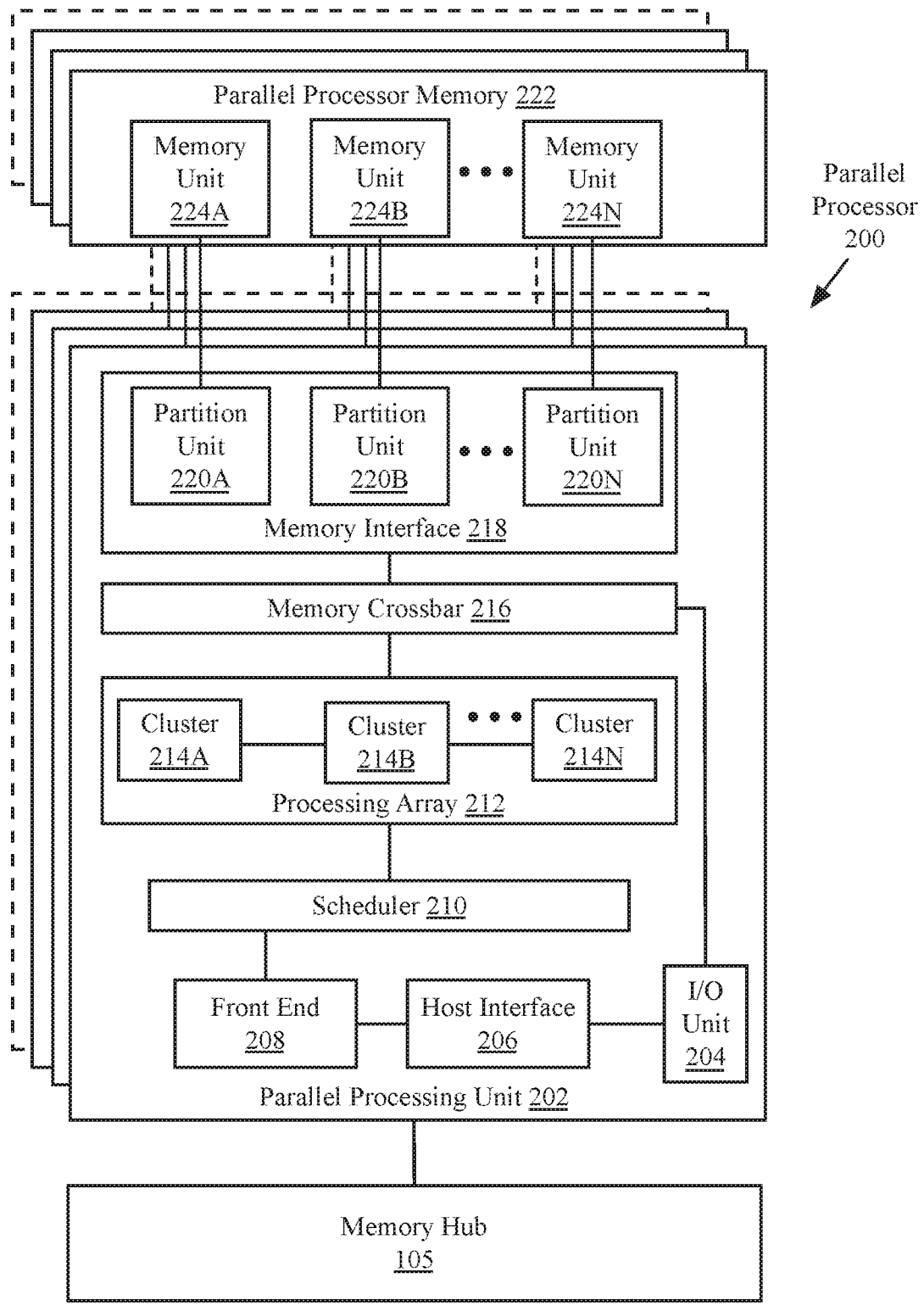
FIG. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example and in one embodiment, some instances of the parallel processing unit 202 can include higher precision floating-point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
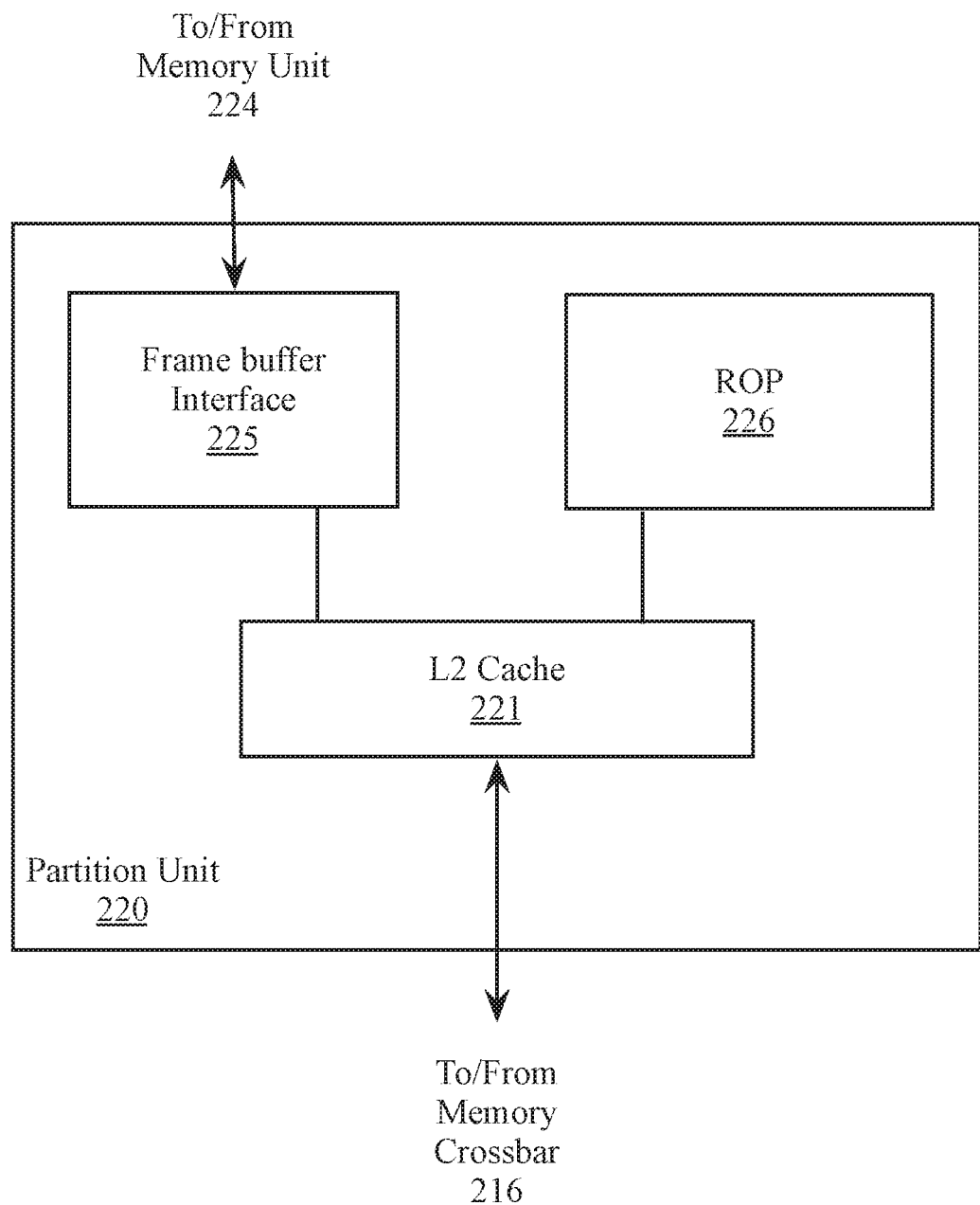

FIG. 2B is a block diagram of a partition unit 220, according to an embodiment. In one embodiment the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

In some embodiments, the ROP 226 is included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110 of FIG. 1, routed for further processing by the processor(s) 102, or routed for further processing by one of the processing entities within the parallel processor 200 of FIG. 2A.

Figure 2C:
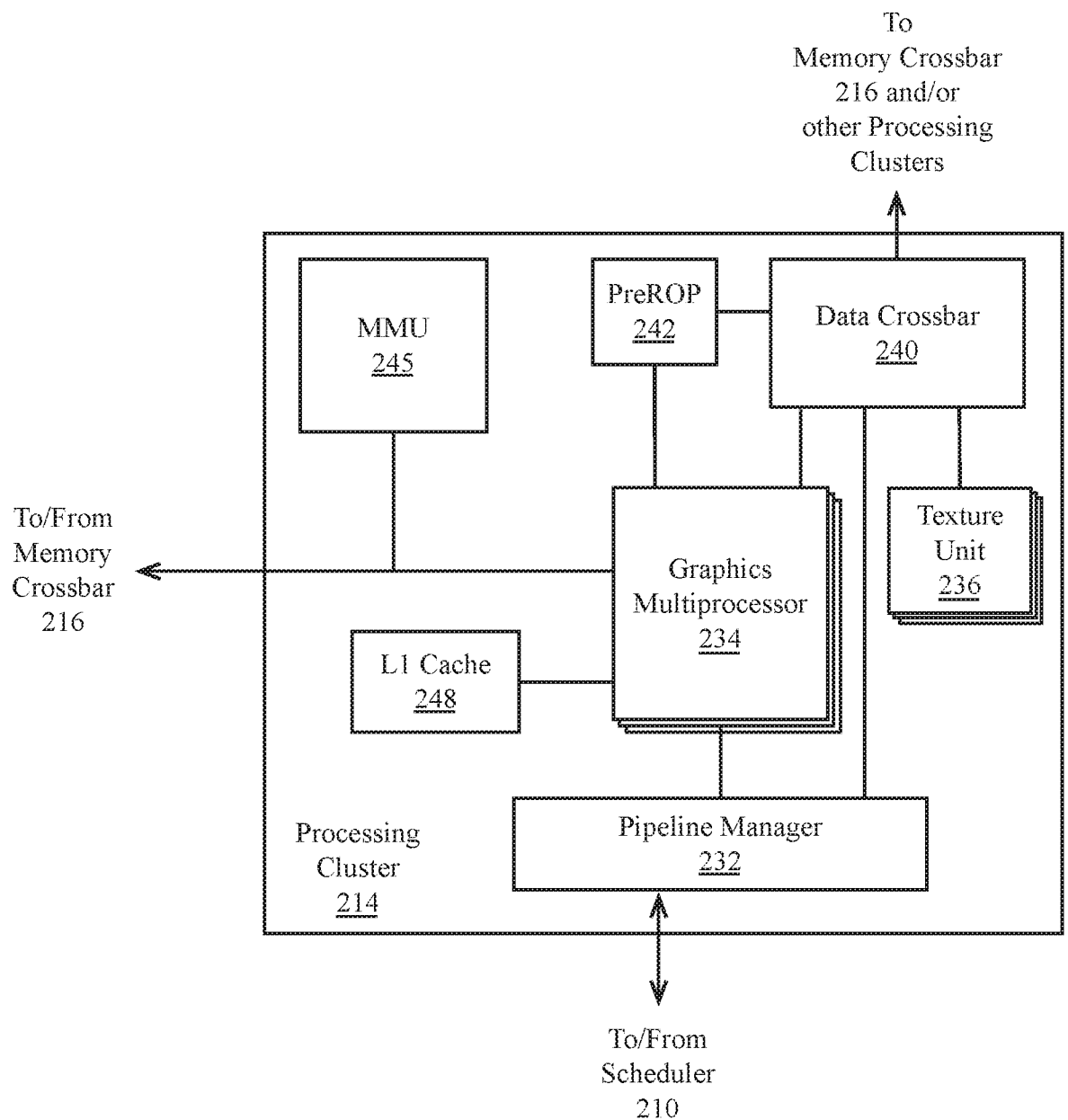

FIG. 2C is a block diagram of a processing cluster 214 within a parallel processing unit, according to an embodiment. In one embodiment the processing cluster is an instance of one of the processing clusters 214A-214N of FIG. 2A. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.), which may be pipelined, allowing a new instruction to be issued before a previous instruction has finished. Any combination of functional execution logic may be provided. In one embodiment, the functional logic supports a variety of operations including integer and floating-point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to the processing cluster 214 constitutes a thread, as previously defined herein, and the collection of a certain number of concurrently executing threads across the parallel processing engines (not shown) within a graphics multiprocessor 234 is referred to herein as a thread group. As used herein, a thread group refers to a group of threads concurrently executing the same program on different input data, with one thread of the group being assigned to a different processing engine within a graphics multiprocessor 234. A thread group may include fewer threads than the number of processing engines within the graphics multiprocessor 234, in which case some processing engines will be idle during cycles when that thread group is being processed. A thread group may also include more threads than the number of processing engines within the graphics multiprocessor 234, in which case processing will take place over consecutive clock cycles. Each graphics multiprocessor 234 can support up to G thread groups concurrently. Additionally, a plurality of related thread groups may be active (in different phases of execution) at the same time within a graphics multiprocessor 234.

In one embodiment the graphics multiprocessor 234 includes an internal cache memory to perform load and store operations. In one embodiment, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
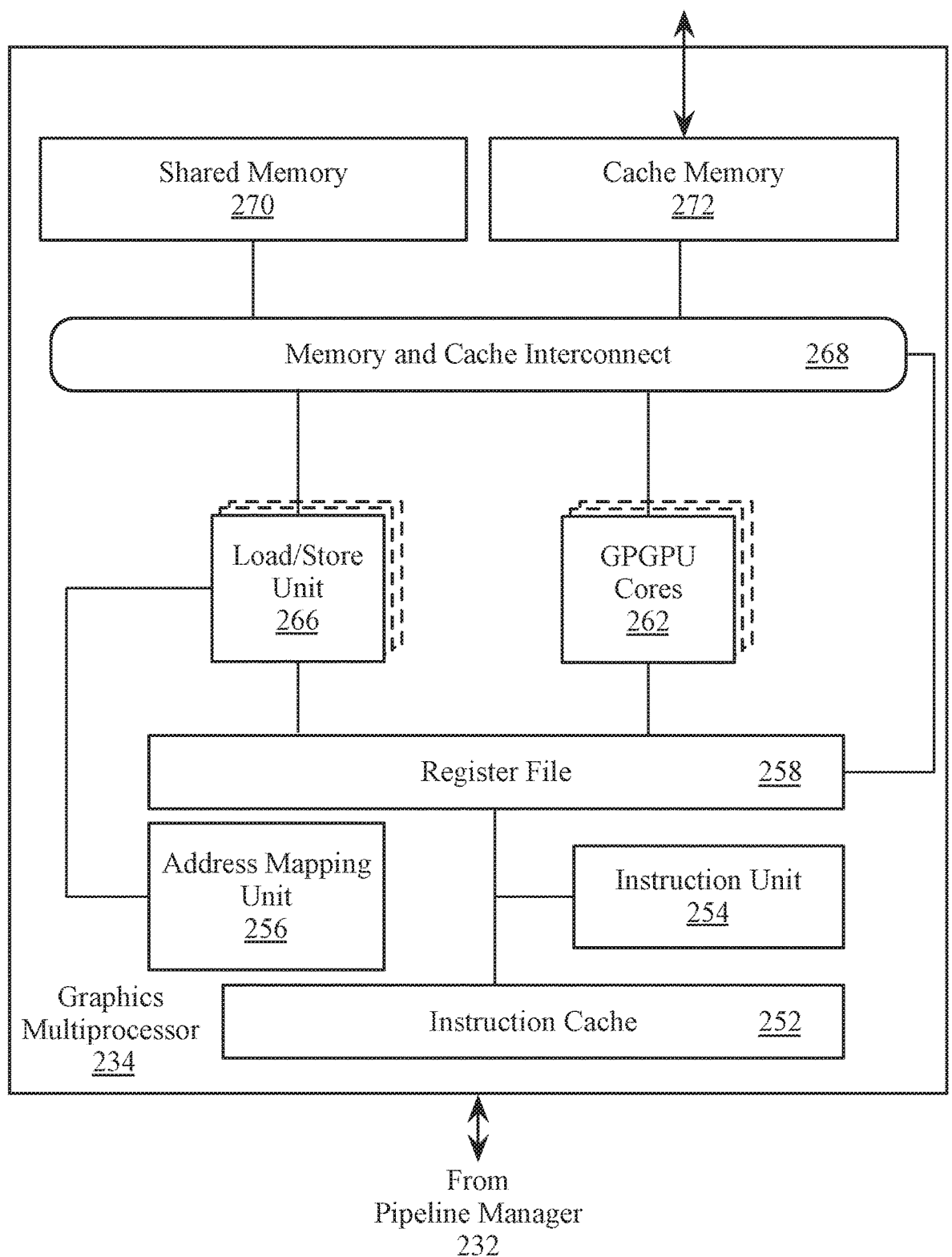

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general-purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. In one embodiment, the register file 258 is divided between each of the functional units such that each functional unit is allocated a dedicated portion of the register file 258. In one embodiment, the register file 258 is divided between the different warps being executed by the graphics multiprocessor 234.

The GPGPU cores 262 can each include floating-point units (FPUs) and/or integer arithmetic logic units (ALUs) that are used to execute instructions of the graphics multiprocessor 234. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment the FPUs can implement the IEEE 754-2008 standard for floating-point arithmetic or enable variable precision floating-point arithmetic. The graphics multiprocessor 234 can additionally include one or more fixed function or special function units to perform specific functions such as copy rectangle or pixel blending operations. In one embodiment one or more of the GPGPU cores can also include fixed or special function logic The memory and cache interconnect 268 is an interconnect network that connects each of the functional units of the graphics multiprocessor 234 to the register file 258 and to the shared memory 270. In one embodiment, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236.

Figure 3A:
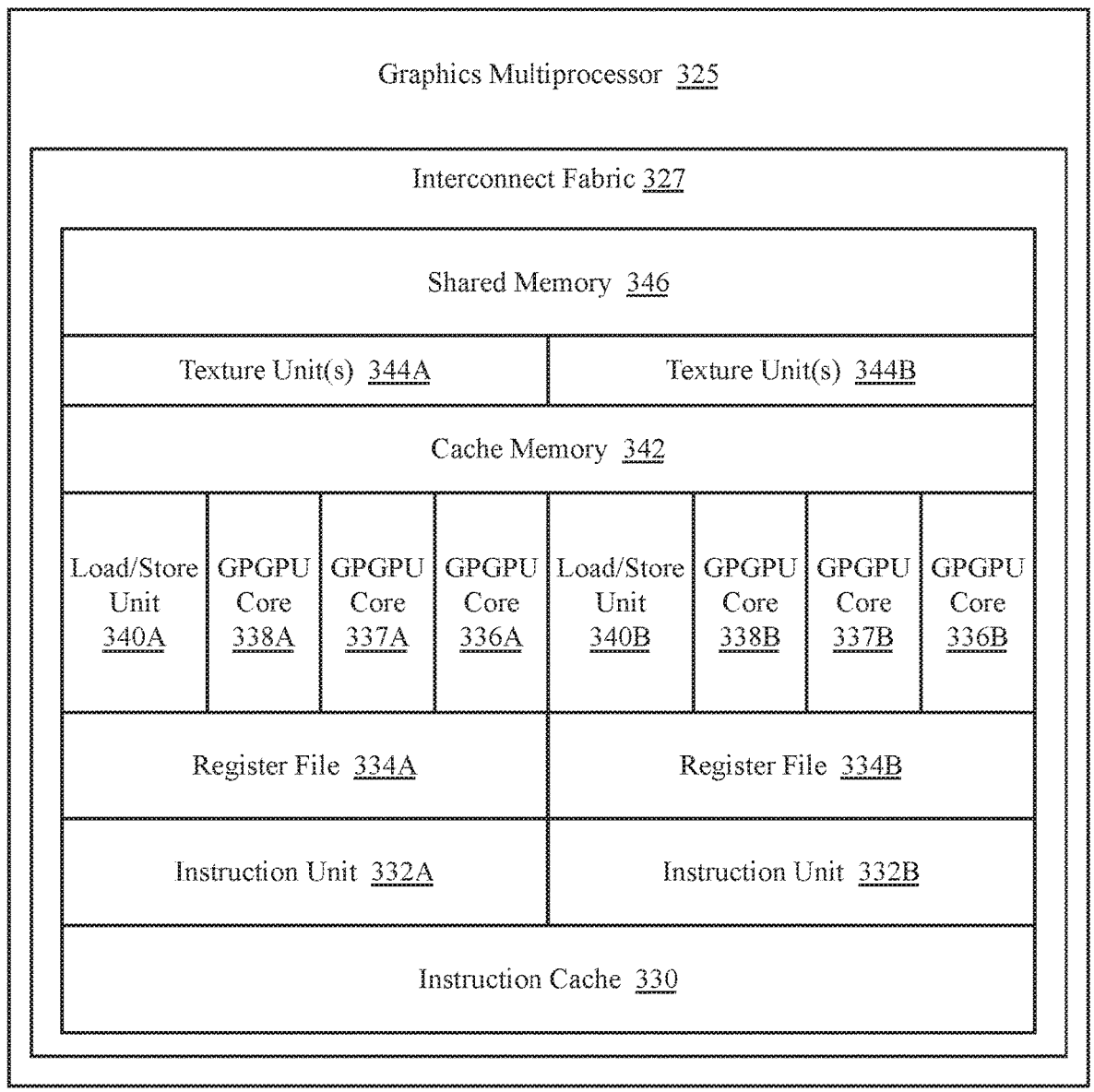
FIG. 3A-3B are block diagrams of graphics multiprocessors, according to embodiments.
Figure 3B:
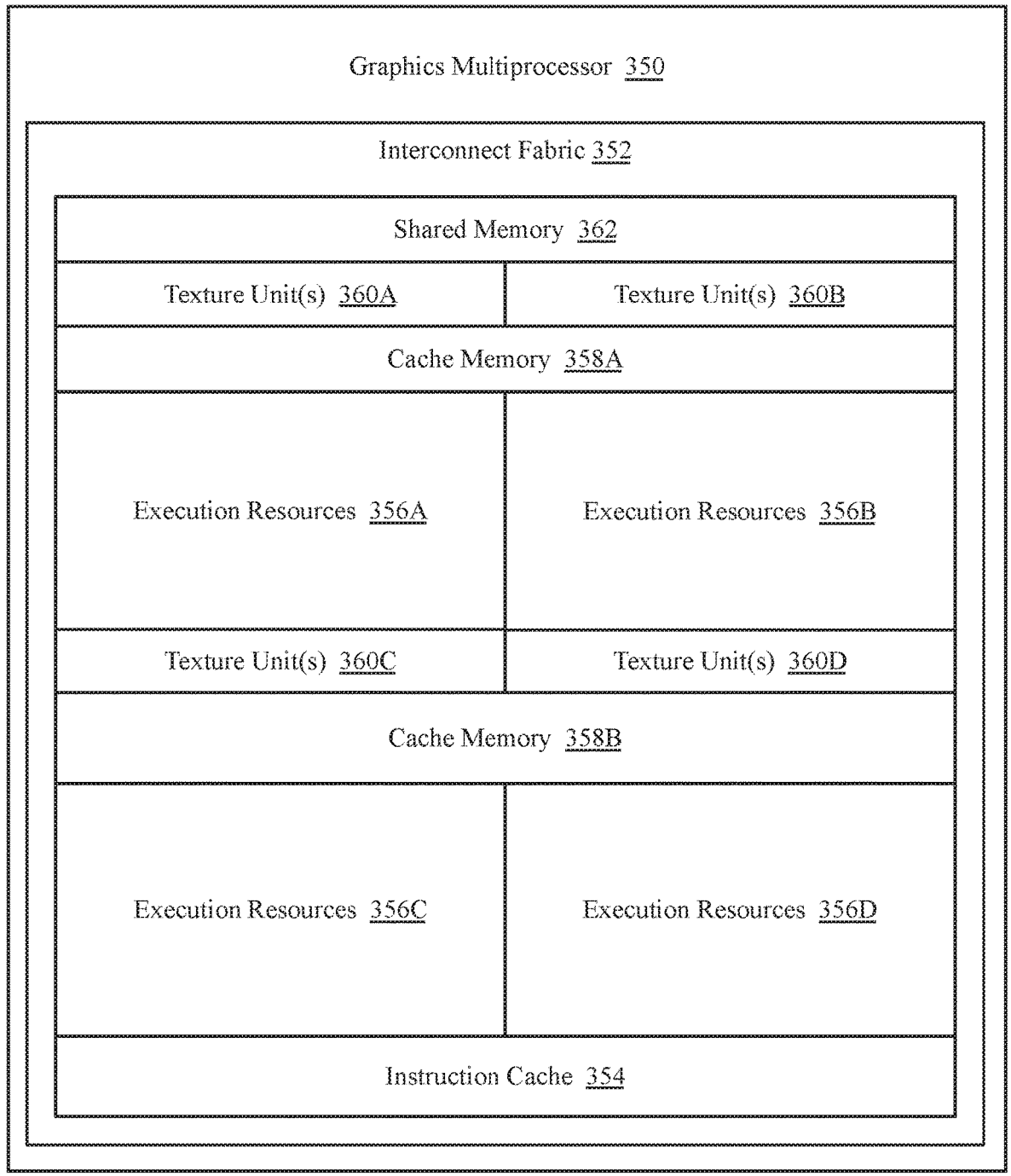

FIG. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment the execution resource units have a common instruction cache 330, texture and/or data cache memory 342, and shared memory 346.

The various components can communicate via an interconnect fabric 327. In one embodiment the interconnect fabric 327 includes one or more crossbar switches to enable communication between the various components of the graphics multiprocessor 325.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 362. In one embodiment the execution resources 356A-356D can share an instruction cache 354 and shared memory 362, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general-purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 4A:
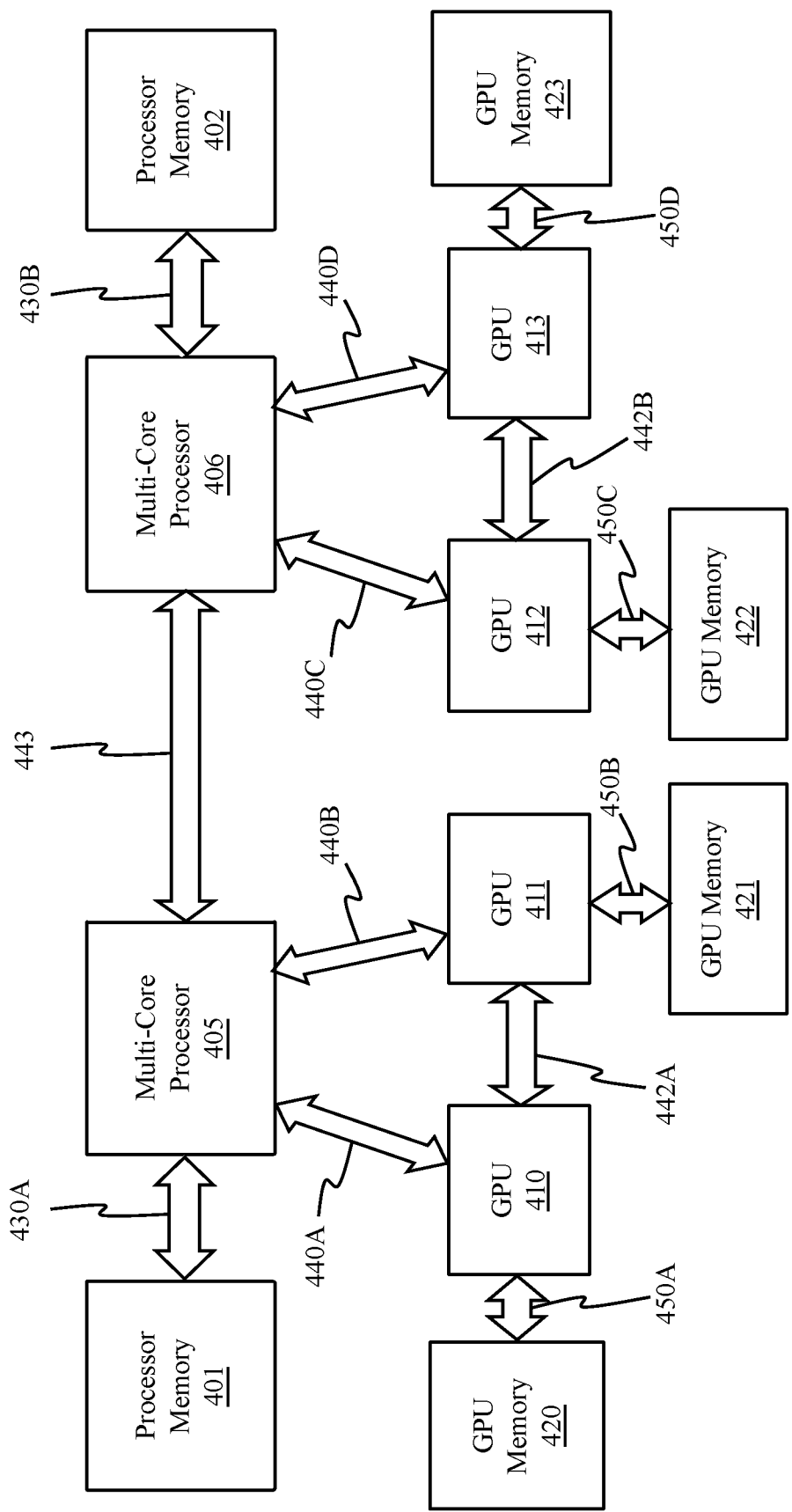
FIG. 4A-4F illustrate an exemplary architecture in which a plurality of GPUs is communicatively coupled to a plurality of multi-core processors.

FIG. 4A illustrates an exemplary architecture in which a plurality of GPUs 410-413 are communicatively coupled to a plurality of multi-core processors 405-406 over high-speed links 440A-440D (e.g., buses, point-to-point interconnects, etc.). In one embodiment, the high-speed links 440A-440D support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 442A-442B, which may be implemented using the same or different protocols/links than those used for high-speed links 440A-440D. Similarly, two or more of the multi-core processors 405-406 may be connected over high speed link 443 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each multi-core processor 405-406 is communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
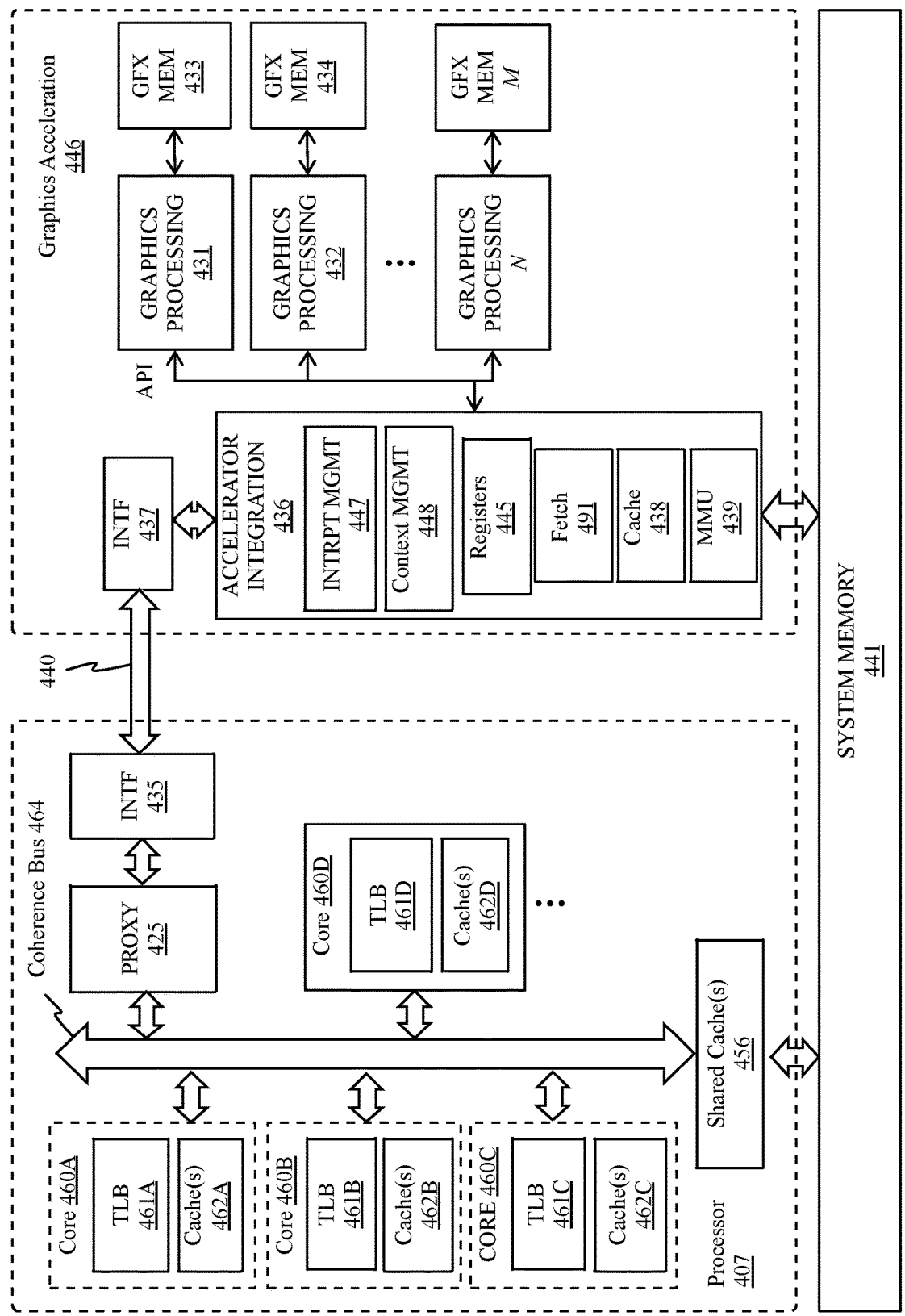

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432, N. In one embodiment, the data stored in cache 438 and graphics memories 433-434, M is kept coherent with the core caches 462A-462D, 456 and system memory 411. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 411 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over the high-speed link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 411.

Figure 4C:
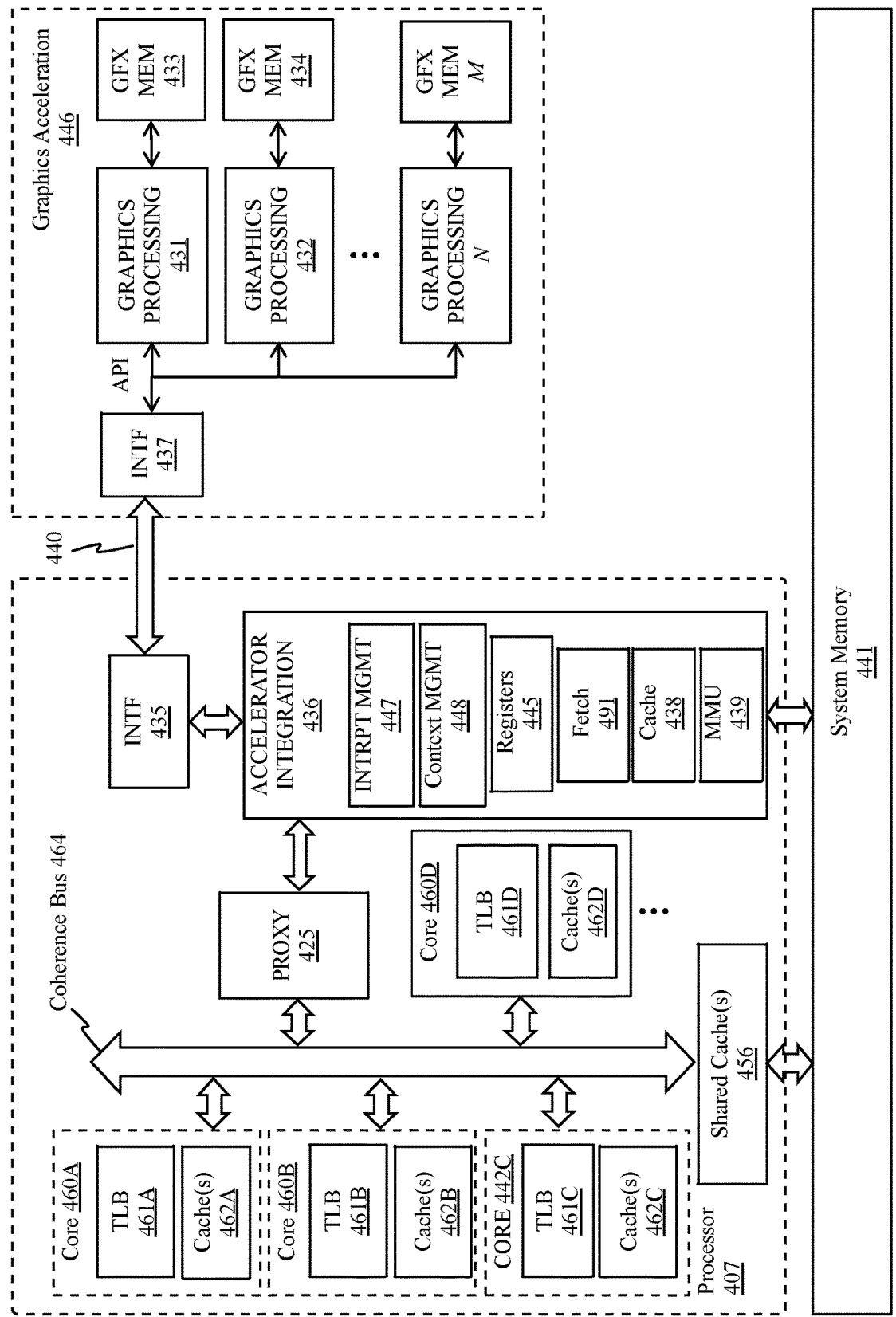

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherency bus 464 and caches 462A-462D, 456.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 411 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
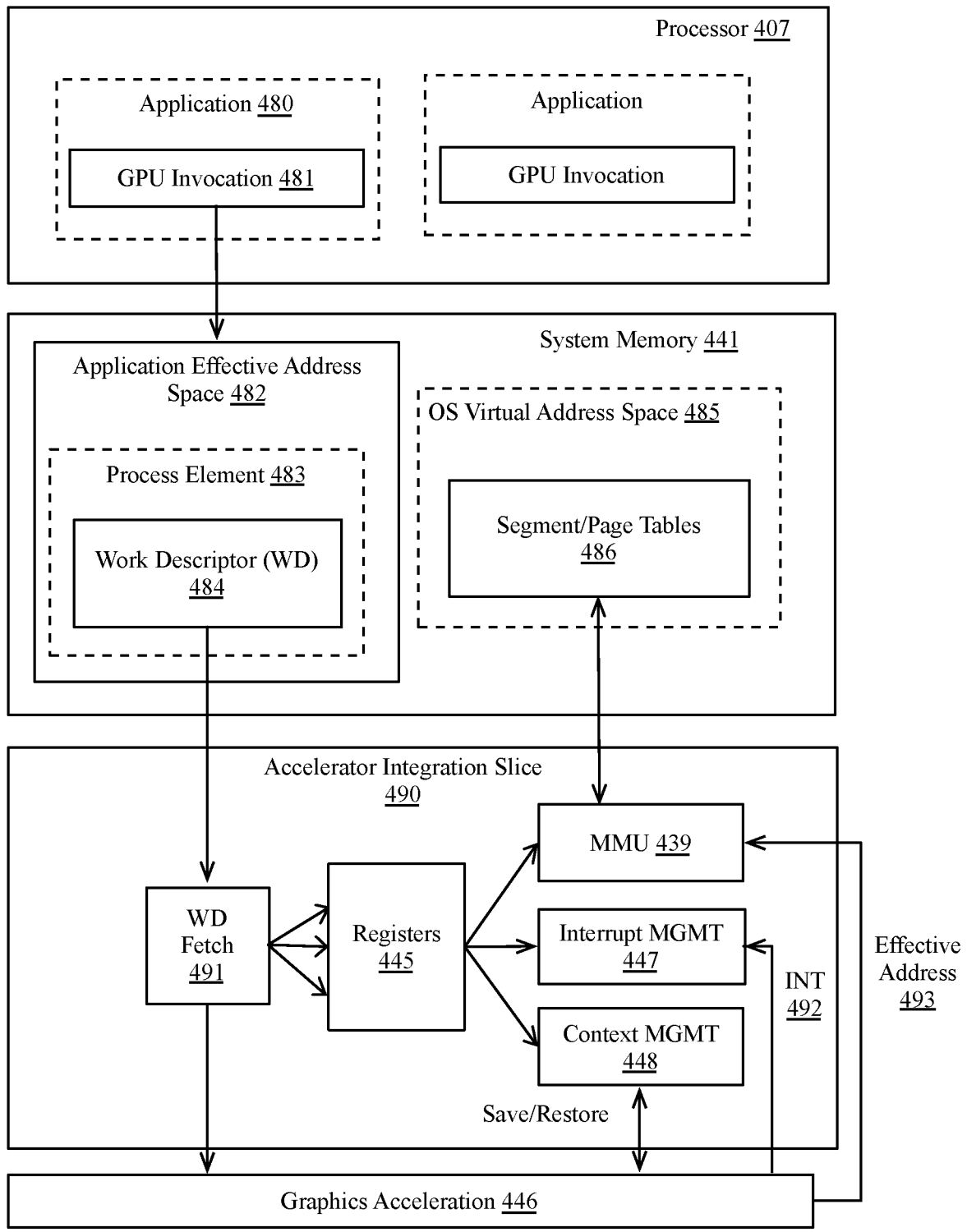

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

Hypervisor Initialized Registers

1  Slice Control Register
2  Real Address (RA) Scheduled Processes Area Pointer
3  Authority Mask Override Register
4  Interrupt Vector Table Entry Offset
5  Interrupt Vector Table Entry Limit
6  State Register
7  Logical Partition ID
8  Real address (RA) Hypervisor Accelerator Utilization Record Pointer
9  Storage Description Register Exemplary registers that may be initialized by the operating system are shown in Table 2.

TABLE 2

Operating System Initialized Registers

1  Process and Thread Identification
2  Effective Address (EA) Context Save/Restore Pointer
3  Virtual Address (VA) Accelerator Utilization Record Pointer
4  Virtual Address (VA) Storage Segment Table Pointer
5  Authority Mask
6  Work descriptor In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
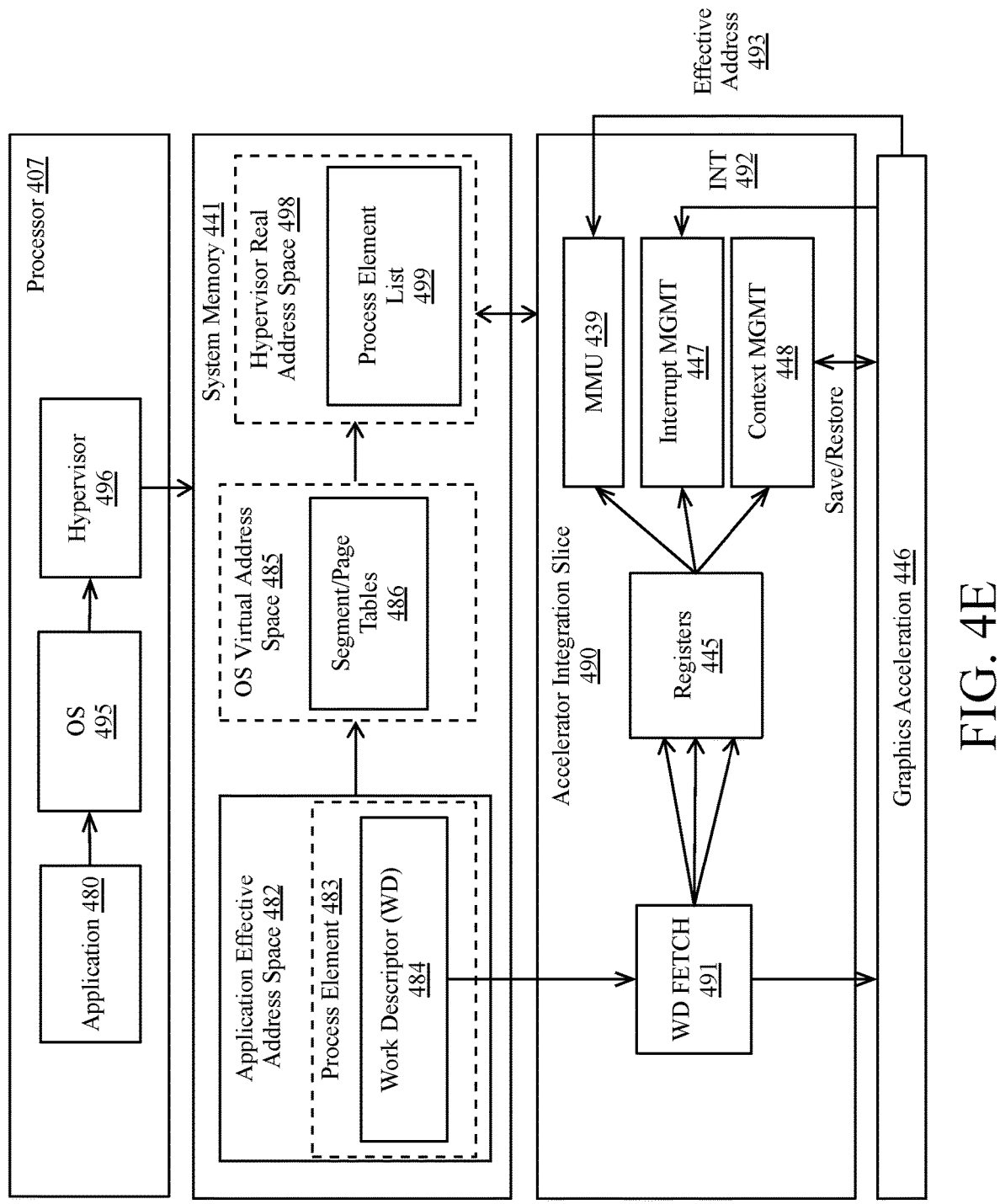

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)

TABLE 3-continued

OS to Hypervisor Call Parameters

5  A virtual address (VA) accelerator utilization record pointer (AURP)
6  The virtual address of the storage segment table pointer (SSTP)
7  A logical interrupt service number (LISN)

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  The virtual address of the storage segment table pointer (SSTP)
7  A logical interrupt service number (LISN)
8  Interrupt vector table, derived from the hypervisor call parameters.
9  A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of accelerator integration slice 490 registers 445.

Figure 4F:
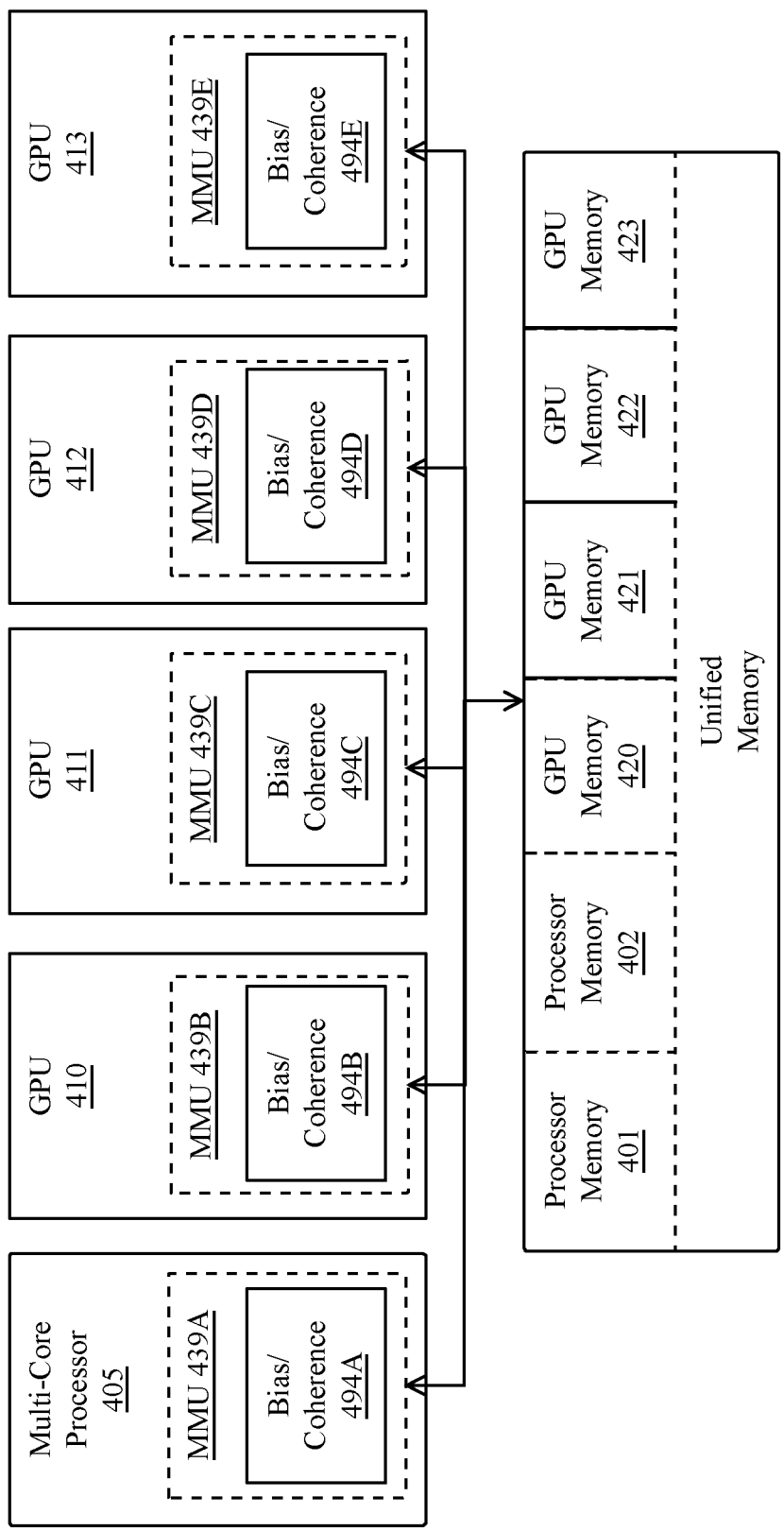

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the processor 405 and GPU 410 it is beneficial to ensure that GPU-biased pages are those which are required by the GPU but not the host processor 405 and vice versa.

Graphics Processing Pipeline

Figure 5:
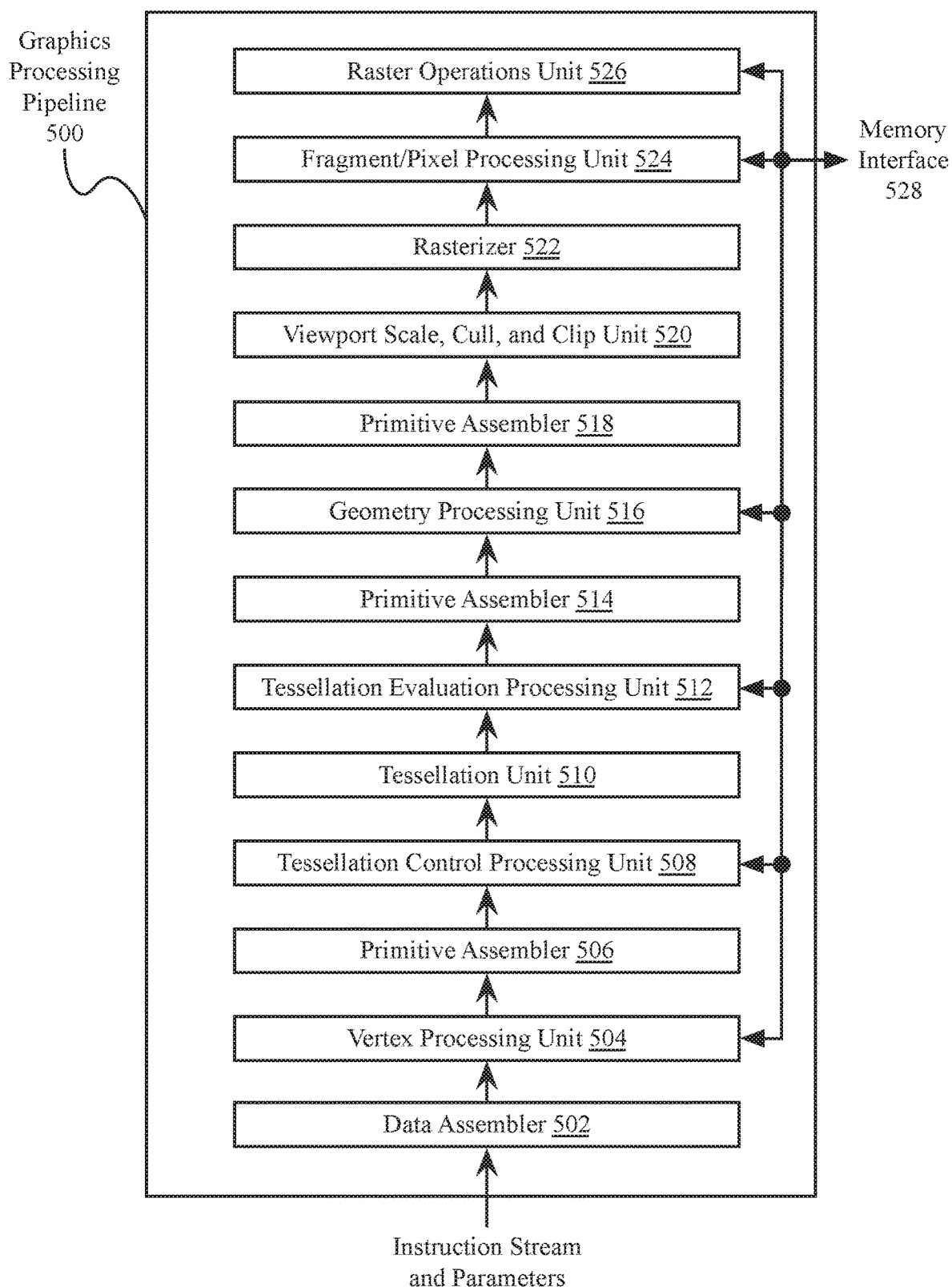
FIG. 5 is a conceptual diagram of a graphics processing pipeline, according to an embodiment.

FIG. 5 illustrates a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2A, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. In one embodiment, one or more portions of the graphics processing pipeline 500 can be performed by parallel processing logic within a general-purpose processor (e.g., CPU). In one embodiment, one or more portions of the graphics processing pipeline 500 can access on-chip memory (e.g., parallel processor memory 222 as in FIG. 2A) via a memory interface 528, which may be an instance of the memory interface 218 of FIG. 2A.

In one embodiment the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110 or for further processing by one of the one or more processor(s) 102 or parallel processor(s) 112. In some embodiments the raster operations unit 526 is configured to compress z or color data that is written to memory and decompress z or color data that is read from memory.

Additional Exemplary GPGPU Multiprocessor and Shared Resources

Figure 6:
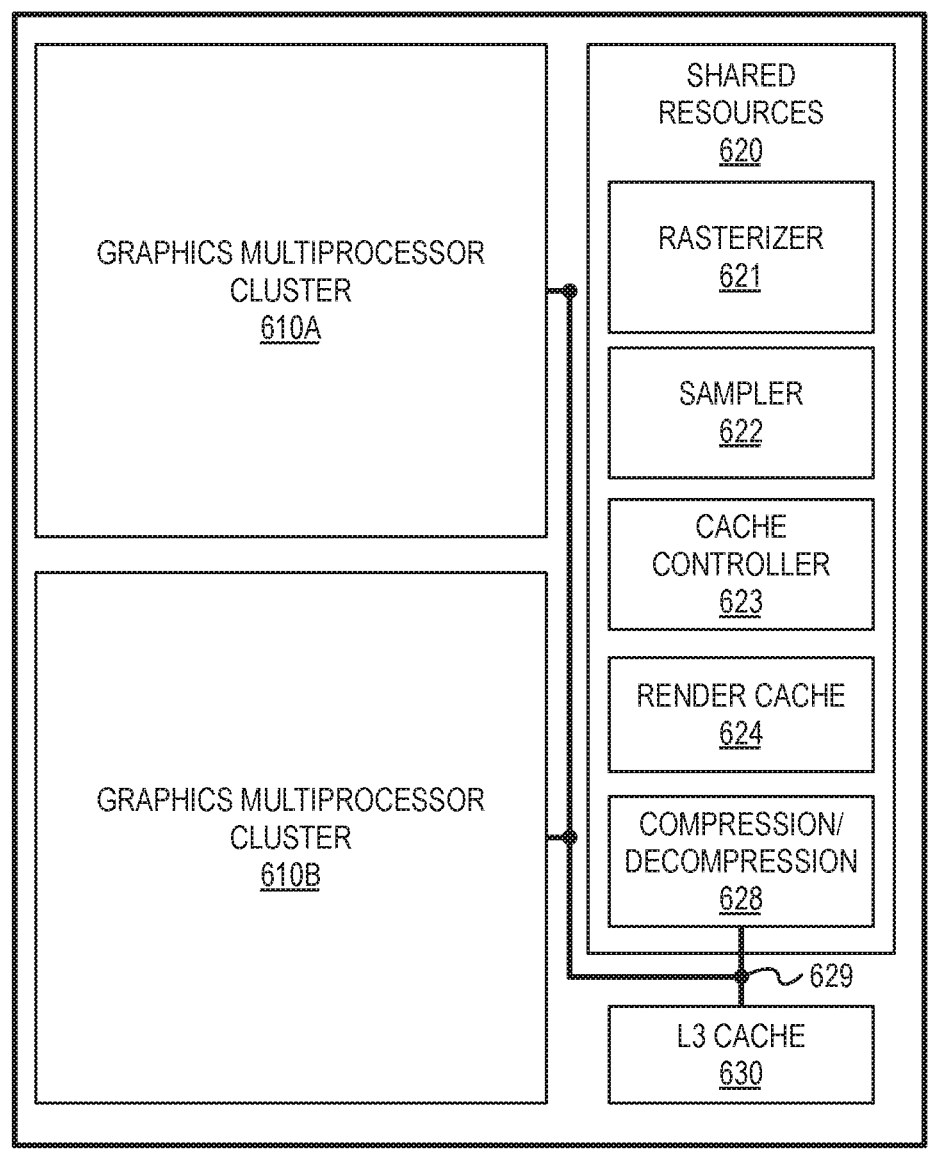
FIG. 6 is a block diagram of a GPGPU, according to an embodiment.

FIG. 6 is a block diagram of a GPGPU 600, according to an embodiment. The GPGPU 600 includes compression/ decompression unit 628, which according to various embodiments, can compress or decompress various types and formats of data at various points along the graphics processor rendering pipeline. The GPGPU 600 includes one or more graphics multiprocessor clusters 610A-610B that may be configured to perform computations to enable various graphics processing operations. While two graphics multiprocessor clusters 610A-610B are illustrated, embodiments are not so limited, as a variable number of processing clusters may be included.

Each of the graphics multiprocessor clusters 610A-610B includes graphics processing and computational logic, such as the logic illustrated in FIG. 2C. In one embodiment the graphics multiprocessor clusters 610A-610B share a set of shared resources 620. The GPGPU 600 additionally includes an L3 cache 630 which can cache memory transactions between caches within the shared resources 620 and a last level cache or system memory. The L3 cache 630 connects with the shared resources 620 via a memory bus 629. In one embodiment the memory bus 629 is a fabric interconnect that couples the L3 cache 630 with the shared resources 620 and the graphics multiprocessor clusters 610A-610B.

In one embodiment the shared resources 620 include a rasterizer 621, a sampler 622, a cache controller 623, a render cache 624, and compression/decompression unit 628. The rasterizer 621 analyzes data representing a geometric object to be rendered by traversing, or walking, a primitive and generating pixel data for each pixel that is part of a geometric primitive to be rendered. The GPGPU 600 can also include a more advanced and/or configurable rasterizer or may additionally include ray tracing acceleration logic to accelerate ray tracing or hybrid rasterization. In one embodiment the rasterizer 621 is a tile-based rasterizer, in which pixels are rendered on the granularity of an image space grid of pixels. Tile-based rasterization can be performed on data stored in tile caches to reduce the number of off-chip memory accesses. The rasterizer 621 can be a variant of the rasterizer 522 of FIG. 5.

The sampler 622 provides texture sampling for 3D operations and media sampling for media operations. The sampler 622 can access render target data stored in the render cache 624, for example, when dynamically rendered textures are in use, or when the graphics processor otherwise has an operational need to sample data from a render target.

The render cache 624 stores render target data to be displayed via display engine or to be used to render subsequent images for display. Data generated by the graphics multiprocessor clusters 610A-610B can be written to the render cache 624, where such data may be readily accessed by other graphics processor components, such as the display engine or the sampler 622. Memory within the render cache is divided into cache lines. The size of the cache lines can vary among embodiments. One embodiment provides for 68-byte cache lines, while another embodiment provides for 64-byte cache lines. In one embodiment the render cache 624 can be configured as a multisample render cache and can store multiple samples of color data per-pixel.

In one embodiment the render cache 624 is controlled by a cache controller 623. The cache controller 623 manages cache line allocation for data to be stored in the render cache 624 and maintains status information for the cache lines of the render cache 624. Components within the graphics processor core can query the cache controller 623 to determine if data for a particular pixel or group of pixels is stored in the render cache 624 to determine which cache lines store such data. In one embodiment the cache controller 623 is also involved in maintaining cache coherence between the render cache 624 and other caches in the graphics processor. In one embodiment the render cache 624 is fully associative (e.g., m-way set associative).

A compression boundary for compressed data can be configured such that data is compressed or decompressed before transiting a specific boundary in the memory hierarchy. For example, data can be stored in a render cache 624 in a compressed format or can be decompressed before being written to the render cache 624. In one embodiment a compression operation can be performed by the compression/decompression unit 628 to compress the data that is evicted from the render cache 624 before the data is written to the L3 cache 630 and/or system memory via the memory bus 629. Whether data is stored in a compressed or uncompressed format at a given location in memory may be determined based on whether graphics processor components that will consume the data from a given memory unit support reading data in a compressed format.

In one embodiment, tile-based compression is used, in which pixel data for an N×M tile is pixels is stored in cache or in memory in a compressed state. Various tile sizes may be used, including but not limited to an 8×4 tile or a 4×4 tile of pixels. Accompanying compressed data is compression metadata which maintains a compression status for a given cache line or tile. The compression metadata can include one or more bits per tile, cache line, cache block, etc., to indicate status such as compressed or uncompressed, or to indicate the form of compression that is in use. In many lossless compression implementations, if the input data cannot be compressed to the desired compression ratio without data loss, the data may be output or stored in an uncompressed state.

Many different compression techniques can be applied to data generated by the GPU, such as color data, depth (e.g., Z) data, or other buffers written or otherwise output via the GPU. In addition to GPU generated data, the GPU consumes some static data during the rendering operations. This static data is read-only data from the GPU perspective and includes, but is not limited to static texture buffers, vertex buffers, constant buffers, uniform buffers, or other static or constant input buffers to the GPU. The static read-only data may also be constant data used by a compute shader or other general-purpose parallel computation logic within the GPU. Memory surfaces containing such data can be compressed once and used in multiple frames or multiple shader instances if the data can be compressed without data loss. Metadata can be associated with the compressed data to indicate a compression status (e.g., compressed or uncompressed) for the data. When a static (e.g., read only) resource is bound to a GPU pipeline, the corresponding meta-data is also bound. In one embodiment the metadata binding is performed via a bindless resource scheme. In one embodiment the metadata can be bound via legacy resource binding. Compression and decompression of the data can be performed on the fly and in real time, reducing the memory bandwidth required to load and store static or read-only data streams.

Multisample Anti-Aliasing on a GPGPU

The pixel output from the rendering of geometric primitives may result in distortion artifacts known as aliasing. Aliasing can result whenever a high-resolution image is represented at a lower resolution. Anti-aliasing removes signal components that have a higher frequency than can properly be resolved via the rendered samples. In the specific case of triangle rasterization, aliasing can result is jagged edges in rendered images. Anti-aliasing improves the appearance of rendered edges by smoothing the rendered results. The specific case of multisampling anti-aliasing, multiple locations are sampled for every pixel. Each sample represents a potential output color for the pixels. If a triangle to be rasterized covers multiple sample locations within a pixel, a shading computation is performed for the samples and the results are combined to generate an output color for the pixel.

Figure 7:
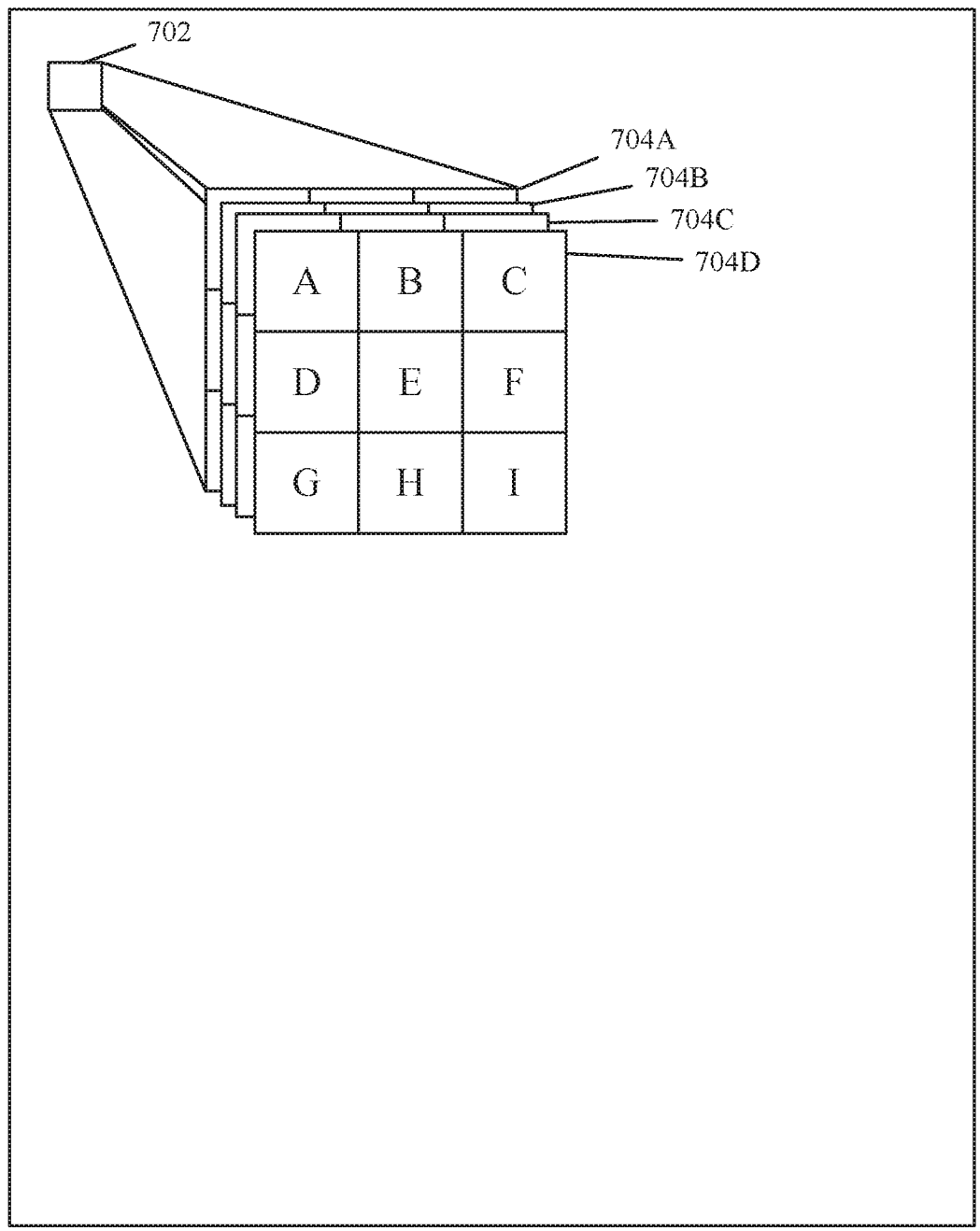
FIG. 7 illustrates an exemplary memory layout for a multisample render target.

FIG. 7 illustrates an exemplary memory layout for a multisample render target. A multisample render target can store multiple samples output for each pixel. In some existing multisample render target implementations, pixels can be represented in a planar format, in which each set of samples is stored in a separate memory plane. FIG. 7 illustrates 4×MSAA in which four samples are used per pixel. A 3×3 pixel tile 702 of nine pixels (A-I) is represented.

While a 3×3 pixel tile 702 of nine pixels is illustrated, the pixel tile 702 may include any number of pixels. For example and in one embodiment the pixel tile 702 may be an 8×4 pixel tile including 32 pixels. Each set of samples for the tile can be stored in a separate plane (e.g., planes 704A-704D). In one embodiment the number of plane that are allocated is determined by the number of distinct colors associated with the various samples. For example, if the four samples have four different color values, four color plane are used. If a single value is present for all samples, only a single value is stored in a single plane. Before a final image is output, an MSAA resolve operation is performed on the tile in which the color values for each sample of a pixel are combined. If only a single value is stored for a pixel, the resolve operation uses the single value. In one embodiment, if multiple different color values are stored for differing samples for a pixel, the color values may be averaged.

As illustrated in FIG. 7, conventional MSAA techniques store the multiple samples for a pixel in multiple memory planes, where each plane is configured and regarded as a block of contiguous memory. Some implementations of conventional MSAA pre-allocate all required planes for a block of pixels and stores the required sample color data as necessary. This technique requires the MSAA module to expend resources scanning the block of pixels to determine the number of planes that are to be allocated, which can be expensive in terms of time and system resources. Embodiments described herein perform MSAA plane allocation without requiring pre-review of the planes to be allocated. Instead, planes are allocated in a progressive manner, with additional memory planes allocated only when needed.

Figure 8:
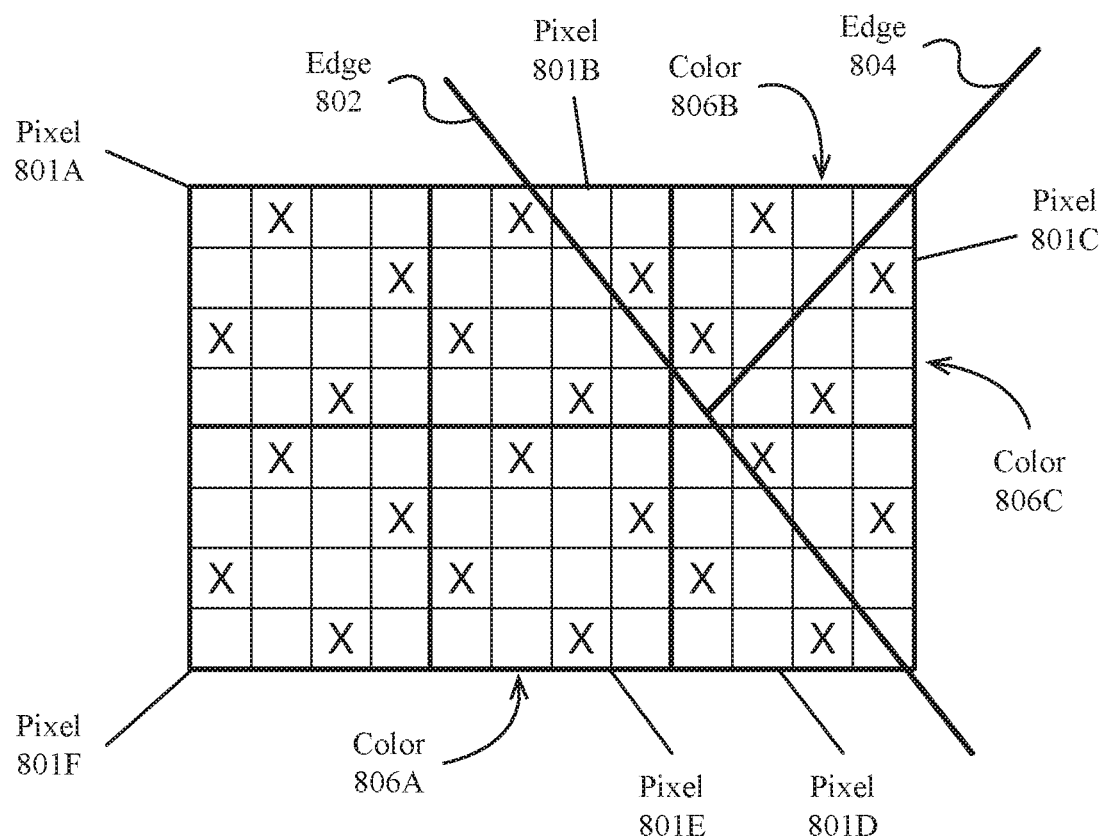
FIG. 8 illustrates MSAA compression, according to an embodiment.

FIG. 8 illustrates MSAA compression, according to an embodiment. Multiple MSAA planes are used for storing color data samples, where each plane is configured and regarded as a block of contiguous memory. Instead of performing a full allocation of the maximum number of planes that may be needed (e.g., four planes for 4×MSAA, eight planes for 8×MSAA, etc.) only the necessary number of planes are allocated. Allocating only the necessary number of planes can reduce the overall size of a multisample render target by avoid allocating memory that is not necessary to store all information for the render target. Less than the full number of planes can be allocated because, for a given pixel, it is possible that all samples of the pixel have the same color.

In one embodiment, samples color values are stored in a decoupled manner, such that instead of allocating N memory planes for N×MSAA, the sample values for each pixel are mapped to a sample storing the appropriate color data. A 3×2 block of pixels is illustrated in which the six pixels 801A-801F are intersected by two edges (e.g., edge 802, edge 804). The edges are associated with geometric primitives that cover the illustrated sample points (X) for each pixel 801A-801F. For the illustrated pixels 801A-801F, edge 802 and edge 804 delimit three geometric objects having three colors 806A-806C. The specific color values are not material. The key concept is that the illustrated edges create a scenario in which samples of the pixels 801A-801F can be associated with one of three colors 806A-806C. As three colors are associated with the block of pixels, only three planes are necessary to store color data for the four samples per pixel.

The coverage for the sample can be used to determine the color is associated with the sample. If a pixel is completely inside a triangle being rendered, then all color samples within the pixel will have the same color. Instead of storing duplicate color values for each pixel a multisample control surface 808 can be allocated to store a set of index values that map the samples for the block of pixels to the plane storing the associated color value. For example, pixel 801A is entirely within edge 802. Accordingly, all samples of pixel 801A have color 806A. This detail is also true for pixel 801E-801F. Because pixels 801A, 801E, and 801F only store a single color, only a single plane is needed. Accordingly, the multisample control surface 808 can indicate that each of sample 0-3 of pixels 801A, 801E, and 801F are stored in plane 0. Plane 0 can then be used to store color 806A.

However, Pixel 801B-801D are intersected by at least one of edge 802 or edge 804. Edge 802 intersects pixel 801B, pixel 801C, and pixel 801D, while edge 804 intersects pixel 801C. Due to this intersection, three samples of pixel 801B have color 806A, while one sample of pixel 801B has color 806B. Specifically, numbering the samples from left to right, samples 0-2 have color 806A and sample 3 has color 806B. Accordingly, the multisample control surface 808 can indicate that pixel 801B has sample data stored in plane 0 for samples 0-2, while sample data for sample 3 is stored in plane 1 (01b). Pixel 801C has samples 0-1 with color 806B and samples 2-3 with color 806C. Color 806B can be stored in plane 1, while color 806C can be stored in plane 2 (0b10), as indicated by the multisample control surface 808. Pixel 801D has samples 0-1 having color 806A and samples 2-3 having color 806C. Accordingly, sample data for pixel 801D, as indicated by the multisample control surface 808, can store sample data in plane 0 (0b00) for sample 0-1 and plane 2 (0b10) for samples 2-3. Using this technique, memory bandwidth requirements for MSAA can be significantly reduced.

Figure 9:
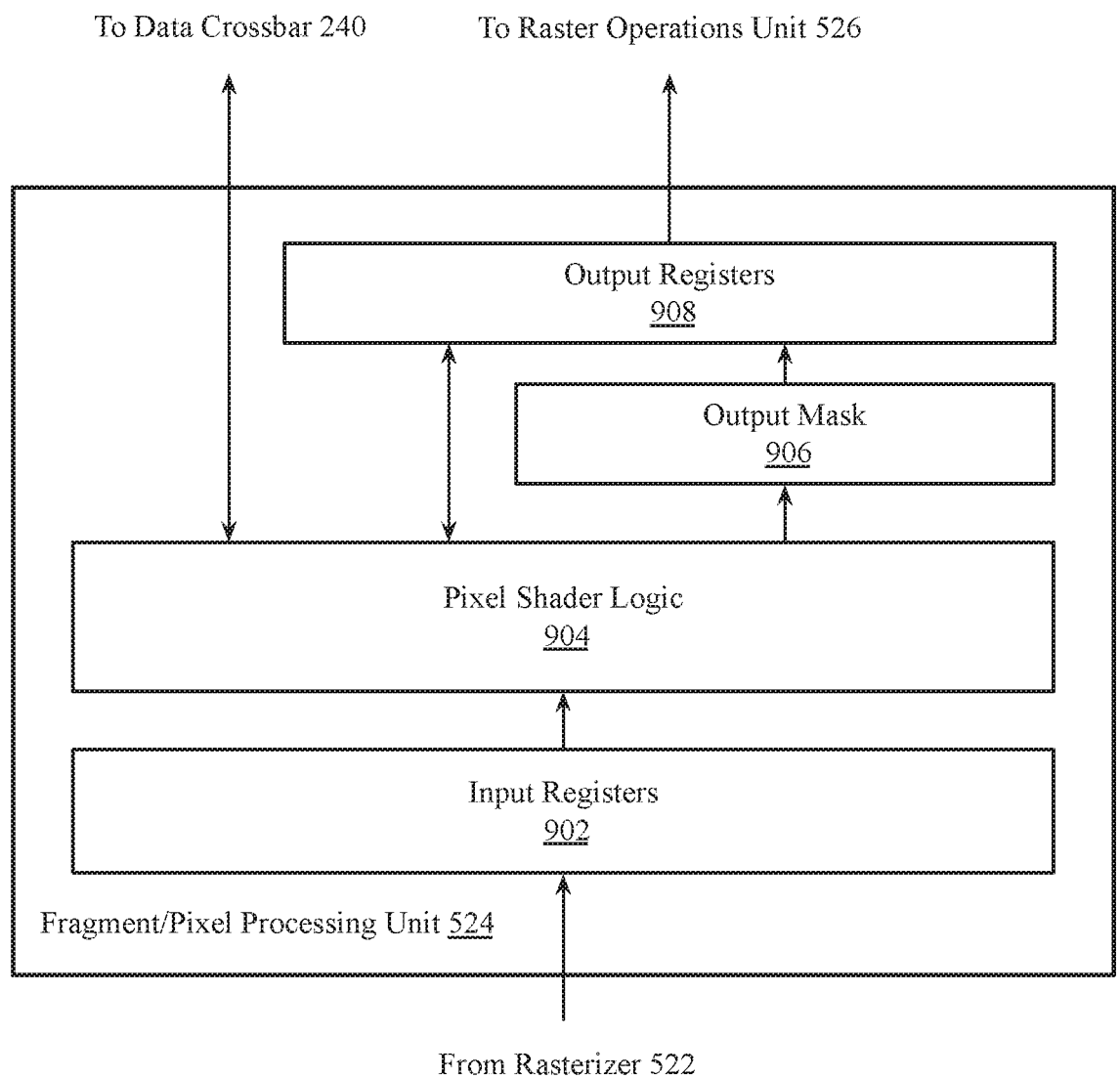
FIG. 9 is an illustration of fragment/pixel processing unit, according to an embodiment.

FIG. 9 is an illustration of fragment/pixel processing unit, according to an embodiment. The fragment/pixel processing unit 524, also shown in FIG. 5, includes a set of input registers 902 that receive input data from the rasterizer 522 of FIG. 5. The input data includes fragment and coverage data that represents a rasterized portion of a primitive. The fragment data can be associated with a specific sample location within a pixel. The fragment data can include details such as a window space location of the fragment, clipping data associated with the fragment, multisample coverage masks when MSAA is enabled, and any other data that can be used to generate output color data for a pixel or sample associated with the fragment. The input data can be read from the input registers 902 by pixel shader logic 904.

The pixel shader logic 904 can perform various mathematical operations to map or blend texture and color data onto the input fragments. Based on the input data, the fragment can be shaded or can be discarded. The pixel shader logic 904 can communicate with a data crossbar 240 to access memory or other components of the graphics processing logic. The pixel shader logic 904 can use compute units within the GPU to perform the shading operations. Threads on the compute units are used to execute shading code that defines the pixel shader logic 904. Groups of threads can be dispatched to the compute units to perform numerous shading operations in parallel. The pixel shader logic 904 can write results from the shading operations to output registers 908. In various configurations, threads can be dispatched from the shader logic 904 on a per-pixel or a per-sample basis, where a pixel shader thread is executed once for each pixel or once for each sample within a pixel. For per-sample dispatch, an output mask 906 can be used to specify the samples for which the output is to be associated. The data in the output registers 908 can then be transmitted to a render cache, then evicted to the render target in memory. While FIG. 9 illustrates pixel shader logic 904, the fragment/pixel processing unit 524 of FIG. 5 can also be configured to perform other shading operations. In one embodiment the fragment/pixel processing unit 524 is part of a unified shader architecture and can be used to perform computations for vertex shaders and compute shaders as well as pixel or fragment shader programs.

Progressive Multisample Anti-Aliasing (MSAA)

Figure 10:
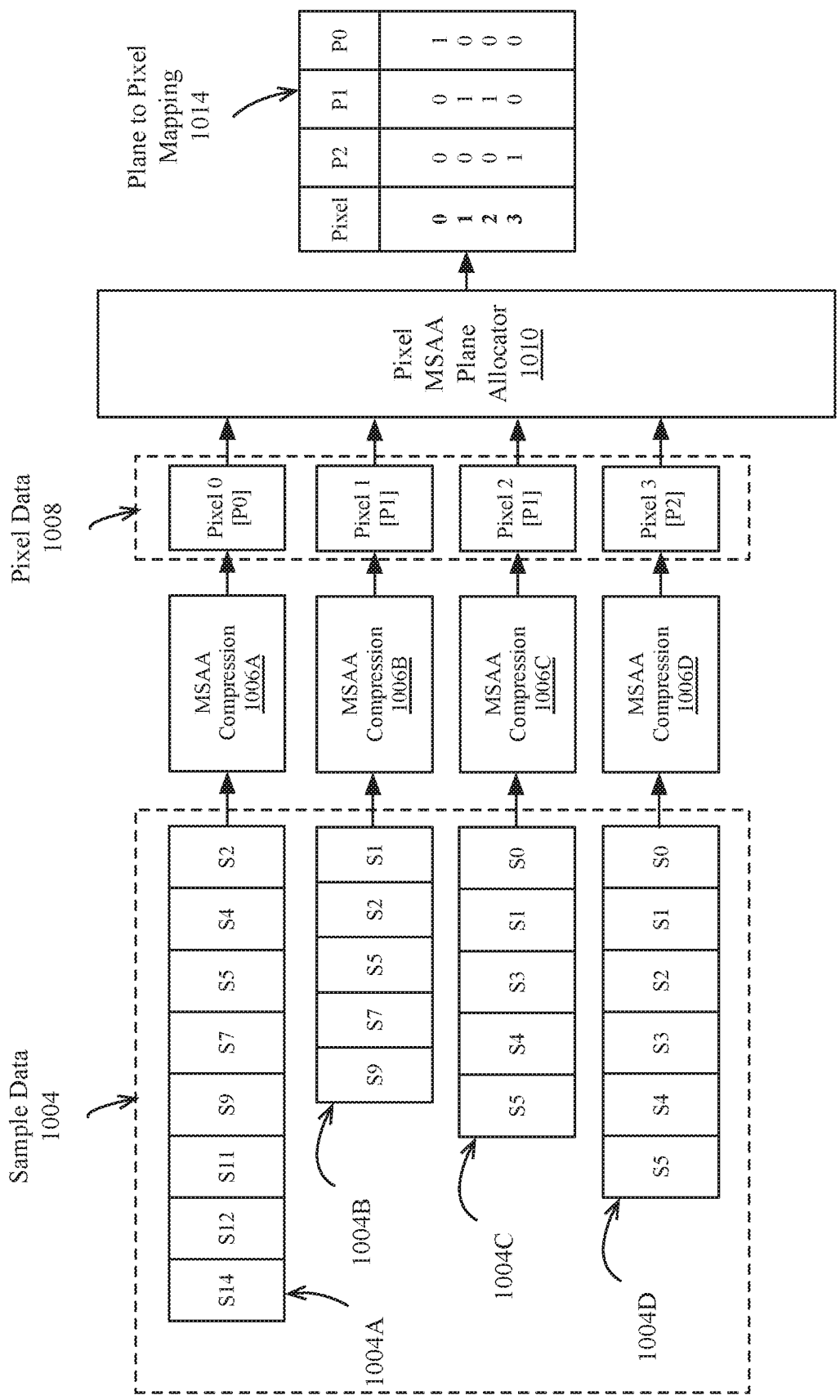
FIG. 10 illustrates progressive MSAA plane allocation, according to an embodiment.

FIG. 10 illustrates progressive MSAA plane allocation, according to an embodiment. In conventional MSAA techniques, when performing MSAA data compression an initial calculation is performed to determine the number of planes that are to be allocated for the render target. The necessary planes are then allocated to enable access merges across multiple pixels. However, such techniques are required to pre-determine the planes to be allocated, which may be an inefficient operation and consumes unnecessary system resources. Embodiment described herein can perform MSAA plane allocation without expensing computational time and system resources to review the planes to be allocated. This technique reduces the required amount of logic gates required to implement MSAA plane allocation and has a lower power consumption relative to previous techniques.

As illustrated, a pixel MSAA plane allocator 1010 is configured to perform per-pixel memory plane allocation for multiple pixels in parallel. Sample data 1004 (e.g., 1004A-1004D) determined by pixel shader logic can be processed by MSAA compression logic within MSAA compression modules 1006A-1006D to reduce the amount of data required to be transmitted to a multisample render target. The MSAA compression modules 1006A-1006D are configured to choose the lowest order plane available to store the sample data. The lowest order plane is the lowest plane number that is referenced by the samples for a pixel. For example, if sample data 1004A for pixel 0 references plane 0 [P0] and plane 1 [P1], MSAA compression module 1006A will select plane 0 [P0] for allocation for the pixel input for pixel 0. If sample data 1004B for pixel 1 references plane 1 [P1] and plane 2 [P2], then MSAA compression module 1006B will select plane 1 [P1] for allocation. If sample data 1004C for pixel 2 references plane 1 [P1] and plane 3 [P3], then MSAA compression module 1006C will select plane 1 [P1] for allocation. If sample data 1004D for pixel 3 references plane 2 [P2] and plane 3 [P3], then MSAA compression module 1006D will select plane 2 [P2] for allocation. The selected lowest order planes define the pixel inputs 1008 that are supplied as pixel data 1008 to pixel MSAA plane allocator 1010.

Instead of allocating all planes in an initial pass, the pixel MSAA plane allocator 1010 performs allocation in a progressive manner. Planes for each pixel are allocated from lowest order to highest order and an allocation merge can be performed for multiple pixels that require allocation for the same plane. The plane to pixel mapping 1014 illustrates the planes allocated for pixel data 1008 that is handled by the pixel MSAA plane allocator 1010. For a first cycle, pixel 0 allocates space for plane 0 [P0]. During a second cycle, an allocation merge can be performed to allocate plane 1 [P1] for both pixel 1 and pixel 2. During a third cycle, plane 2 [P2] is allocated for pixel 3. As shown in the pixel mapping 1014, pixel 1 and pixel 2 reference plane 1 [P1]. Accordingly, the allocation for pixel 1 and pixel 2 can be performed during the same cycle, reducing the amount of time required to perform plane allocations for the pixel. If, for example, all the pixels of the pixel inputs 1008 were to reference the same plane, for example, plane 0, then the allocation for all the pixels can be performed in a single cycle. In one embodiment accumulated data from the plane to pixel mapping 1014 can be used to create the multisample control surface 808 in FIG. 8. The multisample control surface can be used to unpack the sample data during subsequent processing of the multisample render target to which the multisample data is to be written. In one embodiment, when the MSAA compression modules 1006A-1006D consistently detect only plane 0 [P0] allocations, the MSAA compression modules can request a lower bus frequency to reduce system power consumption.

Lossless Compression of MSRT Data Alongside Fragment Compression

In one embodiment, lossless color compression is combined with MSAA sample compression. To combine lossless compression with MSAA compression, multiple control surfaces are used. A first control surface (e.g., the multisample control surface) is used to specify the location of the sample data for the pixels. An additional control surface can be associated with each plane that is allocated to maintain compression related metadata for each allocated plane. The compression metadata can specify a compression status for the plane to indicate whether the data for the plane is compressed or uncompressed. In one embodiment the compression metadata can also specify a clear status for the plane to indicate whether the plane data has been set to a clear color.

Figure 11:
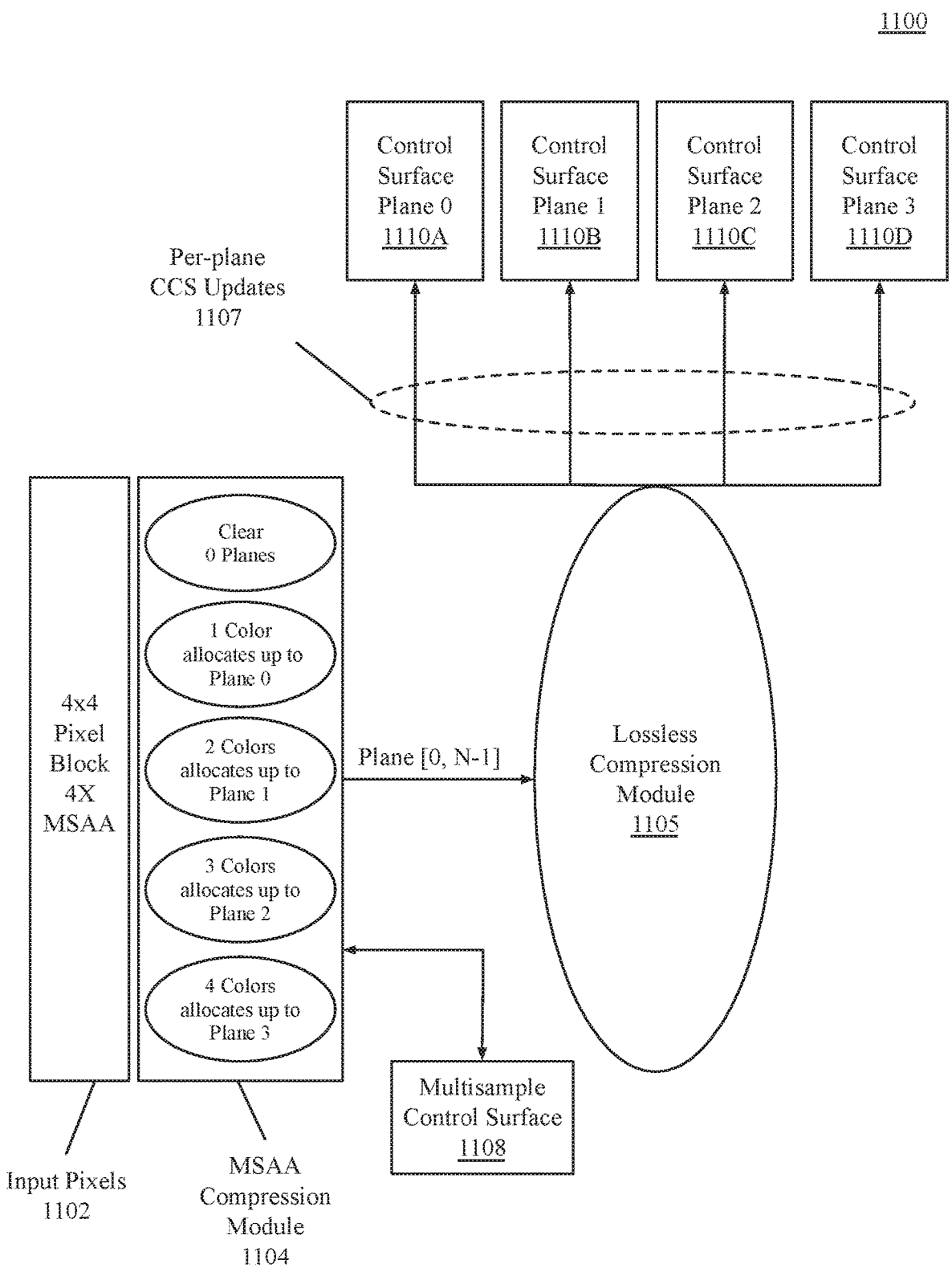
FIG. 11 illustrates a system to implement lossless compression of data within a multisample render target, according to an embodiment.

FIG. 11 illustrates a system 1100 to implement lossless compression of data within a multisample render target, according to an embodiment. To perform MSAA compression, for example, as illustrated in FIG. 8, a set of input pixels 1102 can be processed by an MSAA compression module 1104. The MSAA compression module 1104 can be similar to the MSAA compression modules 1006A-1006D as in FIG. 10. The MSAA compression module 1104 can examine the number of colors that are to be stored for the various samples of the set of input pixels 1102. The illustrated set of input pixels is a 4×4 block of pixels, although embodiments are not so limited. The pixel data for the set of input pixels can be written to a render cache, such as the render cache 624 in FIG. 6. Upon eviction from the render cache, the set of input pixels can be processed by the MSAA compression module 1104 to compact the sample data by storing only the unique color values that are contained within the set of input pixels.

As described with respect to FIG. 8, planes can be allocated based on the number of different colors in the block of pixels. Additionally, planes can be allocated in a progressive manner, as illustrated in FIG. 10. Up to N planes may be allocated (0, N−1) for N×MSAA, as for a given set of pixels, up to N colors may be present. N control surfaces can be allocated for each plane to store a per-plane compression status for the plane. For example, for 4×MSAA, up to 4 planes and 4 control surfaces 1110A-1110D can be allocated to store a compression status for each plane. A mapping between samples and planes can be generated and stored in a multisample control surface 1108, which can be a variant of the multisample control surface 808 as in FIG. 8.

After the MSAA compression module 1104 compresses the sample data, a lossless compression module 1105 can perform lossless compression on the individual planes. The specific lossless compression algorithm can vary and the target compression ratio can vary based on the compression algorithm and the input data. In one embodiment, multiple compression algorithms can be tested against the pixel data and the compression algorithm that achieves the highest compression ratio can be used. In such embodiment, the control surface associated with the plane containing the compressed data can be updated to indicate a compressed status for the plane as well as a codec used to compress the data. In one embodiment, the lossless compression module 1105 will attempt to compress the pixel data to a target compression ratio and, if the target compression ratio cannot be achieved, the pixel data will be stored in an uncompressed format. In such embodiment, if the pixel data for a plane cannot be compressed, the associated control surface 1110A-1110D for the plane will be updated to indicate that the plane data is stored in an uncompressed format. In general, for each plane a set of per-plane compression control surface (CCS) updates 1107 are performed up indicate a compression status for each plane.

In one embodiment if all pixels in a block of pixels are clear, no memory may be required, as metadata can indicate that the block of input pixels has been cleared to the clear color. In such scenario, a clear color sampling rendering mechanism can be used in which pixel data that has been cleared to a pre-defined clear color is not required to be stored in memory. Instead, metadata associated with the pixel can indicate that the pixel color is stored, for example, in an internal clear color register. In one embodiment, if a block of pixels has at least some clear pixels, a control surface can be allocated to specify the clear color status for the pixel data without requiring an underlying plane allocation.

Figure 12:
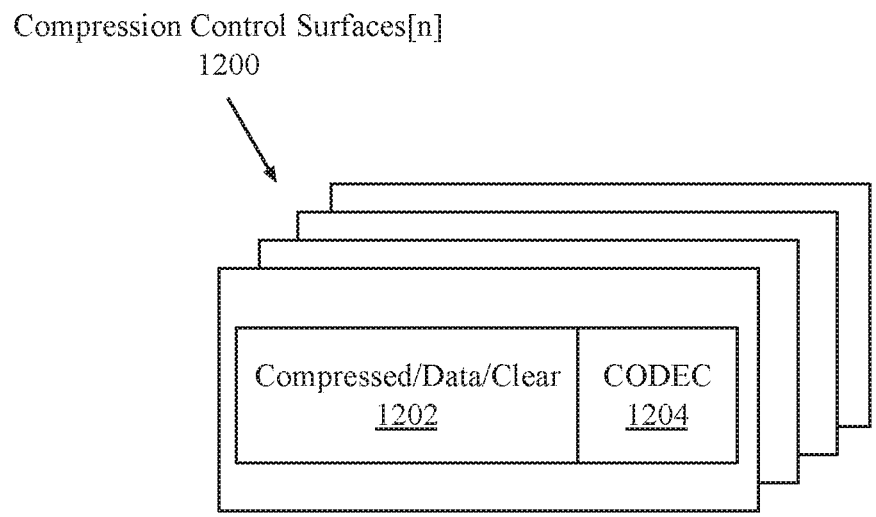
FIG. 12 illustrates a compression control surface, according to an embodiment.

FIG. 12 illustrates a compression control surface 1200, according to an embodiment. In one embodiment a set of compression control surfaces 1200, which can be similar to the compression control surfaces 1110A-1110D of FIG. 11, can store a variety of data that is used to specify a compression, data, or clear status 1202 of a plane used for lossless color compression. The compression control surfaces 1200 can be an indexed array of control surfaces in which the index to a given control surface is defined by the plane to which the compression control surface is associated. For example, compression control surface [0] can store information related to a compression, data, or clear status for plane 0. Compression control surface [1] can be used to store status for plane 1.

In some instances, an equal number of compression control surfaces can be allocated as the number of planes that store multisample data for a block of pixels. However, where the pixel data for a plane is set to a clear color following a clear operation, the compression control surface 1108 can indicate that the plane is clear without requiring an actual data allocation for the plane. For example, a set of virtual memory addresses can be associated with a plane that stores clear pixels, but a backing physical memory allocation will not be created and an actual memory access will not occur.

In one embodiment, multiple types of compression algorithms can be applied to color data. A codec entry 1204 within the compression control surface 1108 can specify the compression algorithm or compression method that is associated with the plane that the compression control surface 1200 references. In one embodiment different hardware codecs are associated with different lossless compression techniques or algorithms. In such embodiment the codec 1204 can be used as routing information to determine the hardware block to which the plane data is to be sent for decompression. In one embodiment the compression control surfaces 1200 can be stored in a compressed format. Components of the pixel processing pipeline of the graphics processor can be configured to decompress the compression control surfaces 1200 before use.

While planar MSAA is described herein, embodiments are not strictly limited to implementations that store MSAA data in a planar format. Embodiments can be applied to any data arrangement for multisample data, including packed pixel or interleaved formats in which the sample data for each pixel is stored in an interleaved format. In such embodiments, the control surfaces can reference virtual planes that are associated with a subset of an interleaved surface.

Figure 13:
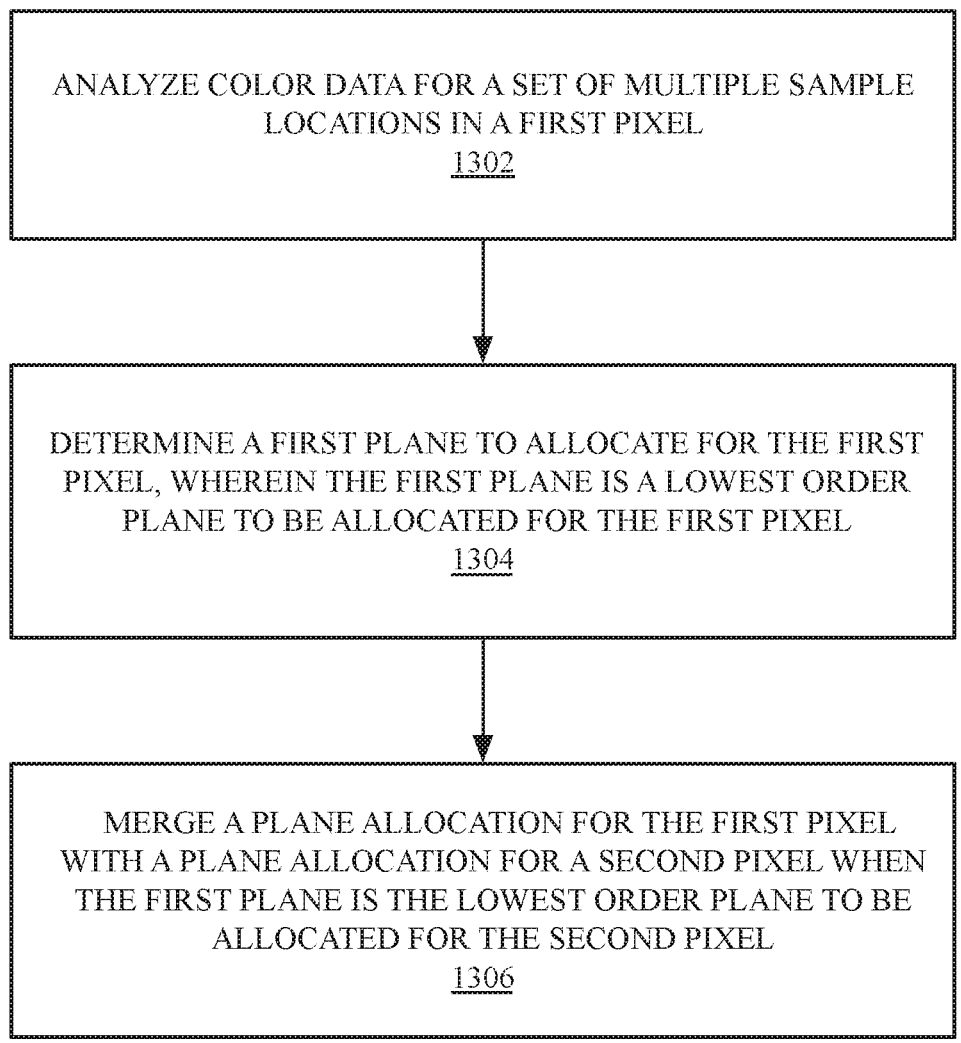
FIG. 13 is a flow diagram illustrating a process for progressive multisample antialiasing, according to an embodiment.

FIG. 13 is a block diagram illustrating progressive multisample antialiasing, according to an embodiment. Instead of determining the number of planes that are to be allocated for the render target in advance, embodiment described herein can perform MSAA plane allocation without expensing computational time and system resources to review the planes to be allocated. The progressive plane allocation can be performed by an MSAA compression module and an MSAA plane allocator, such as the MSAA compression modules 1006A-1006D and pixel MSAA plane allocator 1010 of FIG. 10. In one embodiment an MSAA compression module can analyze color data for a set of multiple sample locations in a first pixel, as shown at block 1302. The color data can be generated by a fragment processing unit, such as the fragment processing unit 524 of FIG. 5 and FIG. 9. The compression module can determine a first plane to allocate for the first pixel, as shown at block 1304. The first plane is a lowest order plane to be allocated for the first pixel. An MSAA plane allocator can then merge a plane allocation for the first pixel with a plane allocation for a second pixel when the first plane is the lowest order plane to be allocated for the second pixel, as shown at block 1306.

Figure 14:
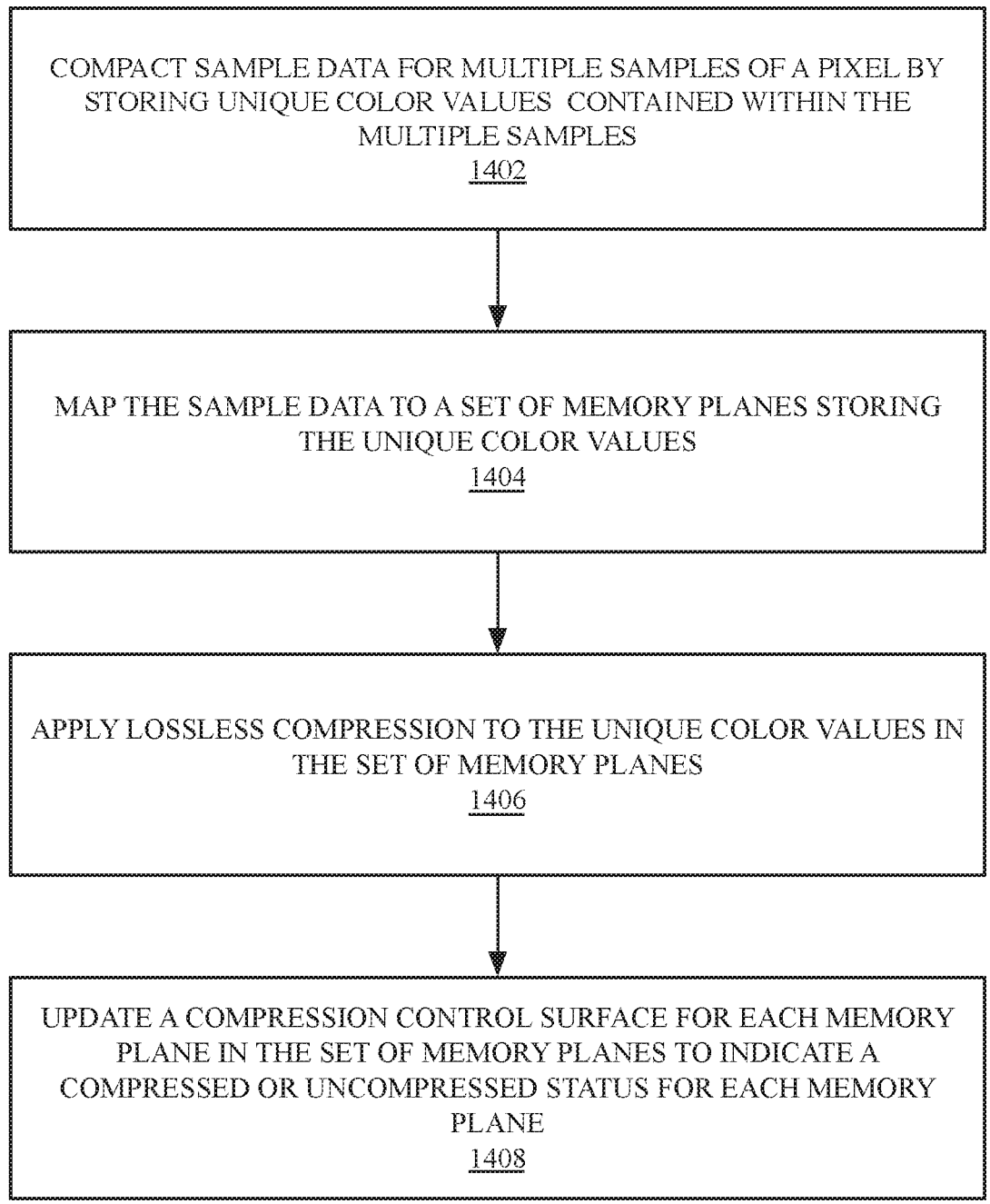
FIG. 14 is a flow diagram illustrating a process for lossless compression of multisample render target data alongside fragment compression, according to an embodiment.

FIG. 14 is a block diagram illustrating lossless compression of multisample render target data alongside fragment compression, according to an embodiment. Lossless compression of multisample render target data can be performed by a lossless compression module, which can apply one or more lossless compression algorithms to color data. The lossless compression algorithm can be any lossless compression algorithm known in the art, such as a delta compression algorithm. In one embodiment the lossless compression module is configured to only compress data that is losslessly compressible to a target compression ratio (e.g., 2:1, 4:1, etc.). In one embodiment the lossless compression module can be configured to select from multiple lossless compression algorithms. The lossless compression is applied in concert with MSAA compression, which removes duplicate sample data before writing the sample data to a multisample render target. To track a compression status for the color data, a compression control surface is maintained for each data plane that stores the color data. The compression control surface can indicate a compressed status, an uncompressed status, or a cleared status.

In one embodiment an MSAA compression module can compact sample data for multiple samples of a pixel by storing unique color values contained within the multiple samples, as shown at block 1402. The MSAA compression module can then map the sample data to a set of memory planes storing the unique color values, as shown at block 1404. The set of memory planes are memory locations allocated to store the unique color values. A lossless compression module can then apply lossless compression to the unique color values in the set of memory planes, as shown at block 1406. The lossless compression module can then update a compression control surface for each memory plane in the set of memory planes to indicate a compressed or uncompressed status for each memory plane, as shown at 1408. In one embodiment compression control surfaces are stored in a compressed format. Accordingly, to updating a compressed compression control surface can include decompressing the compressed control surface, updating the control surface, and recompressing the compressed control surface.

Additional Exemplary Graphics Processing System

Details of the embodiments described above can be incorporated within graphics processing systems and devices described below. The graphics processing system and devices of FIG. 15-28 illustrate alternative systems and graphics processing hardware that can implement any and all of the techniques described above.

Figure 15:
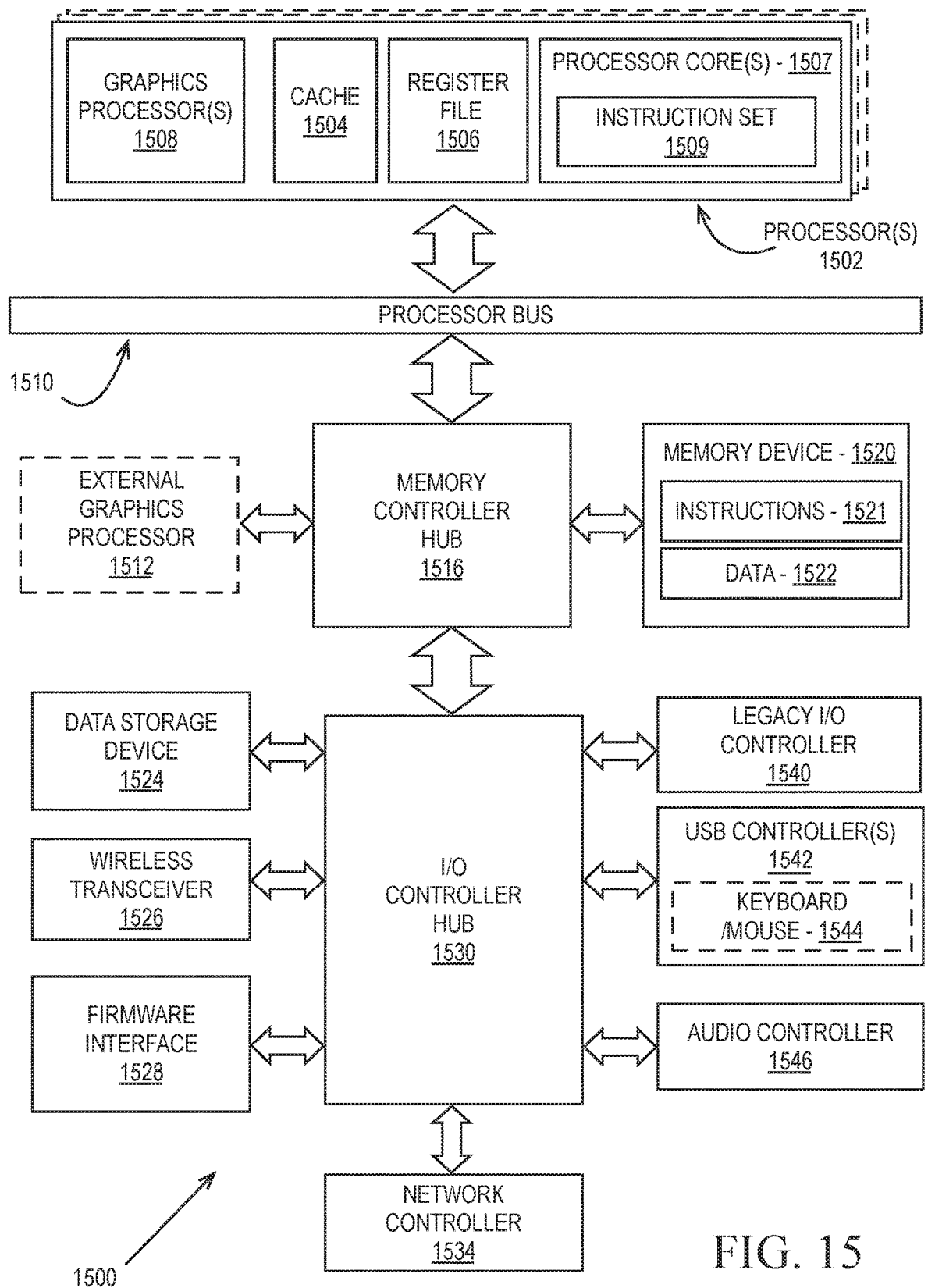
FIG. 15 is a block diagram of a processing system, according to an embodiment.

FIG. 15 is a block diagram of a processing system 1500, according to an embodiment. In various embodiments the system 1500 includes one or more processors 1502 and one or more graphics processors 1508, and may be a single processor desktop system, a multiprocessor workstation system, or a server system having a large number of processors 1502 or processor cores 1507. In one embodiment, the system 1500 is a processing platform incorporated within a system-on-a-chip (SoC) integrated circuit for use in mobile, handheld, or embedded devices.

An embodiment of system 1500 can include, or be incorporated within a server-based gaming platform, a game console, including a game and media console, a mobile gaming console, a handheld game console, or an online game console. In some embodiments system 1500 is a mobile phone, smart phone, tablet computing device or mobile Internet device. Data processing system 1500 can also include, couple with, or be integrated within a wearable device, such as a smart watch wearable device, smart eyewear device, augmented reality device, or virtual reality device. In some embodiments, data processing system 1500 is a television or set top box device having one or more processors 1502 and a graphical interface generated by one or more graphics processors 1508.

In some embodiments, the one or more processors 1502 each include one or more processor cores 1507 to process instructions which, when executed, perform operations for system and user software. In some embodiments, each of the one or more processor cores 1507 is configured to process a specific instruction set 1509. In some embodiments, instruction set 1509 may facilitate Complex Instruction Set Computing (CISC), Reduced Instruction Set Computing (RISC), or computing via a Very Long Instruction Word (VLIW). Multiple processor cores 1507 may each process a different instruction set 1509, which may include instructions to facilitate the emulation of other instruction sets. Processor core 1507 may also include other processing devices, such a Digital Signal Processor (DSP).

In some embodiments, the processor 1502 includes cache memory 1504. Depending on the architecture, the processor 1502 can have a single internal cache or multiple levels of internal cache. In some embodiments, the cache memory is shared among various components of the processor 1502. In some embodiments, the processor 1502 also uses an external cache (e.g., a Level-3 (L3) cache or Last Level Cache (LLC)) (not shown), which may be shared among processor cores 1507 using known cache coherency techniques. A register file 1506 is additionally included in processor 1502 which may include different types of registers for storing different types of data (e.g., integer registers, floating-point registers, status registers, and an instruction pointer register). Some registers may be general-purpose registers, while other registers may be specific to the design of the processor 1502.

In some embodiments, processor 1502 is coupled with a processor bus 1510 to transmit communication signals such as address, data, or control signals between processor 1502 and other components in system 1500. In one embodiment the system 1500 uses an exemplary 'hub' system architecture, including a memory controller hub 1516 and an Input Output (I/O) controller hub 1530. A memory controller hub 1516 facilitates communication between a memory device and other components of system 1500, while an I/O Controller Hub (ICH) 1530 provides connections to I/O devices via a local I/O bus. In one embodiment, the logic of the memory controller hub 1516 is integrated within the processor.

Memory device 1520 can be a dynamic random access memory (DRAM) device, a static random access memory (SRAM) device, flash memory device, phase-change memory device, or some other memory device having suitable performance to serve as process memory. In one embodiment the memory device 1520 can operate as system memory for the system 1500, to store data 1522 and instructions 1521 for use when the one or more processors 1502 executes an application or process. Memory controller hub 1516 also couples with an optional external graphics processor 1512, which may communicate with the one or more graphics processors 1508 in processors 1502 to perform graphics and media operations.

In some embodiments, ICH 1530 enables peripherals to connect to memory device 1520 and processor 1502 via a high-speed I/O bus. The I/O peripherals include, but are not limited to, an audio controller 1546, a firmware interface 1528, a wireless transceiver 1526 (e.g., Wi-Fi, Bluetooth), a data storage device 1524 (e.g., hard disk drive, flash memory, etc.), and a legacy I/O controller 1540 for coupling legacy (e.g., Personal System 2 (PS/2)) devices to the system. One or more Universal Serial Bus (USB) controllers 1542 connect input devices, such as keyboard and mouse 1544 combinations. A network controller 1534 may also couple with ICH 1530. In some embodiments, a high-performance network controller (not shown) couples with processor bus 1510. It will be appreciated that the system 1500 shown is exemplary and not limiting, as other types of data processing systems that are differently configured may also be used. For example, the I/O controller hub 1530 may be integrated within the one or more processor 1502, or the memory controller hub 1516 and I/O controller hub 1530 may be integrated into a discreet external graphics processor, such as the external graphics processor 1512.

Figure 16:
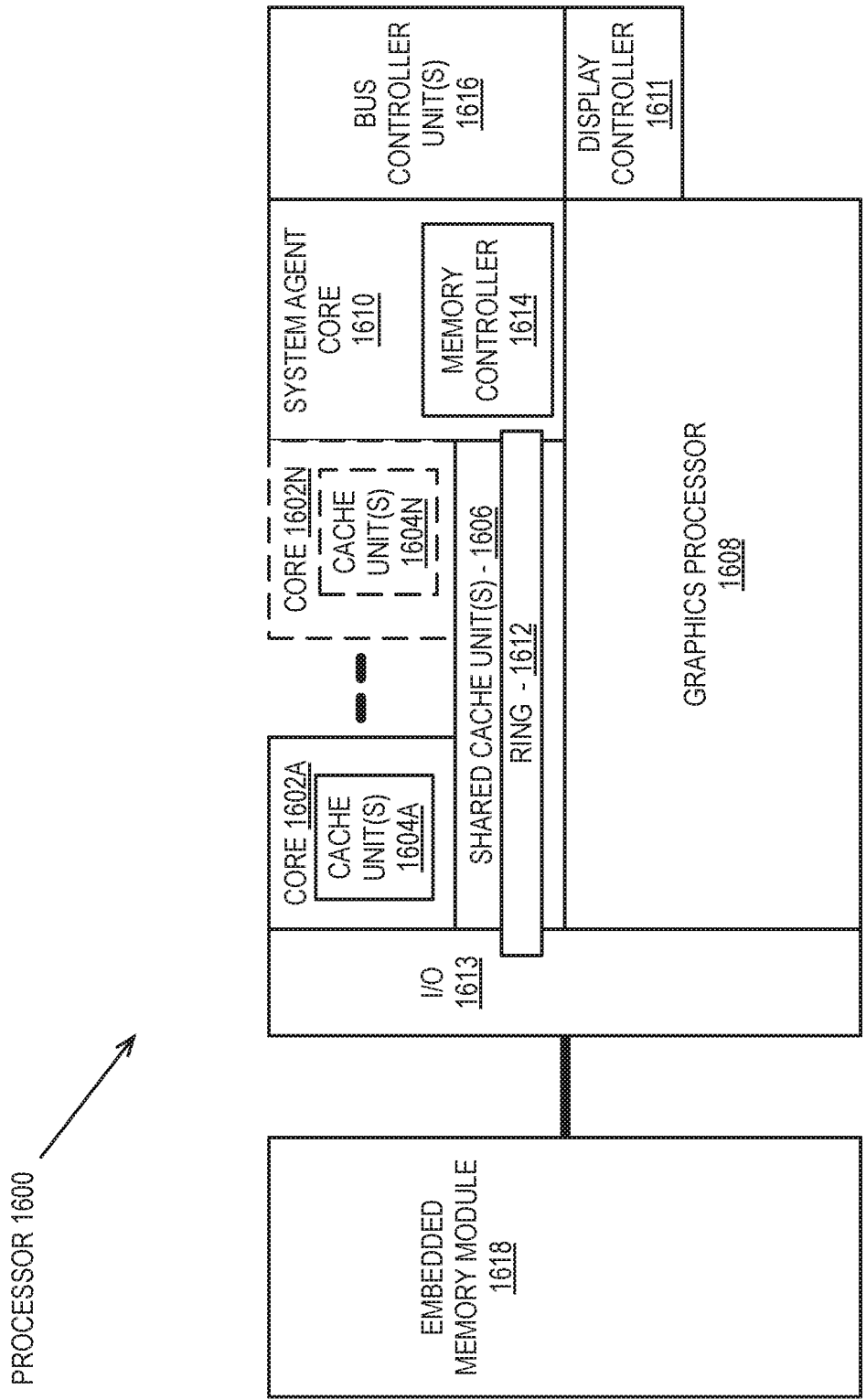
FIG. 16 is a block diagram of a processor according to an embodiment.

FIG. 16 is a block diagram of an embodiment of a processor 1600 having one or more processor cores 1602A-

1602N, an integrated memory controller 1614, and an integrated graphics processor 1608. Those elements of FIG. 16 having the same reference numbers (or names) as the elements of any other figure herein can operate or function in any manner similar to that described elsewhere herein, but are not limited to such. Processor 1600 can include additional cores up to and including additional core 1602N represented by the dashed lined boxes. Each of processor cores 1602A-1602N includes one or more internal cache units 1604A-1604N. In some embodiments each processor core also has access to one or more shared cached units 1606.

The internal cache units 1604A-1604N and shared cache units 1606 represent a cache memory hierarchy within the processor 1600. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1606 and 1604A-1604N.

In some embodiments, processor 1600 may also include a set of one or more bus controller units 1616 and a system agent core 1610. The one or more bus controller units 1616 manage a set of peripheral buses, such as one or more Peripheral Component Interconnect buses (e.g., PCI, PCI Express). System agent core 1610 provides management functionality for the various processor components. In some embodiments, system agent core 1610 includes one or more integrated memory controllers 1614 to manage access to various external memory devices (not shown).

In some embodiments, one or more of the processor cores 1602A-1602N include support for simultaneous multi-threading. In such embodiment, the system agent core 1610 includes components for coordinating and operating cores 1602A-1602N during multi-threaded processing. System agent core 1610 may additionally include a power control unit (PCU), which includes logic and components to regulate the power state of processor cores 1602A-1602N and graphics processor 1608.

In some embodiments, processor 1600 additionally includes graphics processor 1608 to execute graphics processing operations. In some embodiments, the graphics processor 1608 couples with the set of shared cache units 1606, and the system agent core 1610, including the one or more integrated memory controllers 1614. In some embodiments, a display controller 1611 is coupled with the graphics processor 1608 to drive graphics processor output to one or more coupled displays. In some embodiments, display controller 1611 may be a separate module coupled with the graphics processor via at least one interconnect, or may be integrated within the graphics processor 1608 or system agent core 1610.

In some embodiments, a ring based interconnect unit 1612 is used to couple the internal components of the processor 1600. However, an alternative interconnect unit may be used, such as a point-to-point interconnect, a switched interconnect, or other techniques, including techniques well known in the art. In some embodiments, graphics processor 1608 couples with the ring interconnect 1612 via an I/O link 1613.

The exemplary I/O link 1613 represents at least one of multiple varieties of I/O interconnects, including an on package I/O interconnect which facilitates communication between various processor components and a high-performance embedded memory module 1618, such as an eDRAM module. In some embodiments, each of the processor cores 1602A-1602N and graphics processor 1608 use embedded memory modules 1618 as a shared Last Level Cache.

In some embodiments, processor cores 1602A-1602N are homogenous cores executing the same instruction set architecture. In another embodiment, processor cores 1602A-1602N are heterogeneous in terms of instruction set architecture (ISA), where one or more of processor cores 1602A-1602N execute a first instruction set, while at least one of the other cores executes a subset of the first instruction set or a different instruction set. In one embodiment processor cores 1602A-1602N are heterogeneous in terms of microarchitecture, where one or more cores having a relatively higher power consumption couple with one or more power cores having a lower power consumption. Additionally, processor 1600 can be implemented on one or more chips or as an SoC integrated circuit having the illustrated components, in addition to other components.

Figure 17:
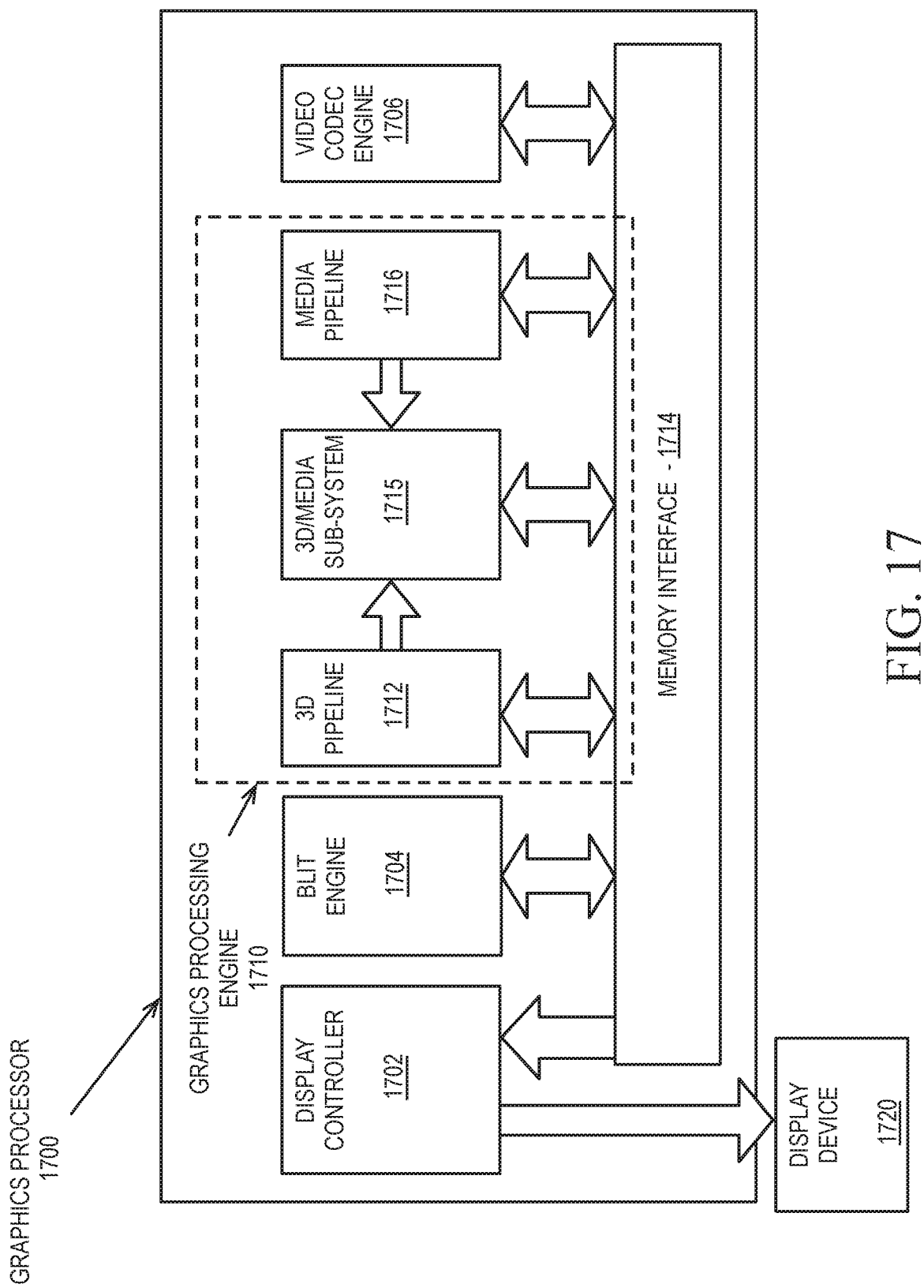
FIG. 17 is a block diagram of a graphics processor, according to an embodiment.

FIG. 17 is a block diagram of a graphics processor 1700, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1700 includes a memory interface 1714 to access memory. Memory interface 1714 can be an interface to local memory, one or more internal caches, one or more shared external caches, and/or to system memory.

In some embodiments, graphics processor 1700 also includes a display controller 1702 to drive display output data to a display device 1720. Display controller 1702 includes hardware for one or more overlay planes for the display and composition of multiple layers of video or user interface elements. In some embodiments, graphics processor 1700 includes a video codec engine 1706 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1700 includes a block image transfer (BLIT) engine 1704 to perform two-dimensional (2D) rasterizer operations including, for example, bit-boundary block transfers. However, in one embodiment, 2D graphics operations are performed using one or more components of graphics processing engine (GPE) 1710. In some embodiments, GPE 1710 is a compute engine for performing graphics operations, including three-dimensional (3D) graphics operations and media operations.

In some embodiments, GPE 310 includes a 3D pipeline 1712 for performing 3D operations, such as rendering three-dimensional images and scenes using processing functions that act upon 3D primitive shapes (e.g., rectangle, triangle, etc.). The 3D pipeline 1712 includes programmable and fixed function elements that perform various tasks within the element and/or spawn execution threads to a 3D/Media subsystem 1715. While 3D pipeline 1712 can be used to perform media operations, an embodiment of GPE 1710 also includes a media pipeline 1716 that is specifically used to perform media operations, such as video post-processing and image enhancement.

In some embodiments, media pipeline 1716 includes fixed function or programmable logic units to perform one or more specialized media operations, such as video decode acceleration, video de-interlacing, and video encode acceleration in place of, or on behalf of video codec engine 1706. In some embodiments, media pipeline 1716 additionally includes a thread spawning unit to spawn threads for execution on 3D/Media subsystem 1715. The spawned threads perform computations for the media operations on one or more graphics execution units included in 3D/Media subsystem 1715.

In some embodiments, 3D/Media subsystem 1715 includes logic for executing threads spawned by 3D pipeline 1712 and media pipeline 1716. In one embodiment, the pipelines send thread execution requests to 3D/Media subsystem 1715, which includes thread dispatch logic for arbitrating and dispatching the various requests to available thread execution resources. The execution resources include an array of graphics execution units to process the 3D and media threads. In some embodiments, 3D/Media subsystem 1715 includes one or more internal caches for thread instructions and data. In some embodiments, the subsystem also includes shared memory, including registers and addressable memory, to share data between threads and to store output data.

Additional Exemplary Graphics Processing Engine

Figure 18:
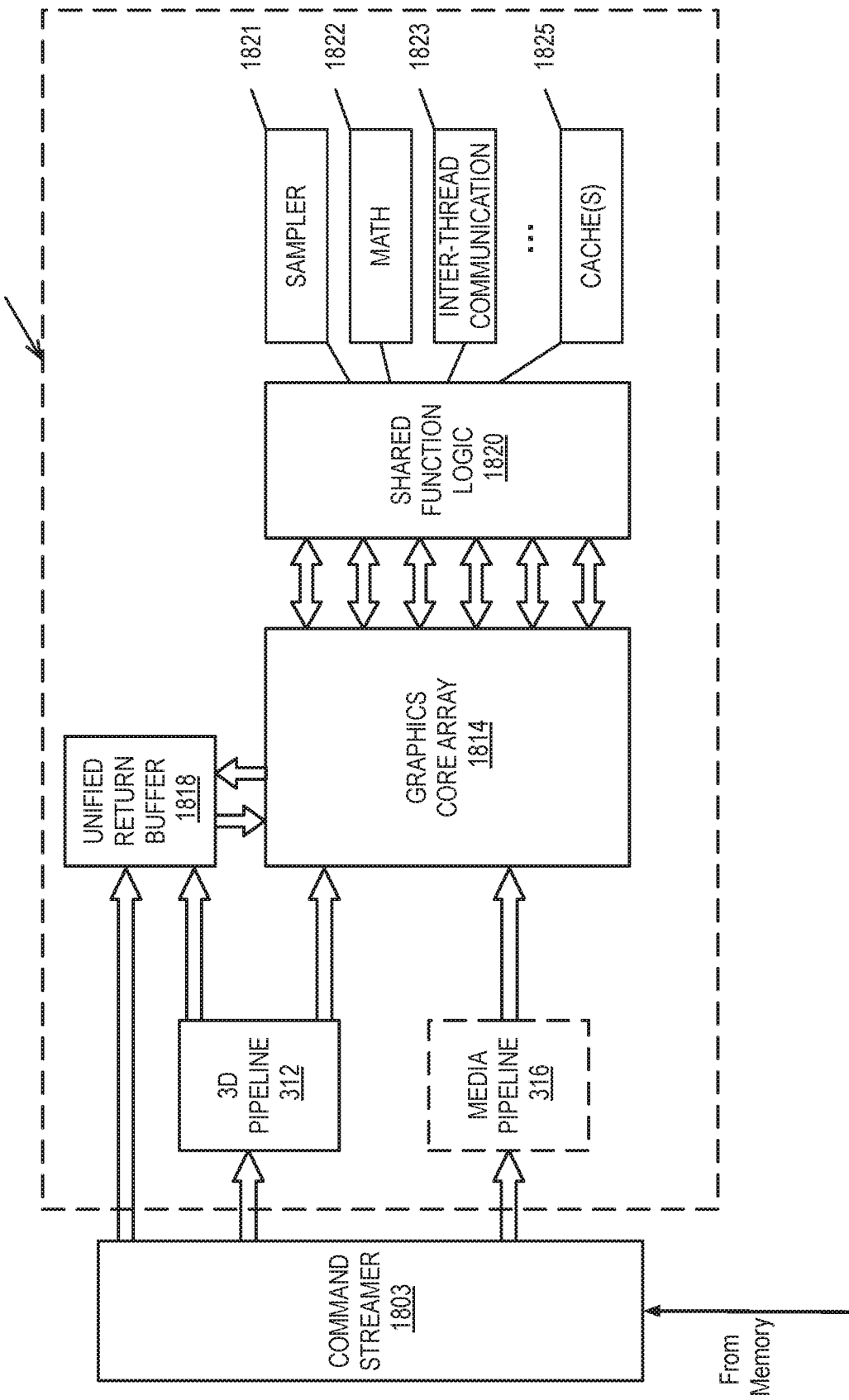
FIG. 18 is a block diagram of a graphics processing engine of a graphics processor in accordance with some embodiments.

FIG. 18 is a block diagram of a graphics processing engine 1810 of a graphics processor in accordance with some embodiments. In one embodiment, the graphics processing engine (GPE) 1810 is a version of the GPE 1710 shown in FIG. 17. Elements of FIG. 18 having the same reference numbers (or names) as the elements of any other figure herein can operate or function in any manner similar to that described elsewhere herein, but are not limited to such. For example, the 3D pipeline 1712 and media pipeline 1716 of FIG. 17 are illustrated. The media pipeline 1716 is optional in some embodiments of the GPE 1810 and may not be explicitly included within the GPE 1810. For example and in at least one embodiment, a separate media and/or image processor is coupled to the GPE 1810.

In some embodiments, GPE 1810 couples with or includes a command streamer 1803, which provides a command stream to the 3D pipeline 1712 and/or media pipelines 1716. In some embodiments, command streamer 1803 is coupled with memory, which can be system memory, or one or more of internal cache memory and shared cache memory. In some embodiments, command streamer 1803 receives commands from the memory and sends the commands to 3D pipeline 1712 and/or media pipeline 1716. The commands are directives fetched from a ring buffer, which stores commands for the 3D pipeline 1712 and media pipeline 1716. In one embodiment, the ring buffer can additionally include batch command buffers storing batches of multiple commands. The commands for the 3D pipeline 1712 can also include references to data stored in memory, such as but not limited to vertex and geometry data for the 3D pipeline 1712 and/or image data and memory objects for the media pipeline 1716. The 3D pipeline 1712 and media pipeline 1716 process the commands and data by performing operations via logic within the respective pipelines or by dispatching one or more execution threads to a graphics core array 1814.

In various embodiments the 3D pipeline 1712 can execute one or more shader programs, such as vertex shaders, geometry shaders, pixel shaders, fragment shaders, compute shaders, or other shader programs, by processing the instructions and dispatching execution threads to the graphics core array 1814. The graphics core array 1814 provides a unified block of execution resources. Multi-purpose execution logic (e.g., execution units) within the graphic core array 1814 includes support for various 3D API shader languages and can execute multiple simultaneous execution threads associated with multiple shaders.

In some embodiments the graphics core array 1814 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 1507 of FIG. 15 or core 1602A-1602N as in FIG. 16.

Output data generated by threads executing on the graphics core array 1814 can output data to memory in a unified return buffer (URB) 1818. The URB 1818 can store data for multiple threads. In some embodiments the URB 1818 may be used to send data between different threads executing on the graphics core array 1814. In some embodiments the URB 1818 may additionally be used for synchronization between threads on the graphics core array and fixed function logic within the shared function logic 1820.

In some embodiments, graphics core array 1814 is scalable, such that the array includes a variable number of graphics cores, each having a variable number of execution units based on the target power and performance level of GPE 1810. In one embodiment the execution resources are dynamically scalable, such that execution resources may be enabled or disabled as needed.

The graphics core array 1814 couples with shared function logic 1820 that includes multiple resources that are shared between the graphics cores in the graphics core array. The shared functions within the shared function logic 1820 are hardware logic units that provide specialized supplemental functionality to the graphics core array 1814. In various embodiments, shared function logic 1820 includes but is not limited to sampler 1821, math 1822, and inter-thread communication (ITC) 1823 logic. Additionally, some embodiments implement one or more cache(s) 1825 within the shared function logic 1820. A shared function is implemented where the demand for a given specialized function is insufficient for inclusion within the graphics core array 1814. Instead a single instantiation of that specialized function is implemented as a stand-alone entity in the shared function logic 1820 and shared among the execution resources within the graphics core array 1814. The precise set of functions that are shared between the graphics core array 1814 and included within the graphics core array 1814 varies between embodiments.

Figure 19:
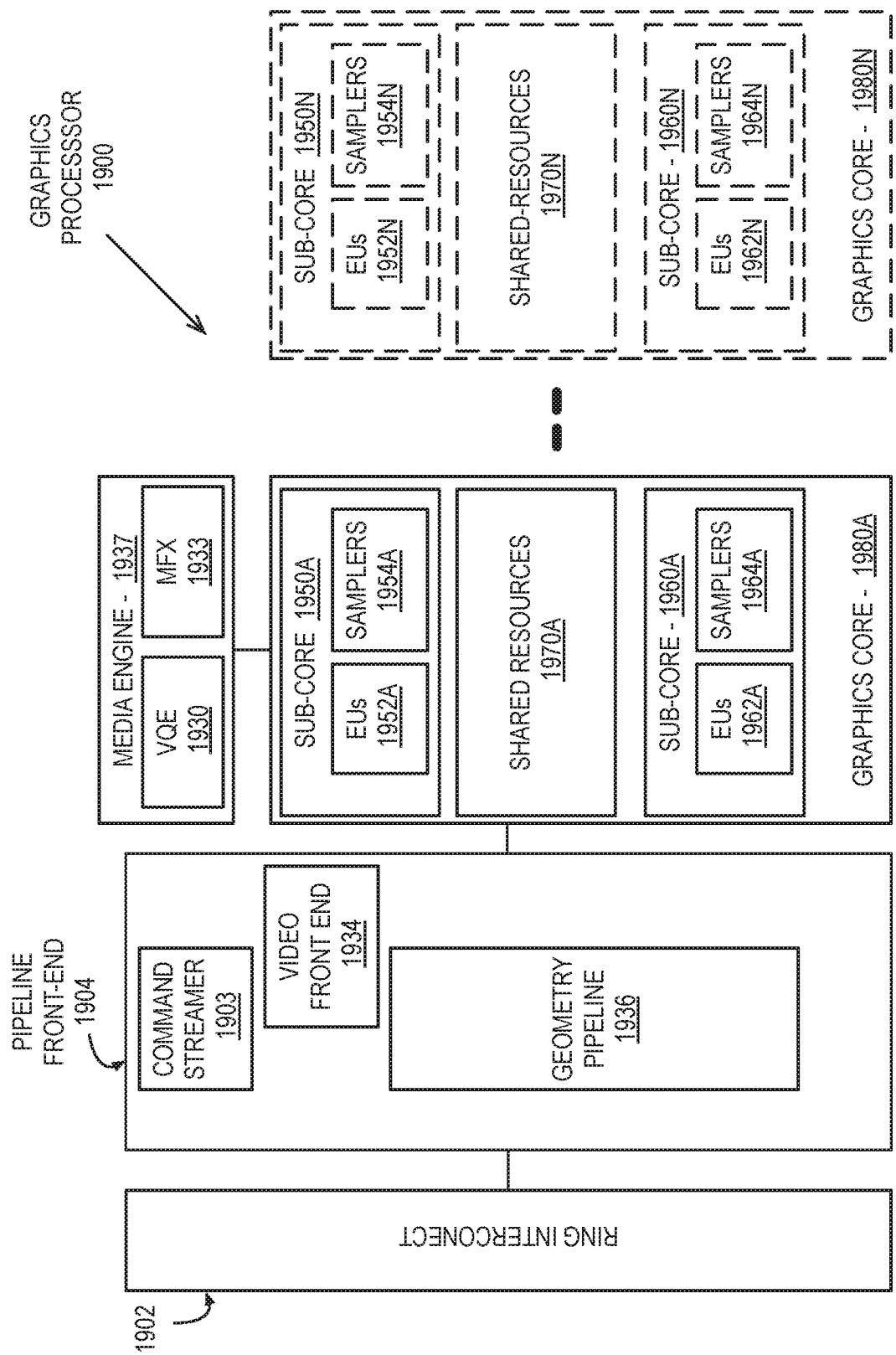
FIG. 19 is a block diagram of a graphics processor provided by an additional embodiment.

FIG. 19 is a block diagram of another embodiment of a graphics processor 1900. Elements of FIG. 19 having the same reference numbers (or names) as the elements of any other figure herein can operate or function in any manner similar to that described elsewhere herein, but are not limited to such.

In some embodiments, graphics processor 1900 includes a ring interconnect 1902, a pipeline front-end 1904, a media engine 1937, and graphics cores 1980A-1980N. In some embodiments, ring interconnect 1902 couples the graphics processor to other processing units, including other graphics processors or one or more general-purpose processor cores. In some embodiments, the graphics processor is one of many processors integrated within a multi-core processing system.

In some embodiments, graphics processor 1900 receives batches of commands via ring interconnect 1902. The incoming commands are interpreted by a command streamer 1903 in the pipeline front-end 1904. In some embodiments, graphics processor 1900 includes scalable execution logic to perform 3D geometry processing and media processing via the graphics core(s) 1980A-1980N. For 3D geometry processing commands, command streamer 1903 supplies commands to geometry pipeline 1936. For at least some media processing commands, command streamer 1903 supplies the commands to a video front end 1934, which couples with a media engine 1937. In some embodiments, media engine 1937 includes a Video Quality Engine (VQE) 1930 for video and image post-processing and a multi-format encode/decode (MFX) 1933 engine to provide hardware-accelerated media data encode and decode. In some embodiments, geometry pipeline 1936 and media engine 1937 each generate execution threads for the thread execution resources provided by at least one graphics core 1980A.

In some embodiments, graphics processor 1900 includes scalable thread execution resources featuring modular cores 1980A-1980N (sometimes referred to as core slices), each having multiple sub-cores 1950A-550N, 1960A-1960N (sometimes referred to as core sub-slices). In some embodiments, graphics processor 1900 can have any number of graphics cores 1980A through 1980N. In some embodiments, graphics processor 1900 includes a graphics core 1980A having at least a first sub-core 1950A and a second sub-core 1960A. In other embodiments, the graphics processor is a low power processor with a single sub-core (e.g., 1950A). In some embodiments, graphics processor 1900 includes multiple graphics cores 1980A-1980N, each including a set of first sub-cores 1950A-1950N and a set of second sub-cores 1960A-1960N. Each sub-core in the set of first sub-cores 1950A-1950N includes at least a first set of execution units 1952A-1952N and media/texture samplers 1954A-1954N. Each sub-core in the set of second sub-cores 1960A-1960N includes at least a second set of execution units 1962A-1962N and samplers 1964A-1964N. In some embodiments, each sub-core 1950A-1950N, 1960A-1960N shares a set of shared resources 1970A-1970N. In some embodiments, the shared resources include shared cache memory and pixel operation logic. Other shared resources may also be included in the various embodiments of the graphics processor.

Additional Exemplary Execution Units

Figure 20:
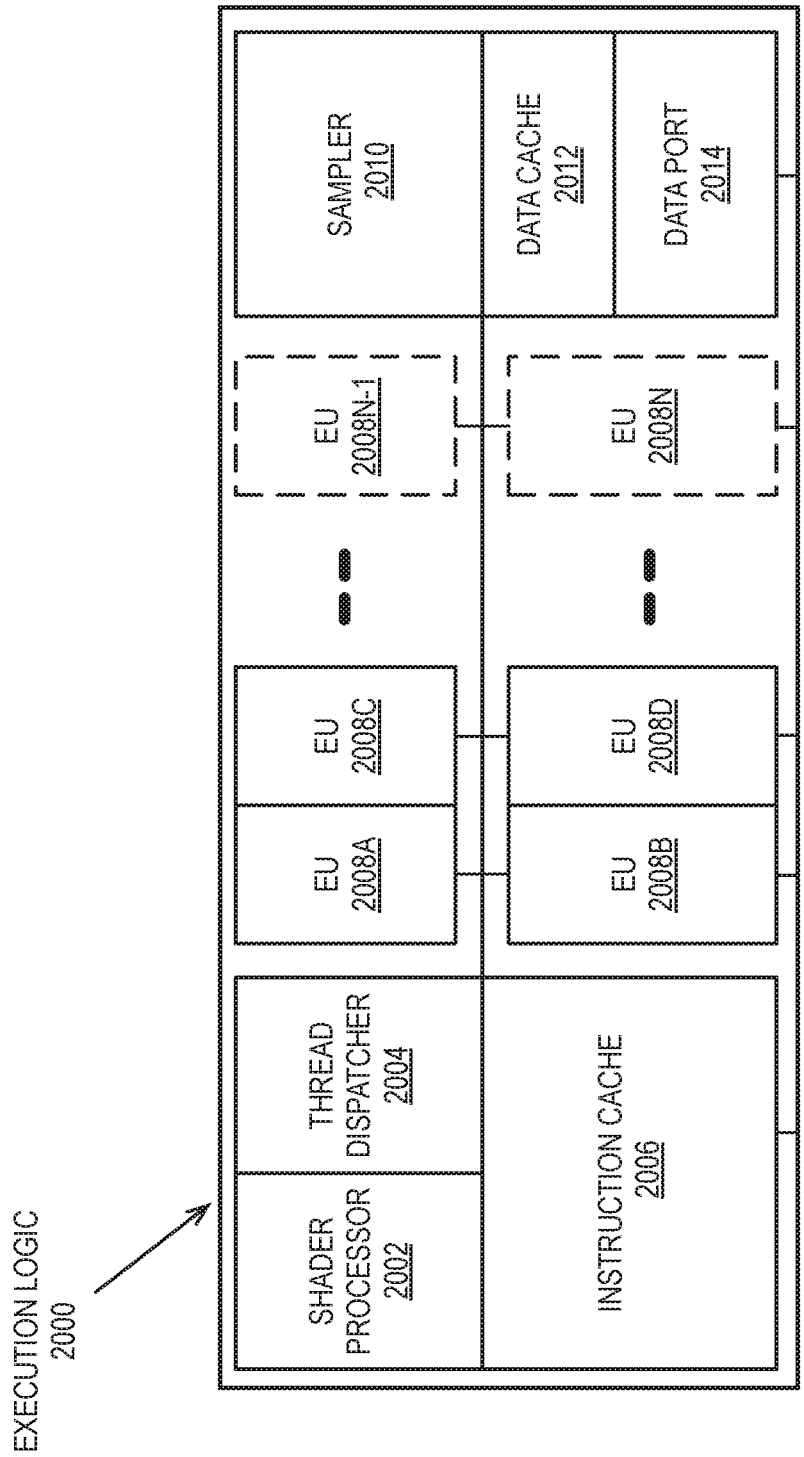
FIG. 20 illustrates thread execution logic including an array of processing elements employed in some embodiments.

FIG. 20 illustrates thread execution logic 2000 including an array of processing elements employed in some embodiments of a GPE. Elements of FIG. 20 having the same reference numbers (or names) as the elements of any other figure herein can operate or function in any manner similar to that described elsewhere herein, but are not limited to such.

In some embodiments, thread execution logic 2000 includes a shader processor 2002, a thread dispatcher 2004, instruction cache 2006, a scalable execution unit array including a plurality of execution units 2008A-2008N, a sampler 2010, a data cache 2012, and a data port 2014. In one embodiment the scalable execution unit array can dynamically scale by enabling or disabling one or more execution units (e.g., any of execution unit 2008A, 2008B, 2008C, 2008D, through 2008N-1 and 2008N) based on the computational requirements of a workload. In one embodiment the included components are interconnected via an interconnect fabric that links to each of the components. In some embodiments, thread execution logic 2000 includes one or more connections to memory, such as system memory or cache memory, through one or more of instruction cache 2006, data port 2014, sampler 2010, and execution units 2008A-2008N. In some embodiments, each execution unit (e.g. 2008A) is a stand-alone programmable general-purpose computational unit that is capable of executing multiple simultaneous hardware threads while processing multiple data elements in parallel for each thread. In various embodiments, the array of execution units 2008A-2008N is scalable to include any number individual execution units.

In some embodiments, the execution units 2008A-2008N are primarily used to execute shader programs. A shader processor 2002 can process the various shader programs and dispatch execution threads associated with the shader programs via a thread dispatcher 2004. In one embodiment the thread dispatcher includes logic to arbitrate thread initiation requests from the graphics and media pipelines and instantiate the requested threads on one or more execution unit in the execution units 2008A-2008N. For example, the geometry pipeline (e.g., 1936 of FIG. 19) can dispatch vertex, tessellation, or geometry shaders to the thread execution logic 2000 (FIG. 20) for processing. In some embodiments, thread dispatcher 2004 can also process runtime thread spawning requests from the executing shader programs.

In some embodiments, the execution units 2008A-2008N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 2008A-2008N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating-point operations, SIMD branch capability, logical operations, transcendental operations, and other miscellaneous operations. While waiting for data from memory or one of the shared functions, dependency logic within the execution units 2008A-2008N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 2008A-2008N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating-Point Units (FPUs) for a particular graphics processor. In some embodiments, execution units 2008A-2008N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 2006) are included in the thread execution logic 2000 to cache thread instructions for the execution units. In some embodiments, one or more data caches (e.g., 2012) are included to cache thread data during thread execution. In some embodiments, a sampler 2010 is included to provide texture sampling for 3D operations and media sampling for media operations. In some embodiments, sampler 2010 includes specialized texture or media sampling functionality to process texture or media data during the sampling process before providing the sampled data to an execution unit.

During execution, the graphics and media pipelines send thread initiation requests to thread execution logic 2000 via thread spawning and dispatch logic. Once a group of geometric objects has been processed and rasterized into pixel data, pixel processor logic (e.g., pixel shader logic, fragment shader logic, etc.) within the shader processor 2002 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 2002 then executes an application programming interface (API)-supplied pixel or fragment shader program. To execute the shader program, the shader processor 2002 dispatches threads to an execution unit (e.g., 2008A) via thread dispatcher 2004. In some embodiments, pixel shader 2002 uses texture sampling logic in the sampler 2010 to access texture data in texture maps stored in memory. Arithmetic operations on the texture data and the input geometry data compute pixel color data for each geometric fragment, or discards one or more pixels from further processing.

In some embodiments, the data port 2014 provides a memory access mechanism for the thread execution logic 2000 output processed data to memory for processing on a graphics processor output pipeline. In some embodiments, the data port 2014 includes or couples to one or more cache memories (e.g., data cache 2012) to cache data for memory access via the data port.

Figure 21:
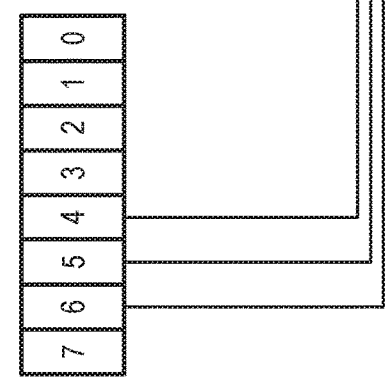
FIG. 21 is a block diagram illustrating a graphics processor instruction formats according to some embodiments.

FIG. 21 is a block diagram illustrating a graphics processor instruction formats 2100 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 2100 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 2110. A 64-bit compacted instruction format 2130 is available for some instructions based on the selected instruction, instruction options, and number of operands. The native 128-bit instruction format 710 provides access to all instruction options, while some options and operations are restricted in the 64-bit format 2130. The native instructions available in the 64-bit format 2130 vary by embodiment. In some embodiments, the instruction is compacted in part using a set of index values in an index field 2113. The execution unit hardware references a set of compaction tables based on the index values and uses the compaction table outputs to reconstruct a native instruction in the 128-bit instruction format 2110.

For each format, instruction opcode 2112 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 2114 enables control over certain execution options, such as channels selection (e.g., predication) and data channel order (e.g., swizzle). For instructions in the 128-bit instruction format 2110 an exec-size field 2116 limits the number of data channels that will be executed in parallel. In some embodiments, exec-size field 2116 is not available for use in the 64-bit compact instruction format 2130.

Some execution unit instructions have up to three operands including two source operands, src0 2120, src1 2122, and one destination 2118. In some embodiments, the execution units support dual destination instructions, where one of the destinations is implied. Data manipulation instructions can have a third source operand (e.g., SRC2 2124), where the instruction opcode 2112 determines the number of source operands. An instruction's last source operand can be an immediate (e.g., hard-coded) value passed with the instruction.

In some embodiments, the 128-bit instruction format 2110 includes an access/address mode field 2126 specifying, for example, whether direct register addressing mode or indirect register addressing mode is used. When direct register addressing mode is used, the register address of one or more operands is directly provided by bits in the instruction.

In some embodiments, the 128-bit instruction format 2110 includes an access/address mode field 2126, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 2126 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 2112 bit-fields to simplify Opcode decode 2140. For an 8-bit opcode, bits 4, 5, and 6 allow the execution unit to determine the type of opcode. The precise opcode grouping shown is merely an example. In some embodiments, a move and logic opcode group 2142 includes data movement and logic instructions (e.g., move (mov), compare (cmp)). In some embodiments, move and logic group 2142 shares the five most significant bits (MSB), where move (mov) instructions are in the form of 0000xxxxb and logic instructions are in the form of 0001xxxxb. A flow control instruction group 2144 (e.g., call, jump (jmp)) includes instructions in the form of 0010xxxxb (e.g., 0x20). A miscellaneous instruction group 2146 includes a mix of instructions, including synchronization instructions (e.g., wait, send) in the form of 0011xxxxb (e.g., 0x30). A parallel math instruction group 2148 includes component-wise arithmetic instructions (e.g., add, multiply (mul)) in the form of 0100xxxxb (e.g., 0x40). The parallel math group 2148 performs the arithmetic operations in parallel across data channels. The vector math group 2150 includes arithmetic instructions (e.g., dp4) in the form of 0101xxxxb (e.g., 0x50). The vector math group performs arithmetic such as dot product calculations on vector operands.

Additional Exemplary Graphics Pipeline

Figure 22:
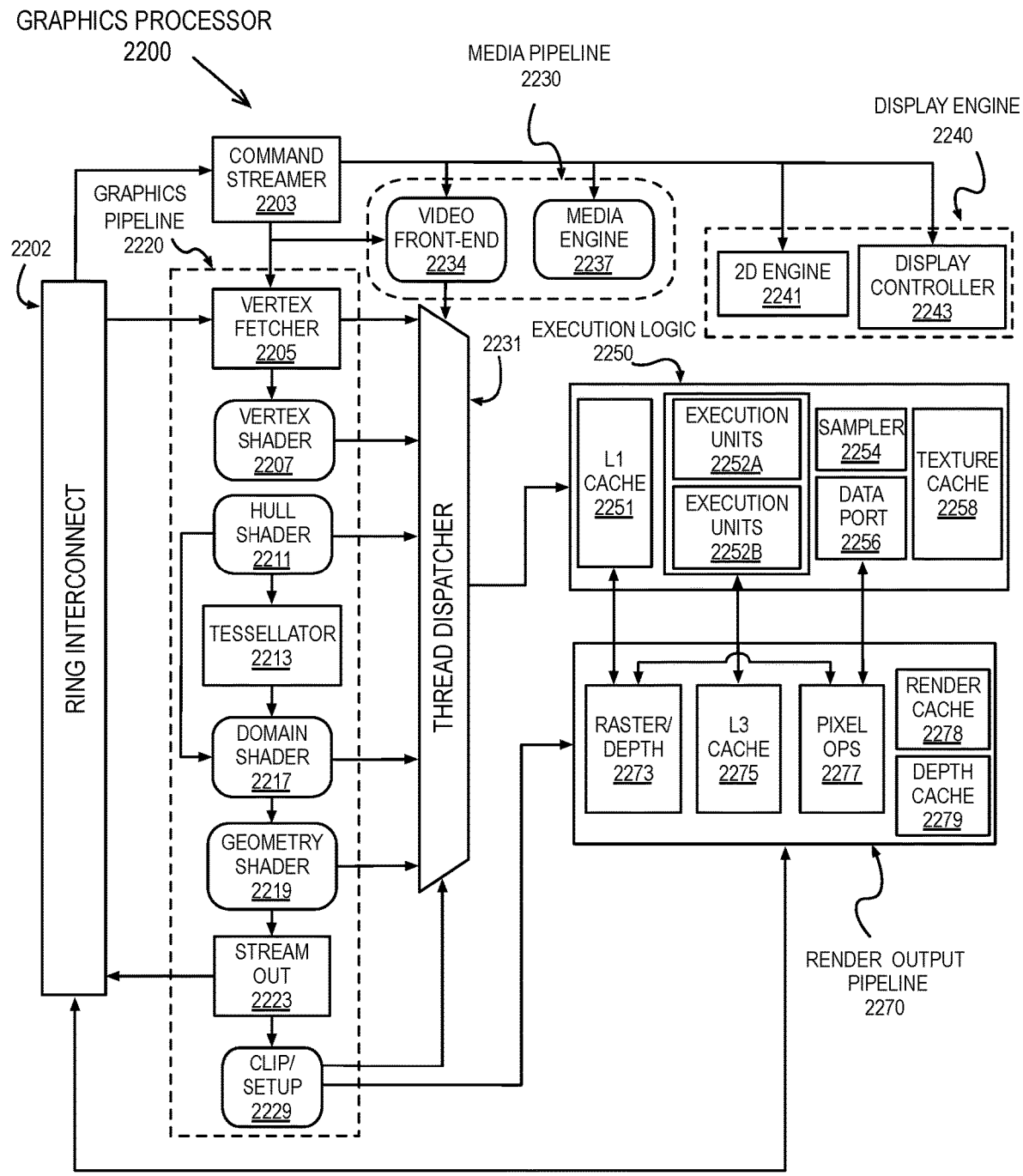
FIG. 22 is a block diagram of a graphics processor according to another embodiment.

FIG. 22 is a block diagram of another embodiment of a graphics processor 2200. Elements of FIG. 22 having the same reference numbers (or names) as the elements of any other figure herein can operate or function in any manner similar to that described elsewhere herein but are not limited to such.

In some embodiments, graphics processor 2200 includes a graphics pipeline 2220, a media pipeline 2230, a display engine 2240, thread execution logic 2250, and a render output pipeline 2270. In some embodiments, graphics processor 2200 is a graphics processor within a multi-core processing system that includes one or more general-purpose processing cores. The graphics processor is controlled by register writes to one or more control registers (not shown) or via commands issued to graphics processor 2200 via a ring interconnect 2202. In some embodiments, ring interconnect 2202 couples graphics processor 2200 to other processing components, such as other graphics processors or general-purpose processors. Commands from ring interconnect 2202 are interpreted by a command streamer 2203, which supplies instructions to individual components of graphics pipeline 2220 or media pipeline 2230.

In some embodiments, command streamer 2203 directs the operation of a vertex fetcher 2205 that reads vertex data from memory and executes vertex-processing commands provided by command streamer 2203. In some embodiments, vertex fetcher 2205 provides vertex data to a vertex shader 2207, which performs coordinate space transformation and lighting operations to each vertex. In some embodiments, vertex fetcher 2205 and vertex shader 2207 execute vertex-processing instructions by dispatching execution threads to execution units 2252A-2252B via a thread dispatcher 2231.

In some embodiments, execution units 2252A-2252B are an array of vector processors having an instruction set for performing graphics and media operations. In some embodiments, execution units 2252A-2252B have an attached L1 cache 2251 that is specific for each array or shared between the arrays. The cache can be configured as a data cache, an instruction cache, or a single cache that is partitioned to contain data and instructions in different partitions.

In some embodiments, graphics pipeline 2220 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 2213 operates at the direction of hull shader 2211 and contains special purpose logic to generate a set of detailed geometric objects based on a coarse geometric model that is provided as input to graphics pipeline 2220. In some embodiments, if tessellation is not used, tessellation components (e.g., hull shader 2211, tessellator 2213, and domain shader 2217) can be bypassed.

In some embodiments, complete geometric objects can be processed by a geometry shader 2219 via one or more threads dispatched to execution units 2252A-2252B or can proceed directly to the clipper 2229. In some embodiments, the geometry shader operates on entire geometric objects, rather than vertices or patches of vertices as in previous stages of the graphics pipeline. If the tessellation is disabled the geometry shader 2219 receives input from the vertex shader 2207. In some embodiments, geometry shader 2219 is programmable by a geometry shader program to perform geometry tessellation if the tessellation units are disabled.

Before rasterization, a clipper 2229 processes vertex data. The clipper 2229 may be a fixed function clipper or a programmable clipper having clipping and geometry shader functions. In some embodiments, a rasterizer and depth test component 2273 in the render output pipeline 2270 dispatches pixel shaders to convert the geometric objects into their per pixel representations. In some embodiments, pixel shader logic is included in thread execution logic 2250. In some embodiments, an application can bypass the rasterizer and depth test component 2273 and access un-rasterized vertex data via a stream out unit 2223.

The graphics processor 2200 has an interconnect bus, interconnect fabric, or some other interconnect mechanism that allows data and message passing amongst the major components of the processor. In some embodiments, execution units 2252A-2252B and associated cache(s) 2251, texture and media sampler 2254, and texture/sampler cache 2258 interconnect via a data port 2256 to perform memory access and communicate with render output pipeline components of the processor. In some embodiments, sampler 2254, caches 2251, 2258 and execution units 2252A-2252B each have separate memory access paths.

In some embodiments, render output pipeline 2270 contains a rasterizer and depth test component 2273 that converts vertex-based objects into an associated pixel-based representation. In some embodiments, the rasterizer logic includes a windower/masker unit to perform fixed function triangle and line rasterization. An associated render cache 2278 and depth cache 2279 are also available in some embodiments. A pixel operations component 2277 performs pixel-based operations on the data, though in some instances, pixel operations associated with 2D operations (e.g. bit block image transfers with blending) are performed by the 2D engine 2241, or substituted at display time by the display controller 2243 using overlay display planes. In some embodiments, a shared L3 cache 2275 is available to all graphics components, allowing the sharing of data without the use of main system memory.

In some embodiments, graphics processor media pipeline 2230 includes a media engine 2237 and a video front end 2234. In some embodiments, video front end 2234 receives pipeline commands from the command streamer 2203. In some embodiments, media pipeline 2230 includes a separate command streamer. In some embodiments, video front-end 2234 processes media commands before sending the command to the media engine 2237. In some embodiments, media engine 2237 includes thread spawning functionality to spawn threads for dispatch to thread execution logic 2250 via thread dispatcher 2231.

In some embodiments, graphics processor 2200 includes a display engine 2240. In some embodiments, display engine 2240 is external to graphics processor 2200 and couples with the graphics processor via the ring interconnect 2202, or some other interconnect bus or fabric. In some embodiments, display engine 2240 includes a 2D engine 2241 and a display controller 2243. In some embodiments, display engine 2240 contains special purpose logic capable of operating independently of the 3D pipeline. In some embodiments, display controller 2243 couples with a display device (not shown), which may be a system integrated display device, as in a laptop computer, or an external display device attached via a display device connector.

In some embodiments, graphics pipeline 2220 and media pipeline 2230 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 23A is a block diagram illustrating a graphics processor command format 2300 according to some embodiments. FIG. 23B is a block diagram illustrating a graphics processor command sequence 2310 according to an embodiment. The solid lined boxes in FIG. 23A illustrate the components that are generally included in a graphics command while the dashed lines include components that are optional or that are only included in a sub-set of the graphics commands. The exemplary graphics processor command format 2300 of FIG. 23A includes data fields to identify a target client 2302 of the command, a command operation code (opcode) 2304, and the relevant data 2306 for the command. A sub-opcode 2305 and a command size 2308 are also included in some commands.

In some embodiments, client 2302 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2304 and, if present, sub-opcode 2305 to determine the operation to perform. The client unit performs the command using information in data field 2306. For some commands an explicit command size 2308 is expected to specify the size of the command. In some embodiments, the command parser automatically determines the size of at least some of the commands based on the command opcode. In some embodiments commands are aligned via multiples of a double word.

The flow diagram in FIG. 23B shows an exemplary graphics processor command sequence 2310. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 2310 may begin with a pipeline flush command 2312 to cause any active graphics pipeline to complete the currently pending commands for the pipeline. In some embodiments, the 3D pipeline 2322 and the media pipeline 2324 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 2312 can be used for pipeline synchronization or before placing the graphics processor into a low power state.

In some embodiments, a pipeline select command 2313 is used when a command sequence requires the graphics processor to explicitly switch between pipelines. In some embodiments, a pipeline select command 2313 is required only once within an execution context before issuing pipeline commands unless the context is to issue commands for both pipelines. In some embodiments, a pipeline flush command 2312 is required immediately before a pipeline switch via the pipeline select command 2313.

In some embodiments, a pipeline control command 2314 configures a graphics pipeline for operation and is used to program the 3D pipeline 2322 and the media pipeline 2324. In some embodiments, pipeline control command 2314 configures the pipeline state for the active pipeline. In one embodiment, the pipeline control command 2314 is used for pipeline synchronization and to clear data from one or more cache memories within the active pipeline before processing a batch of commands.

In some embodiments, commands associated with the return buffer state 2316 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 2316 includes selecting the size and number of return buffers to use for a set of pipeline operations.

The remaining commands in the command sequence differ based on the active pipeline for operations. Based on a pipeline determination 2320, the command sequence is tailored to the 3D pipeline 2322 beginning with the 3D pipeline state 2330 or the media pipeline 2324 beginning at the media pipeline state 2340.

The commands to configure the 3D pipeline state 2330 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 2330 commands are also able to selectively disable or bypass certain pipeline elements if those elements will not be used.

In some embodiments, 3D primitive 2332 command is used to submit 3D primitives to be processed by the 3D pipeline. Commands and associated parameters that are passed to the graphics processor via the 3D primitive 2332 command are forwarded to the vertex fetch function in the graphics pipeline. The vertex fetch function uses the 3D primitive 2332 command data to generate vertex data structures. The vertex data structures are stored in one or more return buffers. In some embodiments, 3D primitive 2332 command is used to perform vertex operations on 3D primitives via vertex shaders. To process vertex shaders, 3D pipeline 2322 dispatches shader execution threads to graphics processor execution units.

In some embodiments, 3D pipeline 2322 is triggered via an execute 2334 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 2310 follows the media pipeline 2324 path when performing media operations. In general, the specific use and manner of programming for the media pipeline 2324 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 2324 is configured in a similar manner as the 3D pipeline 2322. A set of commands to configure the media pipeline state 2340 are dispatched or placed into a command queue before the media object commands 2342. In some embodiments, media pipeline state commands 2340 include data to configure the media pipeline elements that will be used to process the media objects. This includes data to configure the video decode and video encode logic within the media pipeline, such as encode or decode format. In some embodiments, media pipeline state commands 2340 also support the use of one or more pointers to "indirect" state elements that contain a batch of state settings.

In some embodiments, media object commands 2342 supply pointers to media objects for processing by the media pipeline. The media objects include memory buffers containing video data to be processed. In some embodiments, all media pipeline states must be valid before issuing a media object command 2342. Once the pipeline state is configured and media object commands 2342 are queued, the media pipeline 2324 is triggered via an execute command 2344 or an equivalent execute event (e.g., register write). Output from media pipeline 2324 may then be post processed by operations provided by the 3D pipeline 2322 or the media pipeline 2324. In some embodiments, GPGPU operations are configured and executed in a similar manner as media operations.

Graphics Software Architecture

Figure 24:
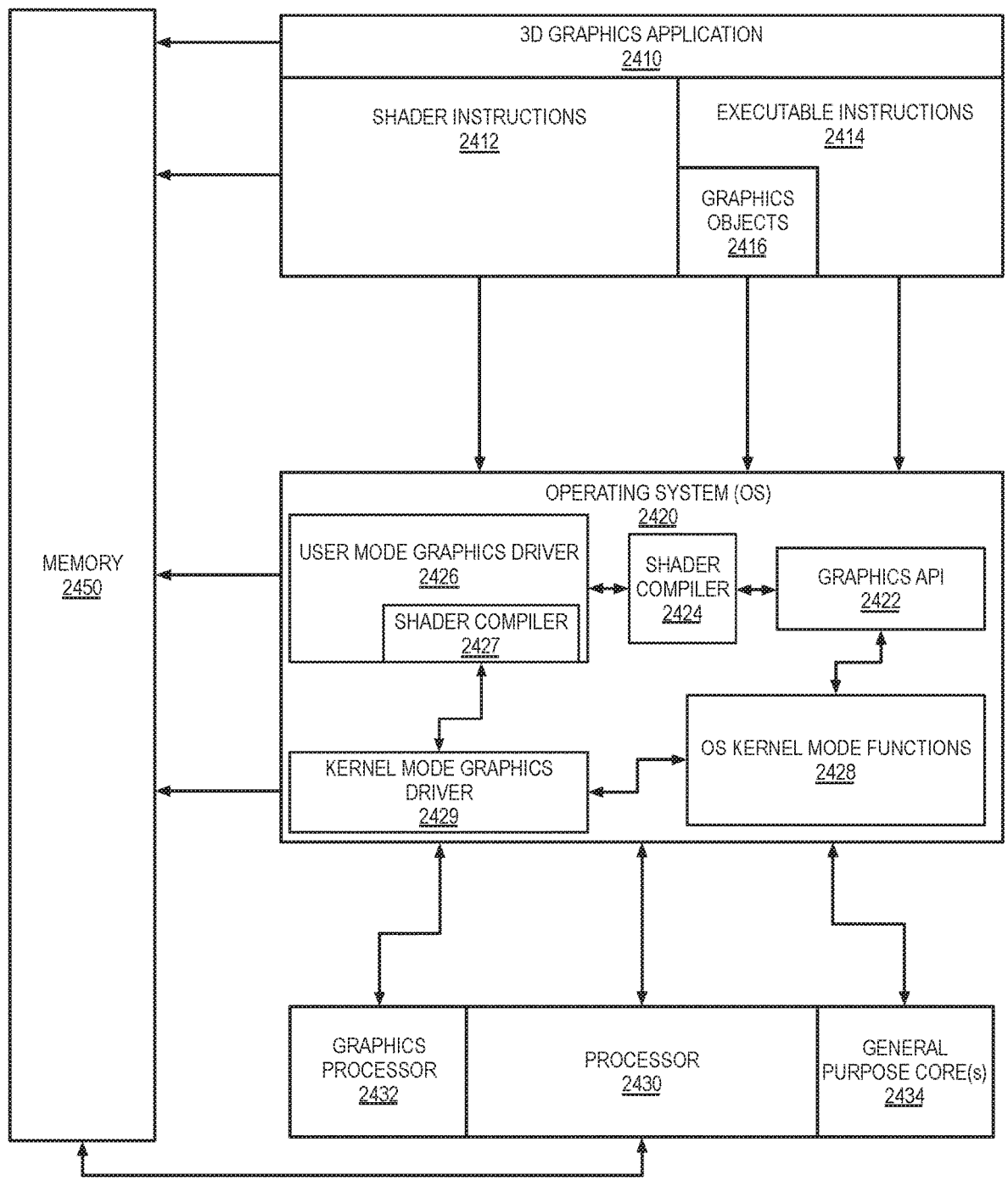
FIG. 24 illustrates exemplary graphics software architecture for a data processing system according to some embodiments.

FIG. 24 illustrates exemplary graphics software architecture for a data processing system 2400 according to some embodiments. In some embodiments, software architecture includes a 3D graphics application 2410, an operating system 2420, and at least one processor 2430. In some embodiments, processor 2430 includes a graphics processor 2432 and one or more general-purpose processor core(s) 2434. The graphics application 2410 and operating system 2420 each execute in the system memory 2450 of the data processing system.

In some embodiments, 3D graphics application 2410 contains one or more shader programs including shader instructions 2412. The shader language instructions may be in a high-level shader language, such as the High-level Shader Language (HLSL) or the OpenGL Shader Language (GLSL). The application also includes executable instructions 2414 in a machine language suitable for execution by the general-purpose processor core 2434. The application also includes graphics objects 2416 defined by vertex data.

In some embodiments, operating system 2420 is a Microsoft® Windows® operating system from the Microsoft Corporation, a proprietary UNIX-like operating system, or an open source UNIX-like operating system using a variant of the Linux kernel. The operating system 2420 can support a graphics API 2422 such as the Direct3D API, the OpenGL API, or the Vulkan API. When the Direct3D API is in use, the operating system 2420 uses a front-end shader compiler 2424 to compile any shader instructions 2412 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 2410. In some embodiments, the shader instructions 2412 are provided in an intermediate form, such as a version of the Standard Portable Intermediate Representation (SPIR) used by the Vulkan API.

In some embodiments, user mode graphics driver 2426 contains a back-end shader compiler 2427 to convert the shader instructions 2412 into a hardware specific representation. When the OpenGL API is in use, shader instructions 2412 in the GLSL high-level language are passed to a user mode graphics driver 2426 for compilation. In some embodiments, user mode graphics driver 2426 uses operating system kernel mode functions 2428 to communicate with a kernel mode graphics driver 2429. In some embodiments, kernel mode graphics driver 2429 communicates with graphics processor 2432 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 25:
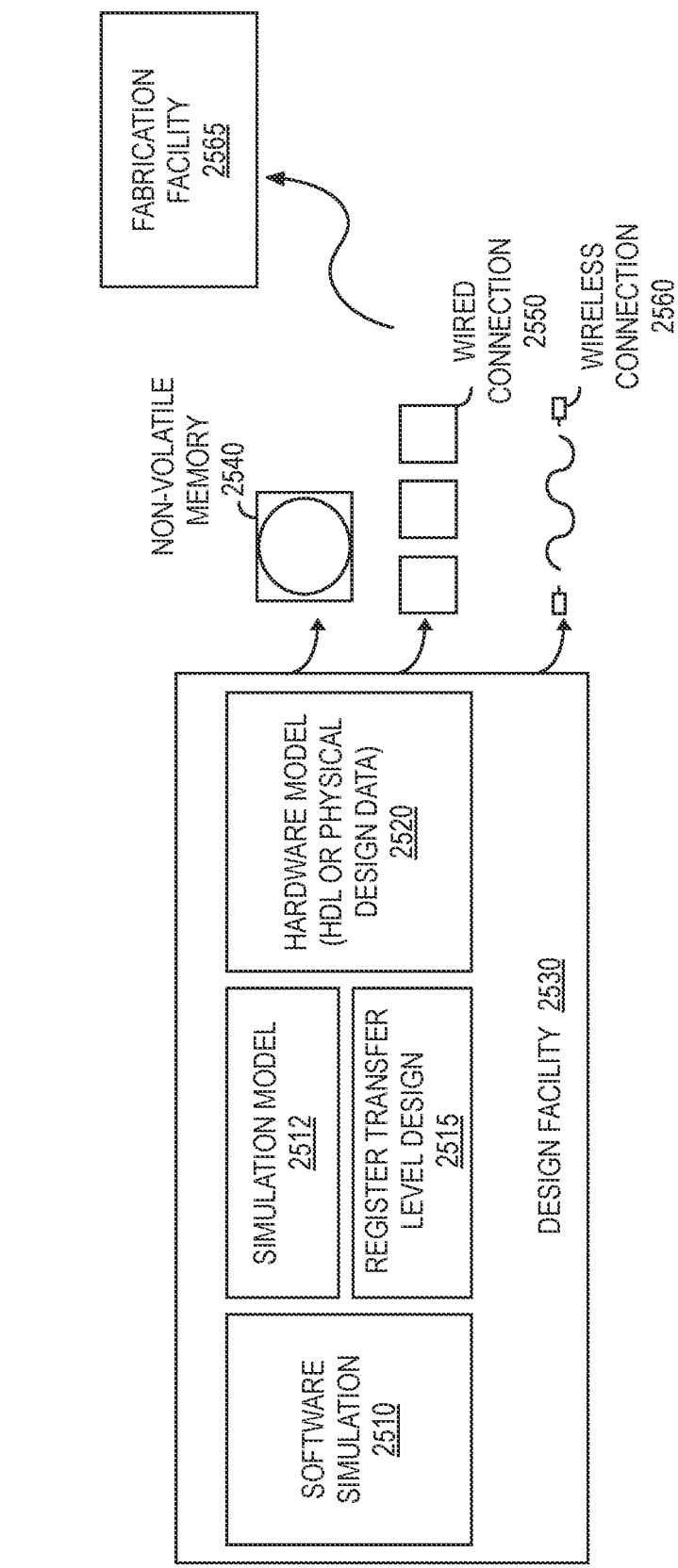
FIG. 25 is a block diagram illustrating an IP core development system, according to an embodiment.

FIG. 25 is a block diagram illustrating an IP core development system 2500 that may be used to manufacture an integrated circuit to perform operations according to an embodiment. The IP core development system 2500 may be used to generate modular, re-usable designs that can be incorporated into a larger design or used to construct an entire integrated circuit (e.g., an SOC integrated circuit). A design facility 2530 can generate a software simulation 2510 of an IP core design in a high-level programming language (e.g., C/C++). The software simulation 2510 can be used to design, test, and verify the behavior of the IP core using a simulation model 2512. The simulation model 2512 may include functional, behavioral, and/or timing simulations. A register transfer level (RTL) design 2515 can then be created or synthesized from the simulation model 2512. The RTL design 2515 is an abstraction of the behavior of the integrated circuit that models the flow of digital signals between hardware registers, including the associated logic performed using the modeled digital signals. In addition to an RTL design 2515, lower-level designs at the logic level or transistor level may also be created, designed, or synthesized. Thus, the particular details of the initial design and simulation may vary.

The RTL design 2515 or equivalent may be further synthesized by the design facility into a hardware model 2520, which may be in a hardware description language (HDL), or some other representation of physical design data. The HDL may be further simulated or tested to verify the IP core design. The IP core design can be stored for delivery to a $3^{rd}$ party fabrication facility 2565 using non-volatile memory 2540 (e.g., hard disk, flash memory, or any non-volatile storage medium). Alternatively, the IP core design may be transmitted (e.g., via the Internet) over a wired connection 2550 or wireless connection 2560. The fabrication facility 2565 may then fabricate an integrated circuit that is based at least in part on the IP core design. The fabricated integrated circuit can be configured to perform operations in accordance with at least one embodiment described herein.

Exemplary System on a Chip Integrated Circuit

Figure 26:
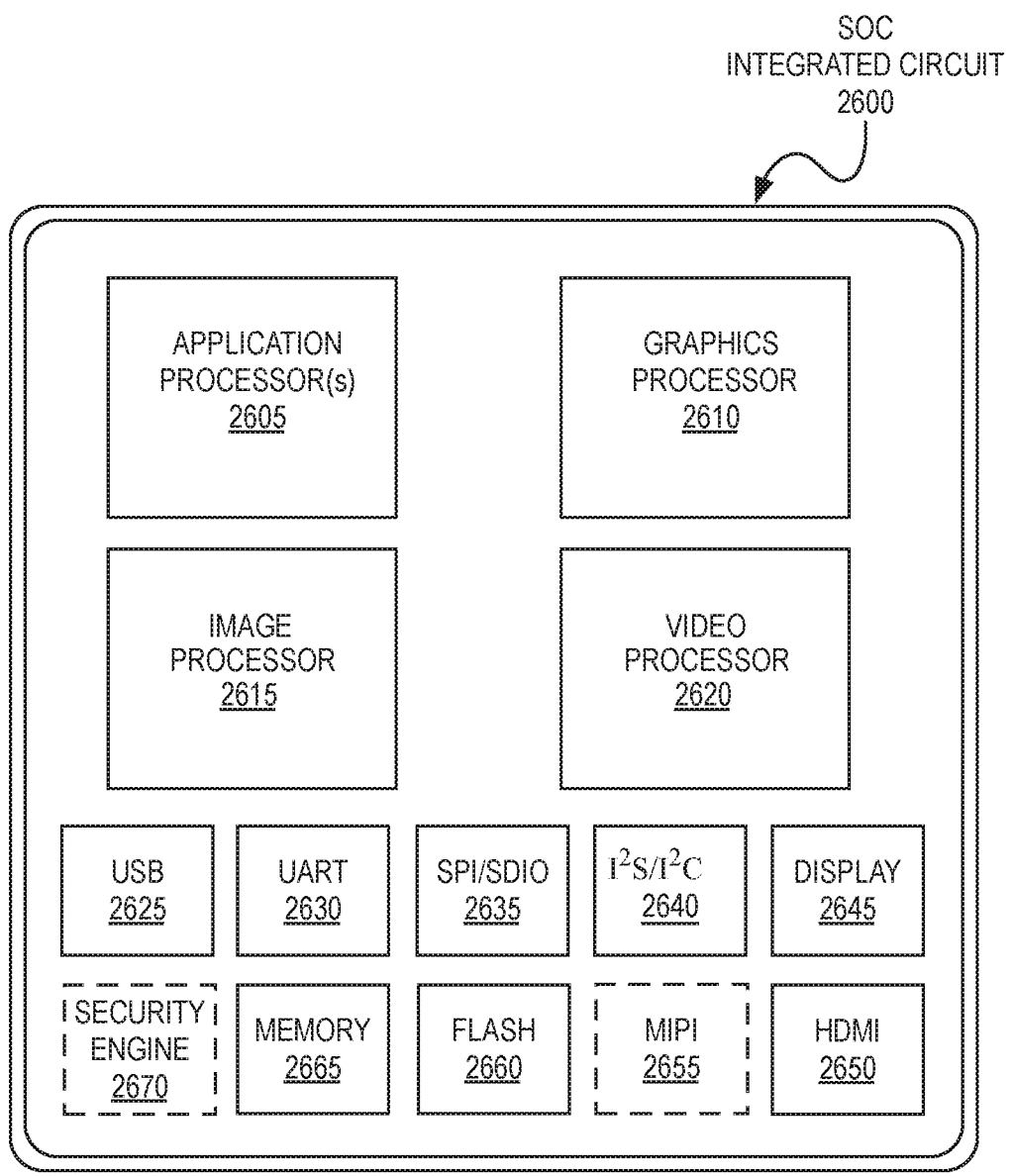
FIG. 26 is a block diagram illustrating an exemplary system on a chip integrated circuit, according to an embodiment.
Figure 27:
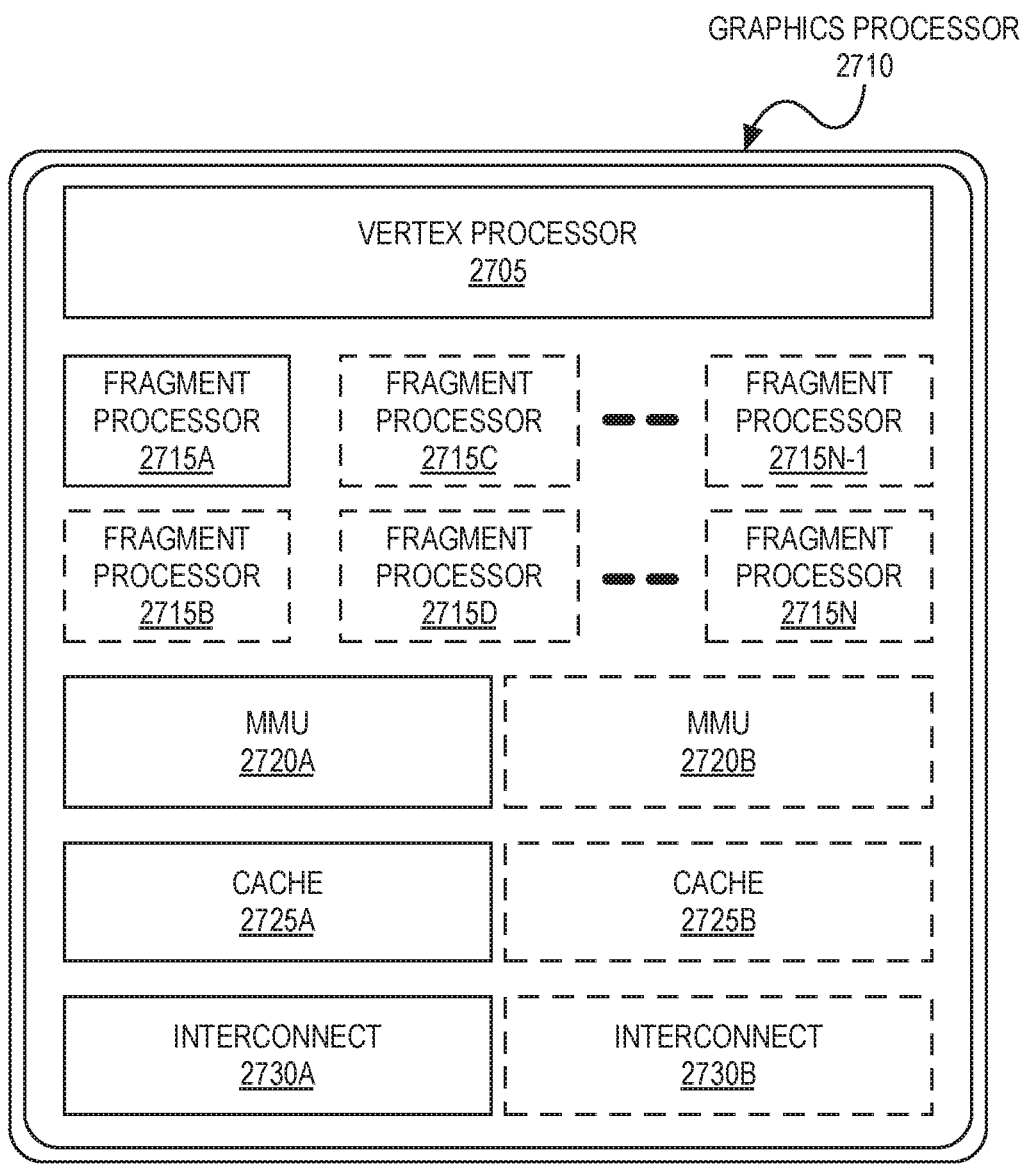
FIG. 27 is a block diagram illustrating an additional exemplary graphics processor, according to an embodiment.
Figure 28:
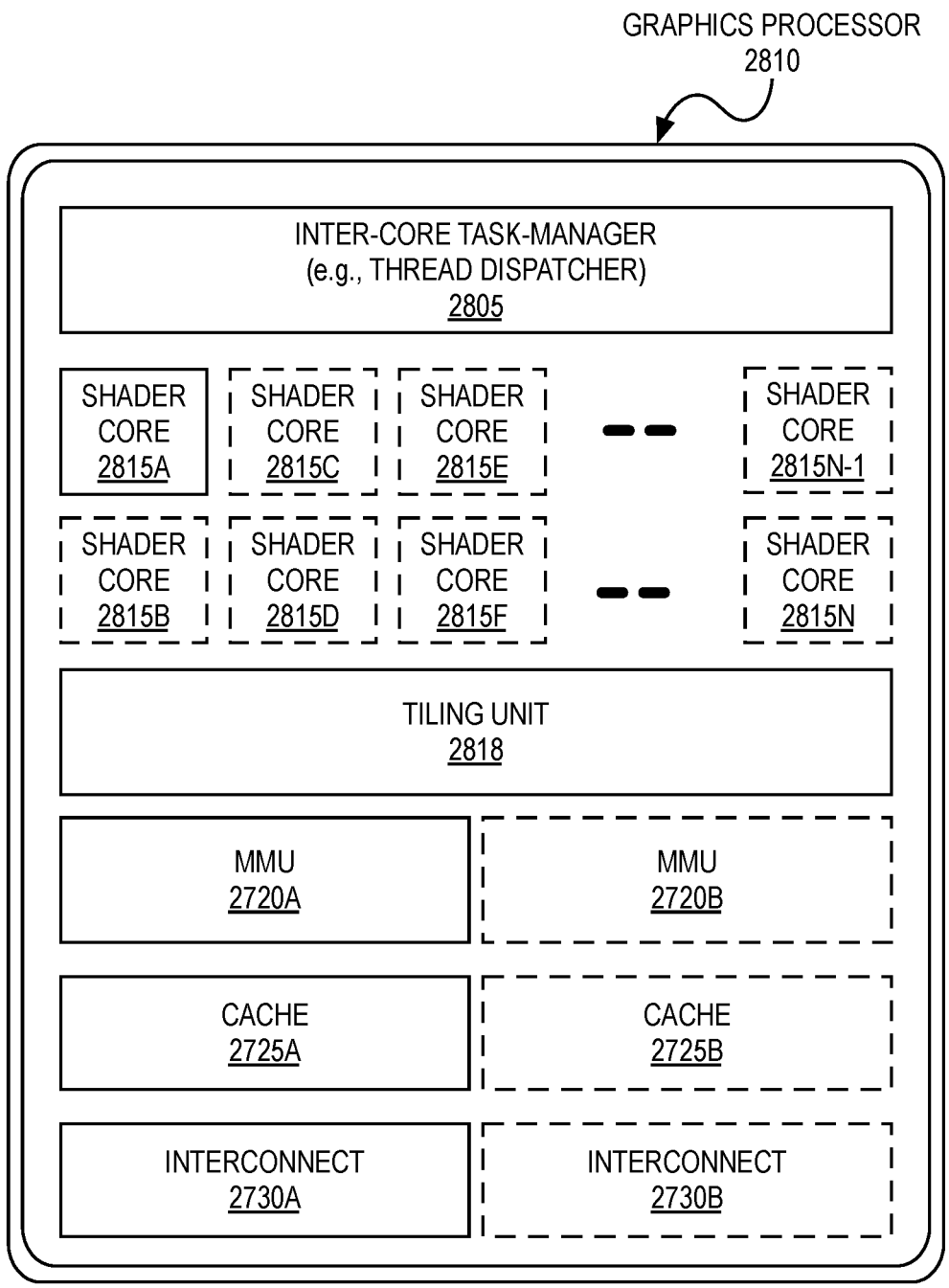
FIG. 28 is a block diagram illustrating an additional exemplary graphics processor of a system on a chip integrated circuit, according to an embodiment.

FIG. 26-28 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 26 is a block diagram illustrating an exemplary system on a chip integrated circuit 2600 that may be fabricated using one or more IP cores, according to an embodiment. Exemplary integrated circuit 2600 includes one or more application processor(s) 2605 (e.g., CPUs), at least one graphics processor 2610, and may additionally include an image processor 2615 and/or a video processor 2620, any of which may be a modular IP core from the same or multiple different design facilities. Integrated circuit 2600 includes peripheral or bus logic including a USB controller 2625, UART controller 2630, an SPI/SDIO controller 2635, and an $I^2S/I^2C$ controller 2640. Additionally, the integrated circuit can include a display device 2645 coupled to one or more of a high-definition multimedia interface (HDMI) controller 2650 and a mobile industry processor interface (MIPI) display interface 2655. Storage may be provided by a flash memory subsystem 2660 including flash memory and a flash memory controller. Memory interface may be provided via a memory controller 2665 for access to SDRAM or SRAM memory devices. Some integrated circuits additionally include an embedded security engine 2670.

FIG. 27 is a block diagram illustrating an exemplary graphics processor 2710 of a system on a chip integrated circuit that may be fabricated using one or more IP cores, according to an embodiment. Graphics processor 2710 can be a variant of the graphics processor 2610 of FIG. 26. Graphics processor 2710 includes a vertex processor 2705 and one or more fragment processor(s) 2715A-2715N (e.g., 2715A, 2715B, 2715C, 2715D, through 2715N-1, and 2715N). Graphics processor 2710 can execute different shader programs via separate logic, such that the vertex processor 2705 is optimized to execute operations for vertex shader programs, while the one or more fragment processor(s) 2715A-2715N execute fragment (e.g., pixel) shading operations for fragment or pixel shader programs. The vertex processor 2705 performs the vertex processing stage of the 3D graphics pipeline and generates primitives and vertex data. The fragment processor(s) 2715A-2715N use the primitive and vertex data generated by the vertex processor 2705 to produce a framebuffer that is displayed on a display device. In one embodiment, the fragment processor(s) 2715A-2715N are optimized to execute fragment shader programs as provided for in the OpenGL API, which may be used to perform similar operations as a pixel shader program as provided for in the Direct 3D API.

Graphics processor 2710 additionally includes one or more memory management units (MMUs) 2720A-2720B, cache(s) 2725A-2725B, and circuit interconnect(s) 2730A-2730B. The one or more MMU(s) 2720A-2720B provide for virtual to physical address mapping for graphics processor 2710, including for the vertex processor 2705 and/or fragment processor(s) 2715A-2715N, which may reference vertex or image/texture data stored in memory, in addition to vertex or image/texture data stored in the one or more cache(s) 2725A-2725B. In one embodiment the one or more MMU(s) 2720A-2720B may be synchronized with other MMUs within the system, including one or more MMUs associated with the one or more application processor(s) 2605, image processor 2615, and/or video processor 2620 of FIG. 26, such that each processor 2605-2620 can participate in a shared or unified virtual memory system. The one or more circuit interconnect(s) 2730A-2730B enable graphics processor 2710 to interface with other IP cores within the SoC, either via an internal bus of the SoC or via a direct connection, according to embodiments.

FIG. 28 is a block diagram illustrating an additional exemplary graphics processor 2810 of a system on a chip integrated circuit that may be fabricated using one or more IP cores, according to an embodiment. Graphics processor 2810 can be a variant of the graphics processor 2610 of FIG. 26. Graphics processor 2810 includes the one or more MMU(s) 2720A-2720B, caches 2725A-2725B, and circuit interconnect(s) 2730A-2730B of the integrated circuit 2700 of FIG. 27.

Graphics processor 2810 includes one or more shader cores 2815A-2815N (e.g., 2815A, 2815B, 2815C, 2815D, 2815E, 2815F, through 2815N-1, and 2815N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2810 includes an inter-core task manager 2805, which acts as a thread dispatcher to dispatch execution threads to one or more shader cores 2815A-2815N and a tiling unit 2818 to accelerate tiling operations for tile-based rendering, in which rendering operations for a scene are subdivided in image space, for example to exploit local spatial coherence within a scene or to optimize use of internal caches.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides for a general-purpose graphics processor comprising a multisample antialiasing compression module to examine a number of colors to be stored for a set of sample locations of a pixel and allocate one or more planes to store color data for the set of sample locations of the pixel and a lossless compression module to apply lossless compression on the one or more planes and update a compression status in a compression control surface for each of the one or more planes.

One embodiment provides for a method of performing lossless color compression alongside fragment compression, the method comprising compacting sample data for multiple sample locations of a pixel; mapping the multiple sample locations to memory locations storing compacted sample data; applying lossless compression to the compacted sample data; and updating a compression control surface associated with the memory location to indicate a compression status for the memory location.

One embodiments provide for a data processing system comprising a non-transitory machine-readable medium to store instructions for execution by one or more processors of the data processing system; a memory module to store a multisample render target; and a general-purpose graphics processor comprising a multisample antialiasing compression module and a lossless compression module, wherein the multisample antialiasing module is to examine a number of colors to be stored for a set of sample locations of a pixel and allocate one or more planes to store color data for the set of sample locations of the pixel, and wherein the lossless compression module is to apply lossless compression on the one or more planes and update a compression status in a compression control surface for each of the one or more planes.

The embodiments described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage devices of a given electronic device typically store code and/or data for execution on the set of one or more processors of that electronic device.

One embodiment provides for a data processing system comprising a memory module to store a multisample render target, the multisample render target to store one or more sample locations for each pixel in a set of pixels and general-purpose graphics processor comprising a multisample antialiasing compression module. The multisample antialiasing compression module can be configured to analyze color data for a set of sample locations of a first pixel, determine a first memory plane to allocate for the first pixel, the first memory plane a lowest order memory plane to be allocated for the first pixel, wherein the lowest order memory plane is the lowest numbered memory plane referenced by one or more sample locations of a pixel and merge a memory plane allocation for the first pixel with a memory plane allocation for a second pixel in response to a determination that the first memory plane is the lowest order memory plane to be allocated for the second pixel.

One embodiment provides for a method comprising compacting sample data for multiple sample locations of a pixel, mapping the multiple sample locations to memory locations storing compacted sample data, the memory locations mapped to memory of a general-purpose graphics processor, applying lossless compression to the compacted sample data, and updating a compression control surface associated with the memory locations to indicate a compression status for the memory locations. In one embodiment, compacting the sample data includes storing only unique color values within the sample data and mapping the multiple sample locations to memory locations storing the compacted sample data includes updating a multisample control surface with a mapping between the multiple sample locations and a memory plane storing color data associated with the multiple sample locations. Mapping the multiple sample locations to memory locations storing the compacted sample data includes allocating a memory plane for each unique color value associated with the sample locations. Applying lossless compression to the compacted sample data includes applying one or more lossless compression algorithms to a memory plane storing a unique color value. Updating the compression control surface includes storing an indicator for the one or more lossless compression algorithms applied to the memory plane.

One embodiment provides for a graphics processing device comprising an interface to a system interconnect and a general-purpose graphics processor coupled to the interface, the general-purpose graphics processor comprising a multisample antialiasing compressor and a lossless compressor. The multisample antialiasing compressor can compact sample data for multiple sample locations of a pixel and map the multiple sample locations to memory locations within memory of the general-purpose graphics processor, the memory locations to store compacted sample data. The lossless compressor can apply lossless compression to the compacted sample data and update a compression control surface associated with the memory locations to indicate a compression status for the memory locations. The graphics processing device can additionally include a display interface to an external display device.

One embodiment provides for a data processing system comprising a memory device to store a multisample render target and a general-purpose graphics processor comprising a multisample antialiasing compressor and a multisample render cache. The multisample render target can store color data for a set of sample locations of each pixel in a set of pixels. The multisample antialiasing compressor can apply multisample antialiasing compression to color data generated for the set of sample locations of a first pixel in the set of pixels. The multisample render cache can store color data generated for the set of sample locations of the first pixel in the set of pixels. Color data evicted from the multisample render cache is stored to the multisample render target. To apply the multisample antialiasing compression to color data generated for the set of sample locations of a first pixel, the multisample antialiasing compressor is to determine a first memory plane to allocate for the first pixel based on a color of a sample of the first pixel, wherein the color of the sample of the first pixel is a first color and the first memory plane is to store the first color and merge a memory plane allocation for the first pixel with a memory plane allocation for a second pixel when a first memory plane to be allocated for the second pixel is to store a same color as the first color.

One embodiment provides for a method comprising, on a general-purpose graphics processor comprising a general-purpose graphics processor including a multisample render cache and a multisample antialiasing compressor, storing a multisample render target to a memory module, the multisample render target to store color data for a set of sample locations for each pixel in a set of pixels, generating color data for the set of sample locations of a first pixel in the set of pixels, compressing color data generated for the set of sample locations for the first pixel in the set of pixels via the multisample antialiasing compressor, and storing generated color data to the multisample render cache, wherein color data evicted from the multisample render cache is to be stored to the multisample render target.

One embodiment provides for a graphics processing device comprising an interface to a system interconnect, a memory module to store a multisample render target, and a general-purpose graphics processor comprising a multisample antialiasing compressor. The multisample render target can store color data for a set of sample locations of each pixel in a set of pixels. The multisample antialiasing compressor can apply multisample antialiasing compression to color data generated for the set of sample locations of a first pixel in the set of pixels. The general-purpose graphics processor can additionally include a multisample render cache to store color data generated for the set of sample locations of the first pixel in the set of pixels. Color data evicted from the multisample render cache can be stored to the multisample render target.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the embodiments may be practiced without some of these specific details. In certain instances, well-known structures and functions were not described in elaborate detail to avoid obscuring the inventive subject matter of the embodiments. Accordingly, the scope and spirit of the invention should be judged in terms of the claims that follow.

What is claimed is:

1. A method comprising:
    on a general-purpose graphics processor comprising a general-purpose graphics processor including a multisample render cache and a multisample antialiasing compressor:
        storing a multisample render target to a memory module, the multisample render target to store color data for a set of sample locations for each pixel in a set of pixels;
        generating color data for the set of sample locations of a first pixel in the set of pixels;
        compressing color data generated for the set of sample locations for the first pixel in the set of pixels via the multisample antialiasing compressor; and
        storing generated color data to the multisample render cache, wherein color data evicted from the multisample render cache is to be stored to the multisample render target.

2. The method as in claim 1, wherein compressing the color data generated for the set of sample locations for the first pixel includes:
    determining a first memory plane to allocate for the first pixel based on a color of a sample of the first pixel, wherein the color of the first pixel is a first color and the first memory plane is to store the first color; and
    merging a memory plane allocation for the first pixel with a memory plane allocation for a second pixel when a first memory plane to be allocated for the second pixel is to store a same color as the first color, wherein the first color is generated via a program configured to execute on a processing resource of the general-purpose graphics processor.

3. The method as in claim 2, additionally comprising allocating one or more memory planes via a multisample antialiasing plane allocator, the multisample antialiasing plane allocator to progressively allocate memory planes for multiple pixels without pre-calculating an entire set of planes to be allocated.

4. The method as in claim 3, wherein merging the memory plane allocation for the first pixel with the memory plane allocation for the second pixel includes:
    allocating a shared memory plane via the multisample antialiasing plane allocator, wherein the color of the first pixel is a first color, the first memory plane is to store the first color, and the memory plane allocation for the first pixel is merged with the memory plane allocation for the second pixel with the second pixel is to store the first color; and
    updating a plane to pixel map to map the shared memory plane to the first pixel and the second pixel.

5. The method as in claim 4, further comprising generating a multisample control surface based on accumulated updates to the plane to pixel map, the multisample control surface storing index values that map samples for a block of pixels including the first pixel and the second pixel.

6. The method as in claim 5, further comprising unpacking data for sample locations of the first pixel or the second pixel based on the multisample control surface.

7. A general-purpose graphics processor comprising:
a multisample render cache;
a multisample antialiasing compressor coupled with the multisample render cache; and
one or more processing resources to execute commands and instructions, the one or more processing resources to:
   store a multisample render target to a memory module, the multisample render target to store color data for a set of sample locations for each pixel in a set of pixels;
   generate color data for the set of sample locations of a first pixel in the set of pixels;
   compress color data generated for the set of sample locations for the first pixel in the set of pixels via the multisample antialiasing compressor; and
   store generated color data to the multisample render cache, wherein color data evicted from the multisample render cache is to be stored to the multisample render target.

8. The general-purpose graphics processor as in claim 7, wherein to compress the color data generated for the set of sample locations for the first pixel includes to:
   determine a first memory plane to allocate for the first pixel based on a color of a sample of the first pixel, wherein the color of the first pixel is a first color and the first memory plane is to store the first color; and
   merge a memory plane allocation for the first pixel with a memory plane allocation for a second pixel when a first memory plane to be allocated for the second pixel is to store a same color as the first color, wherein the first color is generated via a program configured to execute on the one or more processing resources.

9. The general-purpose graphics processor as in claim 8, the one or more processing resources to allocate one or more memory planes via a multisample antialiasing plane allocator, the multisample antialiasing plane allocator to progressively allocate memory planes for multiple pixels without pre-calculating an entire set of planes to be allocated.

10. The general-purpose graphics processor as in claim 9, wherein to merge the memory plane allocation for the first pixel with the memory plane allocation for the second pixel includes to:
   allocate a shared memory plane via the multisample antialiasing plane allocator, wherein the color of the first pixel is a first color, the first memory plane is to store the first color, and the memory plane allocation for the first pixel is merged with the memory plane allocation for the second pixel with the second pixel is to store the first color; and
   update a plane to pixel map to map the shared memory plane to the first pixel and the second pixel.

11. The general-purpose graphics processor as in claim 10, the one or more processing resources to generate a multisample control surface based on accumulated updates to the plane to pixel map, the multisample control surface to store index values that map samples for a block of pixels including the first pixel and the second pixel.

12. The general-purpose graphics processor as in claim 11, the one or more processing resources to unpack data for sample locations of the first pixel or the second pixel based on the multisample control surface.

13. A graphics processing system comprising:
a memory module to store instructions and a multisample render target, the multisample render target to store one or more sample locations for each pixel in a set of pixels; and
a general-purpose graphics processor comprising a multisample render cache and a multisample antialiasing compressor, the general-purpose graphics processor configured based on the instructions to:
   store a multisample render target to a memory module, the multisample render target to store color data for a set of sample locations for each pixel in a set of pixels;
   generate color data for the set of sample locations of a first pixel in the set of pixels;
   compress color data generated for the set of sample locations for the first pixel in the set of pixels via the multisample antialiasing compressor; and
   store generated color data to the multisample render cache, wherein color data evicted from the multisample render cache is to be stored to the multisample render target.

14. The graphics processing system as in claim 13, wherein to compress the color data generated for the set of sample locations for the first pixel includes to:
   determine a first memory plane to allocate for the first pixel based on a color of a sample of the first pixel, wherein the color of the first pixel is a first color and the first memory plane is to store the first color; and
   merge a memory plane allocation for the first pixel with a memory plane allocation for a second pixel when a first memory plane to be allocated for the second pixel is to store a same color as the first color, wherein the first color is generated via a program configured to execute on the general-purpose graphics processor.

15. The graphics processing system as in claim 14, the general-purpose graphics processor to allocate one or more memory planes via a multisample antialiasing plane allocator, the multisample antialiasing plane allocator to progressively allocate memory planes for multiple pixels without pre-calculating an entire set of planes to be allocated.

16. The graphics processing system as in claim 15, wherein to merge the memory plane allocation for the first pixel with the memory plane allocation for the second pixel includes to:
   allocate a shared memory plane via the multisample antialiasing plane allocator, wherein the color of the first pixel is a first color, the first memory plane is to store the first color, and the memory plane allocation for the first pixel is merged with the memory plane allocation for the second pixel with the second pixel is to store the first color; and
   update a plane to pixel map to map the shared memory plane to the first pixel and the second pixel.

17. The graphics processing system as in claim 16, the general-purpose graphics processor to generate a multisample control surface based on accumulated updates to the plane to pixel map, the multisample control surface to store index values that map samples for a block of pixels including the first pixel and the second pixel.

18. The graphics processing system as in claim 17, the general-purpose graphics processor to unpack data for the sample locations of the first pixel or the second pixel based on the multisample control surface.

* * * * *